US010628700B2

(12) United States Patent
Puri et al.

(10) Patent No.: US 10,628,700 B2
(45) Date of Patent: Apr. 21, 2020

(54) FAST AND ROBUST FACE DETECTION, REGION EXTRACTION, AND TRACKING FOR IMPROVED VIDEO CODING

(71) Applicant: INTEL CORPORATION, Santa Clara, CA (US)

(72) Inventors: Atul Puri, Redmond, WA (US); Daniel Socek, Miami, FL (US)

(73) Assignee: Intel Corporation, Santa Clara, CA (US)

(*) Notice: Subject to any disclaimer, the term of this patent is extended or adjusted under 35 U.S.C. 154(b) by 814 days.

(21) Appl. No.: 15/162,401

(22) Filed: May 23, 2016

(65) Prior Publication Data

US 2017/0339417 A1 Nov. 23, 2017

(51) Int. Cl.
| | |
|---|---|
| *H04N 7/12* | (2006.01) |
| *H04N 11/02* | (2006.01) |
| *H04N 11/04* | (2006.01) |
| *G06K 9/46* | (2006.01) |
| *H04N 19/167* | (2014.01) |
| *H04N 19/119* | (2014.01) |
| *H04N 19/543* | (2014.01) |
| *H04N 19/85* | (2014.01) |
| *G06K 9/00* | (2006.01) |
| *G06K 9/62* | (2006.01) |
| *H04N 19/136* | (2014.01) |

(52) U.S. Cl.
CPC ....... *G06K 9/4652* (2013.01); *G06K 9/00281* (2013.01); *G06K 9/4614* (2013.01); *G06K 9/6257* (2013.01); *G06K 9/6263* (2013.01); *H04N 19/119* (2014.11); *H04N 19/167* (2014.11); *H04N 19/543* (2014.11); *H04N 19/85* (2014.11); *H04N 19/136* (2014.11)

(58) Field of Classification Search
None
See application file for complete search history.

(56) References Cited

U.S. PATENT DOCUMENTS

| | | | |
|---|---|---|---|
| 8,290,253 | B1 | 10/2012 | Wang et al. |
| 8,406,482 | B1 | 3/2013 | Chien et al. |
| 2004/0199292 | A1* | 10/2004 | Sakagami ............ G05D 1/0251 700/259 |
| 2011/0142338 | A1 | 6/2011 | Do et al. |
| 2012/0170659 | A1 | 7/2012 | Chaudhury et al. |
| 2015/0332471 | A1 | 11/2015 | Heo et al. |

(Continued)

OTHER PUBLICATIONS

Brown, D. et al., "A SOM based approach to skin detection with application in real time systems", BMVC01, 2001.

(Continued)

*Primary Examiner* — Talha M Nawaz
(74) *Attorney, Agent, or Firm* — Green, Howard & Mughal LLP

(57) ABSTRACT

Techniques related to improved video coding based on face detection, region extraction, and tracking are discussed. Such techniques may include performing a facial search of a video frame to determine candidate face regions in the video frame, testing the candidate face regions based on skin tone information to determine valid and invalid face regions, rejecting invalid face regions, and encoding the video frame based on valid face regions to generate a coded bitstream.

34 Claims, 26 Drawing Sheets

(56) References Cited

U.S. PATENT DOCUMENTS

2018/0018505 A1 1/2018 Tan
2018/0204111 A1* 7/2018 Zadeh .................. G06N 3/0436

OTHER PUBLICATIONS

Cho, K.M. et al., "Adaptive skin-color filter", Pattern Recognition, vol. 34, Issue 5, pp. 1067-1073, 2001.
Dadgostar, F. et al., "An adaptive real-time skin detector based on Hue thresholding: A comparison on two motion tracking methods", Pattern Recognition Letters, vol. 27, pp. 1342-1352, Elsevier ScienceDirect, Sep. 2006.
Greenspan, H. et al., "Mixture model for face color modeling and segmentation", Pattern Recognition Letters, vol. 22, Issue 44, pp. 1525-1536, 2001.
Kakumanu, P. et al., "A survey of skin-color modeling and detection methods", 2007 Pattern Recognition, vol. 40, pp. 1106-1122.
Khan, R. et al., "Color based skin classification", 2012 Pattern Recognition Letters, vol. 33 (2), pp. 157-163.
Prema, C. et al., "Survey on Skin Tone Detection using Color Spaces", International Journal of Applied Information Systems (IJAIS), vol. 2, No. 2, pp. 18-26, New York, USA 2012.
Quinlan, Ross, "C4.5: Programs for Machine Learning", Morgan Kauffmann Publishers, San Mateo, CA, 1993.
Sebe, I. et al., "Skin detection: A bayesian network approach", In Pattern Recognition, ICPR 2004, vol. 2, pp. 903-906, IEEE, 2004.
Sharma, C.M. et al., "A Context-aware Approach for Detecting Skin Colored Pixels in Images", International Journal of Computer Applications, vol. 71, pp. 8-13, 2013.
Vezhnevets, V. et al., "A survey on pixel-based skin color detection techniques", Graphicon 2003, pp. 85-92.
Viola, P. et al., "Rapid object Detection using a Boosted Cascade of Simple Features", Accepted Conference on Computer Vision and Pattern Recognition, 2001 (9 pages).
Viola, P. et al., "Robust Real-Time Face Detection", Proceedings of the 8th IEEE International Conference on Computer Vision (ICCV'01), (1 page).
Viola, P. et al., "Robust Real-time Object Detection", Cambridge Research Laboratory Technical Report Series, CRL 2001/Feb. 1, 2001, 30 pages.
Viola, P. et al., "Robust Real-Time Face Detection", International Journal of Computer Vision 57(2), 137-154, 2004, (18 pages).
Tan, Wei Ran et al., "A Fusion Approach for Efficient Human Skin Detection", IEEE Trans on Industrial Informatics, vol. 8, Issue 1, pp. 138-147, 2012.
Yang, M.H., "Detecting faces in images: A survey", PAMI, vol. 24, Issue 1; pp. 34-58, 2002.
Yogarajah, P. et al., "A dynamic threshold approach for skin segmentation in color images", in ICIP 2010, pp. 2225-2228.
Zafarifar, B. et al., "Texture-adaptive skin detection for TV and its real-time implementation on DSP and FPGA", IEEE Trans on Consumer Electronics, vol. 58, Issue 1, pp. 161-169, 2012.
Zafarifar, Bahman et al., "Improved Skin Segmentation for TV Image Enhancement, Using Color and Texture Features", IEEE International Conference on Consumer Electronics (ICCE2010), pp. 373-374, Jan. 2010, Las Vegas, NV. USA.
Zhu, X. et al., "Segmenting hands of arbitrary color", AFGR, 2000.
Notice of Allowance for U.S. Appl. No. 15/162,411, dated Jul. 29, 2019.

* cited by examiner (i)

(ii)

(i)

(ii)

821

822

(i)                      (ii)

701

705

(i)                      (ii)

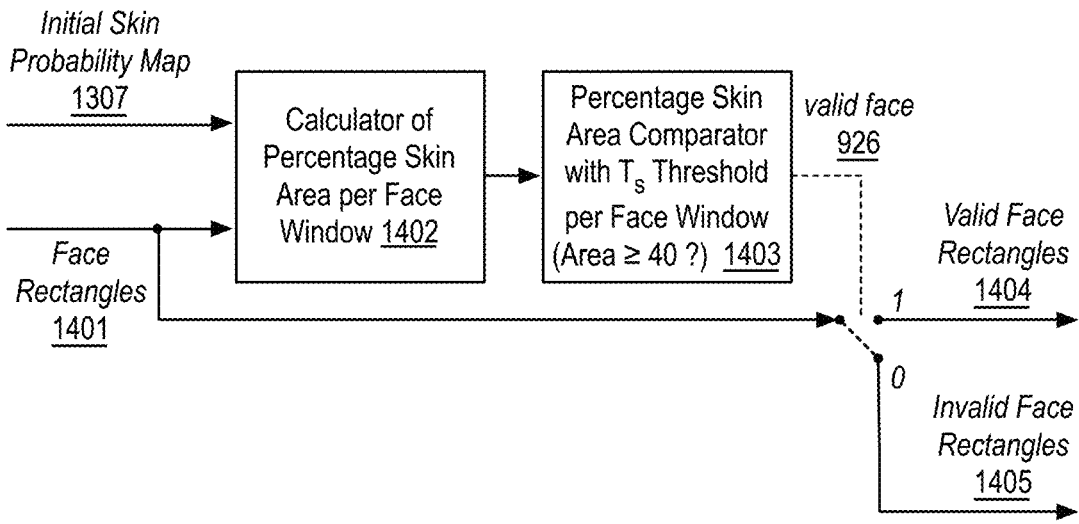
FIG. 14A
FIG. 14B
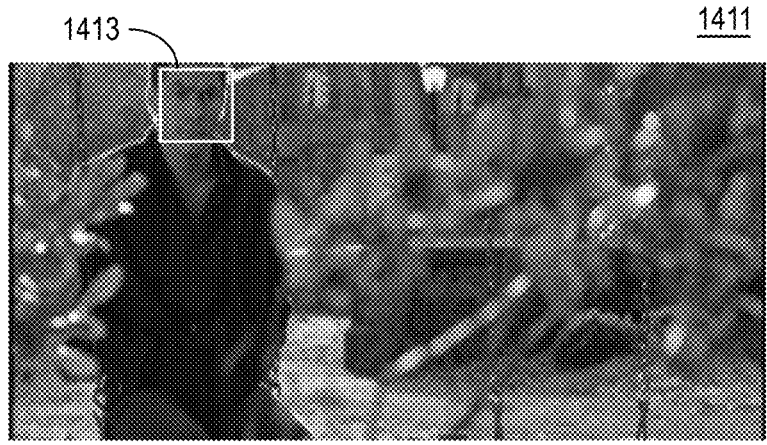

1511 1512

(i) (ii)

(i)

(ii)

(iii)

(iv)

(v)

(vi)

FAST AND ROBUST FACE DETECTION, REGION EXTRACTION, AND TRACKING FOR IMPROVED VIDEO CODING

BACKGROUND

In video coding and other contexts, face detection and tracking may be used to determine whether and/or where a human face appears in a video frame or an image and, in the context of video, a detected face or faces may be tracked across video frames. For example, face detection may be used in human-computer interaction, photo album management, biometrics, video surveillance, automatic focus in camera imaging, image or video search and retrieval, and the like.

Several face detection solutions have been proposed, however such solutions have limitations such as limited accuracy, the inability to run in real-time, high computational demands, and the like. As such, existing techniques do not provide face detection having high accuracy for real-time processing. Such problems may become critical as face detection and tracking becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 14A illustrates an example face validator;

FIG. 14B illustrates example face rectangles of a frame;

DETAILED DESCRIPTION

Figure 1:
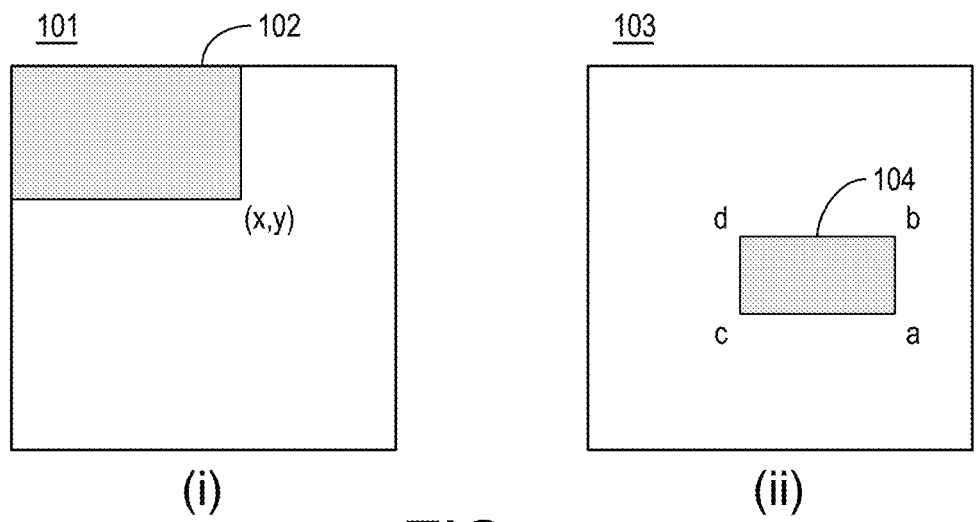
FIG. 1 illustrates an example integral image and an example rectangle sum calculation.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", (or "embodiments", "examples", or the like), etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to fast and robust face detection, region extraction, and tracking. Such techniques may be used in a variety of contexts such as video coding.

As described above, face detection and tracking may be used to determine whether and/or where a human face appears in a video frame or an image and, in the context of video, a detected face or faces may be tracked across video frames. In some embodiments, a multi-stage facial search of the video frame may be performed for a received video frame based on predetermined feature templates and a predetermined number of stages to determine a first candidate face region and a second candidate face region in the video frames. For example, any number of candidate face regions (e.g., rectangular face regions) may be found in a video frame or still image or the like. The candidate face regions such as the first and second candidate face regions may be tested based on skin tone information to determine the first candidate face region is a valid face region and the second candidate face region is an invalid face region. Furthermore, a determination may be made as to whether or not other candidate face regions are valid or invalid. The second candidate face region and any other invalid candidate face regions may be rejected and the first candidate face region and any other valid candidate face regions may be outputted. Such valid face regions may be further processed to determine free form face regions corresponding to the valid face regions or for other purposes as is discussed further herein. In an embodiment, the video frame and the video sequence to which the video frame belongs may be encoded based at least in part on the first candidate face region being a valid face region to generate a coded bitstream.

The techniques discussed herein addresses fast and robust face detection, face region extraction, and face tracking in video sequences or scenes. In some embodiments, face regions may be used to improve video coding of such regions. As used herein, face detection refers to the capability of determining by analysis of an image or video frame(s) if one or more face(s) exist in the image or video frame(s), and, if so, the ability to identify the presence of each face by spatial location and window size or by overlaying a window at each face location. As used herein, face region extraction refers to the capability of either directly or indirectly using detected face windows to extract free form (e.g., rather than windowed) face regions at pixel or small block resolution. For example, the output in such examples may be a face mask overlaid on each detected face or a separate face mask array per image or video frame. As used herein, face tracking refers to the capability predicting the current location of face windows (or regions) without explicitly performing face detection and/or face region extraction for such frames. Such face tracking may provide reduction in computation and overall compute complexity of face detection.

In some contexts, computer vision applications may be provided for images only or for low spatial resolution/frame rate video. In such applications, face detection may be a first step that is provided prior to face recognition. As discussed further, the techniques discussed herein may provide face detection for full frame-rate and high resolution video. Such techniques may require a high degree of robustness and high speed/real-time operation. For example, such techniques may be suitable for a variety of applications including video compression for improved video coding, which may require functionality for full frame-rate and high resolution video. The techniques discussed herein may reliably detect faces in video frames, extract actual face regions in and around detected face windows, and track the face regions from frame to frame to provide full frame rate output. Such techniques may be provided in conjunction with a face detector running at lower frame rates, for example. Such techniques may provide an improved face detection system that provides a robust, fast, and practical solution.

In some embodiments, face detection may be performed based on Viola-Jones face detection. Viola-Jones face detection may be based on an integral image representation and fast feature computation/evaluation, a learning classifier with adaptive boosting (Adaboost) training for feature selection/classification, and a cascade of classifiers from training for fast rejection of non-face windows or regions. For example, Viola-Jones face detection technique may provide successful face detection using the following: an Integral image, adaptive boosting (Adaboost), and an attentional cascade. Such face detection techniques may provide a feature-based detector that uses a supervised learning (e.g., training) phase to create a set of classifiers that may be organized as a cascade. The actual face detection (e.g., in an implementation phase) may use an a priori generated set of classifiers to search an image for face-like features.

FIG. 1 illustrates an example integral image 101 and an example rectangle sum calculation 103, arranged in accordance with at least some implementations of the present disclosure. For example, FIG. 1 illustrates integral image generation and usage for fast rectangle sum computation. As shown in FIG. 1, integral image 101 may be a cumulative image formed by the sum of pixels above and to the left of every pixel in the original image. For example, FIG. 1(i) illustrates the computation of integral image 101 in one pass. In an embodiment, for all points of integral image, each point (x,y) may have a value that is equal to the sum of all points (e.g., all luma values) bounded by (0,0), (x,0), (y,0) and (x,y) (e.g., the sum of all luma values bounded by bounding box 102).

Furthermore, FIG. 1(ii) illustrates how integral image 101 may be used to determine (quickly) the sum of all luma pixel values within a rectangular area 104. For example, the sum of all luma pixel values within rectangular area 104 may be determined by performing 3 additions. In an embodiment, the sum of all luma pixel values within rectangular area 104 may be determined as shown in Equation (1):

$$\text{Value of Sum of Rectangle } abcd = a - b - c + d \quad (1)$$

wherein a, b, c, and d are integral image values.

By determining an integral image, the sum of pixels of a rectangle may be determined very quickly (e.g., using only 3 additions as discussed). Furthermore, the quick determination of the sum of pixels of rectangles such as rectangular area 104 may be important as face detectors such as a Viola Jones face detector may use rectangular Haar-like features based on such rectangles or rectangular areas, which may be applied (and a response thereto may be) on an image for which faces need to be detected.

Figure 2A:
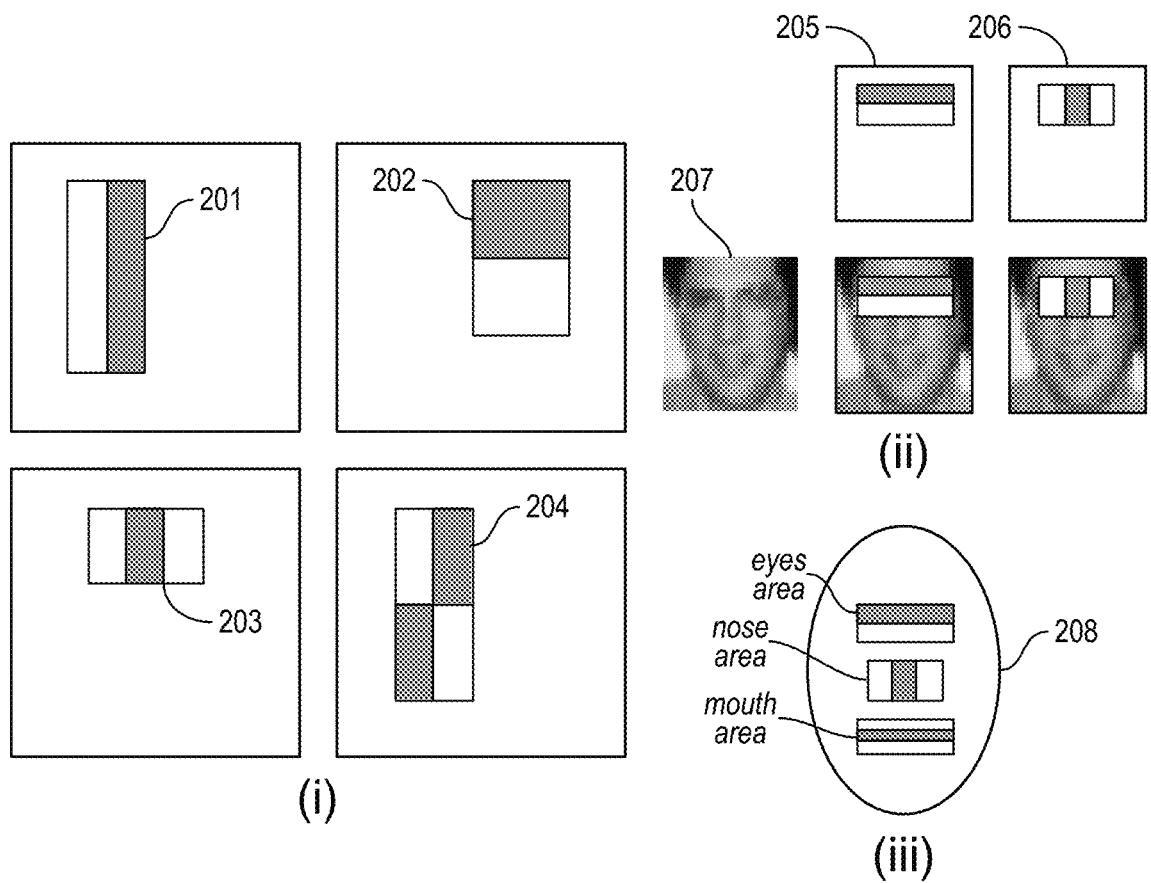
FIG. 2A illustrates example rectangular features.
Figure 2B:
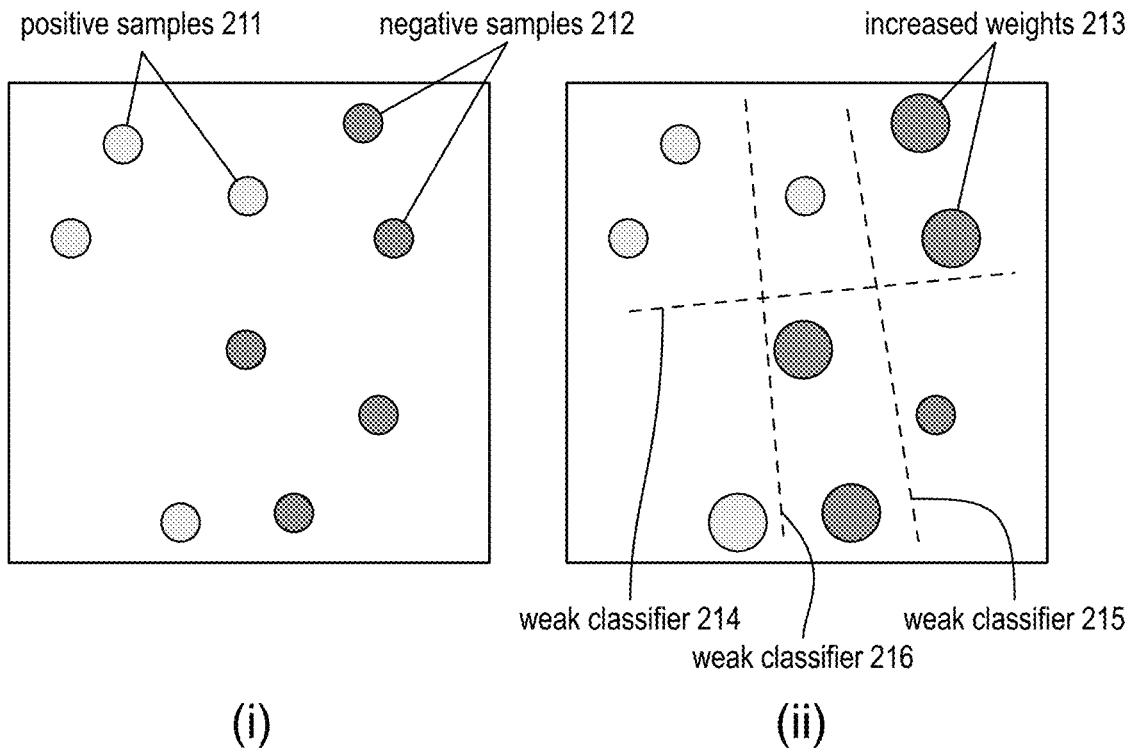
FIG. 2B illustrates example boosting.

FIG. 2A illustrates example rectangular features 201-204, arranged in accordance with at least some implementations of the present disclosure. For example, FIG. 2A illustrates Haar-like rectangular features 201-204 used in Viola-Jones face detection such that grey and white indicate different rectangles of a feature. For example, FIG. 2A(i) illustrates four example rectangular features 201-204 (which may also be characterized as filters) such that feature 201 is composed of two (e.g., one white and one grey) vertical rectangles, feature 202 is composed of two (e.g., one white and one grey) horizontal rectangles, feature 203 is composed of three (e.g., two white and one grey) rectangles, and feature 204 is composed of four (e.g., two white and two grey) rectangles. The absolute parity of rectangles in a feature (e.g., grey followed by white or white followed by grey, etc.) is not important. However, the relative parity is important (e.g., alternating of white and grey rectangles). Such Haar-like rectangular features may be applied on an input image (e.g., for which face-detection is being performed) at various shifted locations and a response may be examined such that the response may indicate a facial feature in the image has been detected.

For example, for rectangular feature 201 shown in FIG. 2A(i), its value may be determined as shown in Equation (2):

$$\text{value} = \text{sum(pixels in white area rectangle)} - \text{sum(pixels in dark area rectangle)} \quad (2)$$

where value may be the value for rectangular feature 201.

Furthermore, Haar-like features may be selected such that they mimic or respond to actual variations of luminance within a face such as those caused by eyes, a nose, lips etc. For example, for human face detection, an eye area may be relatively darker than the area just spatially below it and a nose area may have different brightness than a cheeks area such that Haar-like rectangular features, if they satisfy certain properties, may signal the presence of a face. In an embodiment, face detection may be performed by sliding a window of features that may, when combined, approximate features of human face resulting in a potential match and detection of a human face. Such implementations may encounter various challenges in practice.

For example, in a typical face detection context, in an input image, a number of faces is typically few (e.g., about zero to ten faces) as compared to non-face areas or regions. Furthermore, searching for faces in an image by moving a window a pixel at a time to perform matching is highly compute intensive due to the large number of pixels in an image (e.g., a high definition, HD, image is 1920×1080 pixels). Also, in an image, faces may exist at any scale, from a very large size such as that a face almost covers an entire image to covering a small area or region such that a face covers only $\frac{1}{200,000}^{th}$ of the size of an image. In addition, any window based matching for face detection may result in false positives that may be significant in number due to the high density of pixels in a typical image. Lastly, using a particular window size of, for example, 24×24 rectangular features may provide too many features (e.g., about 160,000) in the set such that evaluation of the entire set is not feasible.

However, the use of rectangular features may still be quite effective despite such difficulties. For example, two features as shown via features 205, 206 in FIG. 2A(ii) may perform face detection on a target image 207 with high quality such that the combination of features 205, 206 may result in an over 90% (e.g., true positive) face detection rate. However, features 205, 206 may suffer from the limitation that they have a high (e.g., about 50%) false positive rate. Such a high false positive rate may require the use of more complex features (or a sequence of several features). For example, a simple feature set 208 may be used to detect eye areas, a nose area, and a mouth are as shown in FIG. 2A(iii).

As discussed, with relatively simple rectangular features, while successful detection rates of faces may be high, corresponding false detection rates may also be high. In such contexts, multiple features may be used for detection such that while individually the features may be weak learners, with appropriate weighting, collectively they may be combined together into a strong classifier. Such techniques may be characterized as boosting.

For example, boosting may be a classification technique that combines weak learners into an accurate ensemble classifier. Using a training procedure, initially, each sample may be weighted equally. However, in each round of boosting a weak learner sample may be found that reduces the weighted training error, which may be followed by raising the weights of training examples misclassified by a current weak learner. The final classifier may be a linear combination of all weak learners with weight of a learner directly proportional to its accuracy with precise re-weighting and combining weak learners depending on specific boosting (e.g. adaptive boosting (AdaBoost)) techniques employed.

For example, cascading may be used in the context of Viola-Jones face detection to further reduce false positive rates. For example, simple classifiers that detect almost all positive windows while rejecting negative windows may be determined. If the response from a first classifier for a window being evaluated is positive, evaluation of a second more complex classifier may be performed, and so on. On the other hand, a negative outcome at any classifier may provide for rejection of the window. Using such techniques, cascading for face detection such as attentional cascading chains of classifiers that are progressively more complex and have a lower false detection rate may be provided. The detection rate and false positive rate of the cascade may be determined by multiplying such rates of each individual classifier in the cascade. For example, using a 10 stage classifier, true detection rates of about 0.9 and false positive rates of about $10^{-6}$ may be achieved.

Figure 2C:
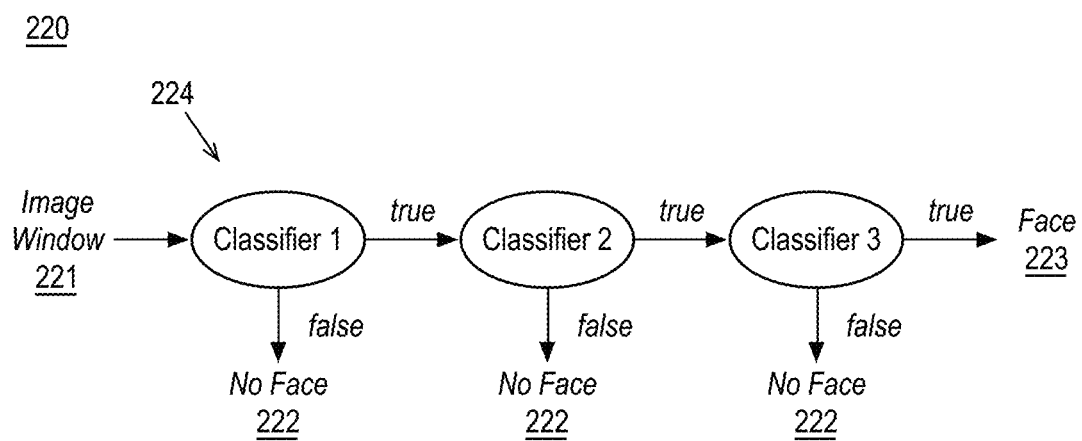
FIG. 2C illustrates an example classifier cascading structure.

FIG. 2C illustrates an example classifier cascading structure 220, arranged in accordance with at least some implementations of the present disclosure. For example, FIG. 2C illustrates an example attentional classifier cascading structure 220. As shown in FIG. 2C, simple classifiers 224 (e.g., Classifier 1, 2, 3, and so on) of classifier cascading structure 220 may reject many negative windows while detecting most positive windows. For example, many non-face windows may be rejected in the first few stages of classifier cascading structure 220. A positive response from the first classifier (e.g., Classifier 1) may trigger the evaluation of the second classifier (e.g., Classifier 1), and so on. A negative outcome at any of simple classifiers 224 may lead to immediate rejection of a window via no face signal 222 or the like. Classifier cascading structure 220 may be efficient for real time processing. For example, if a one feature classifier achieves detection rate of 100% and false positive rate of 50%, a five feature classifier may achieve detection rate of 100% and false positive rate of 40%, and a 20 feature classifier may achieve detection rate of 100% and false positive rate of 10%. Since making each classifier more complex may not be advantageous, attentional cascading may be utilized such that chains of classifiers that are progressively more complex and have much lower false positive rates may be provided to generate classifier cascading structure 220.

As discussed, classifier cascading structure 220 or the like may be pretrained in a training phase. To train a cascade such as classifier cascading structure 220, a target detection rate and false positive rate may be set for each stage of the cascade. Features may then be added to each stage until the target rates are met for a training set of images. Furthermore, if an overall false positive rate is not low enough (e.g., to meet a preset target overall false positive rate), an additional stage or stages may be added to the cascade. Furthermore, false positives from a current stage may be used as negative examples for training of the next stage in the cascade.

Figure 3A:
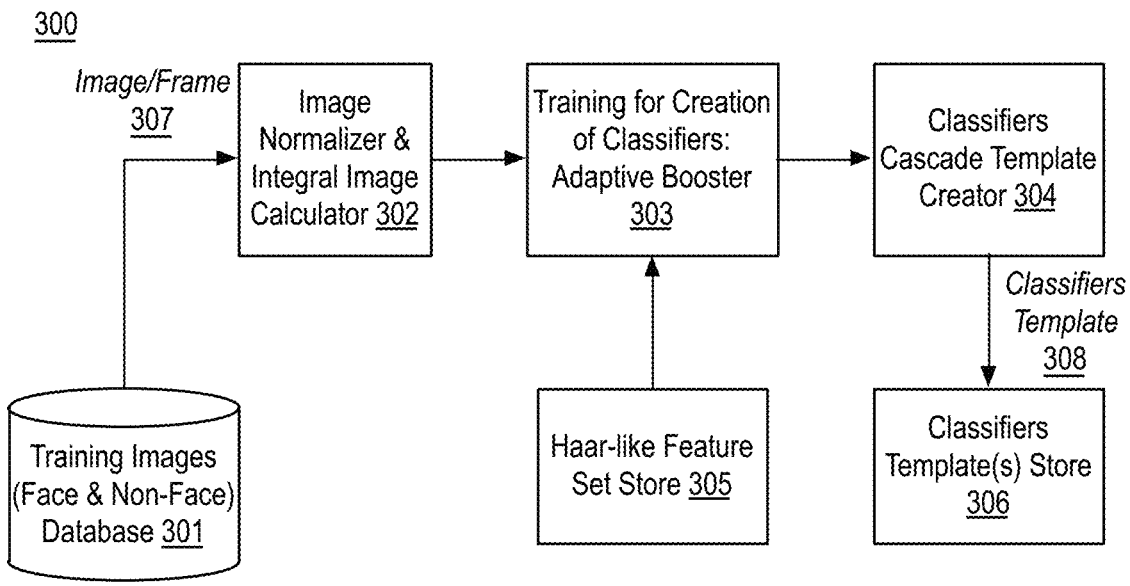
FIG. 3A illustrates a block diagram of an example system for training a face detection system.

FIG. 3A illustrates a block diagram of an example system 300 for training a face detection system, arranged in accordance with at least some implementations of the present disclosure. For example, FIG. 3A illustrates a training phase of a Viola-Jones face detection system. As shown in FIG. 3A, system 300 may receive an image/video frame 307 from a training images (faces and non-faces) database 301 at an image normalizer and integral image calculator 302 that may compute or determine a normalized version of image/video frame 307, which may enhance the contrast within image/video frame 307 and compute or determine an integral image in which a value of any pixel is the sum of all pixels until the line before and up to the pixel to the left of the pixel for image/video frame 307. For example, as discussed, once an integral image is calculated the integral image may allow a sum of all pixels within a rectangle (e.g., a rectangle abcd, please refer to FIG. 1.(ii)) of any size to be calculated quickly by performing three additions of 4 pixels (a, b, c, d) in the integral image (e.g., a−b−c+d) to yield a sum of all pixels bounded by the rectangle abcd. Haar-like rectangular features such as those illustrated in FIG. 2A (e.g., features constructed from a combination of two, three, or four rectangles) may be used as weak learner candidates. Furthermore, the operation of system 300 will be discussed with respect to FIG. 3B.

Figure 3B:
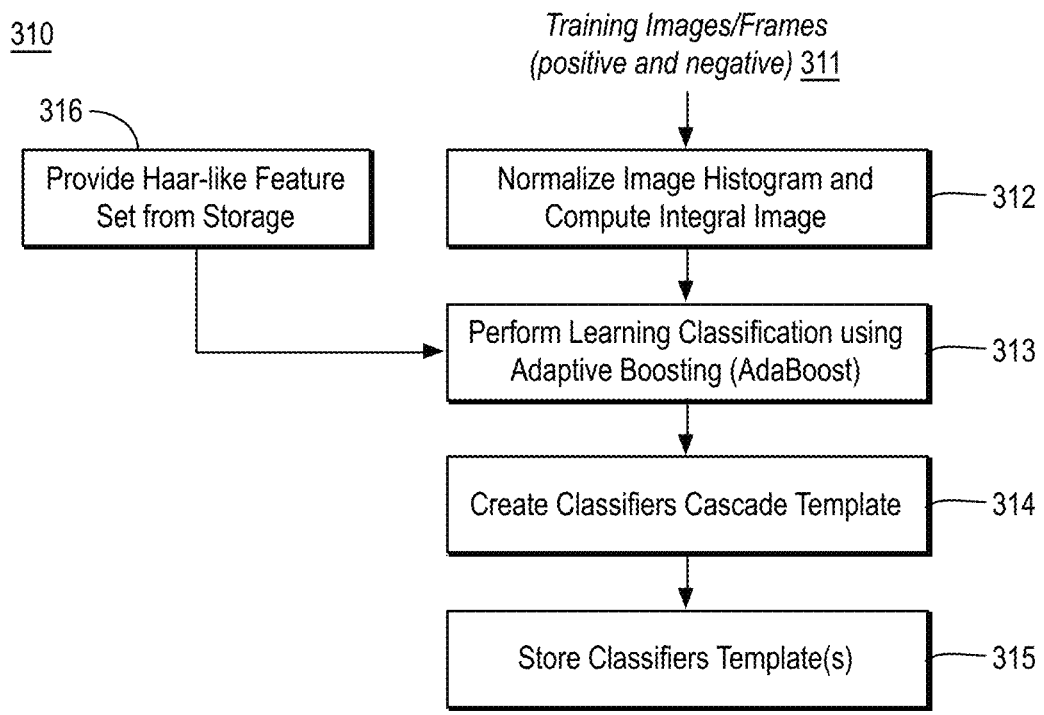
FIG. 3B illustrates an example process for training a face detection system.

FIG. 3B illustrates an example process 310 for training a face detection system, arranged in accordance with at least some implementations of the present disclosure. As shown in FIG. 3B, training images/frames 311 (e.g., both positive and negative) may be input to operation 312, "Normalize Image Histogram and Compute Integral Image", which may normalize training images/frames and determine, for each image/frame, an integral image. For example, operation 312 may be performed by image normalizer and integral image calculator 302. The output of operation 312 may be provided to operation 313, "Perform Learning Classification using Adaptive Boosting", which may use Haar-like features from storage on normalized training images to learn feature patterns (e.g., classifiers and their cascade) using adaptive boosting. For example, operation 313 may be performed by a training for creation of classifiers: adaptive booster 303 based on features received from Haar-like feature set store 305. The output of operation 313 may be provided to operation 314, "Create Classifiers Cascade Template" which may identify the number of features per classifier and create a classifier (e.g., an organized collection of features) for each stage of a cascade. For example, the entire set of classifiers, one for each stage, taken together may represent a template. For example, operation 314 may be performed by classifiers cascade template creator 304. The output of operation 314 may be stored as shown at operation 315, "Store Classifiers Template(s)". For example, operation 315 may be performed by classifiers cascade template creator 304 such that classifiers template 308 may be stored in classifiers template(s) store 306.

Figure 4A:
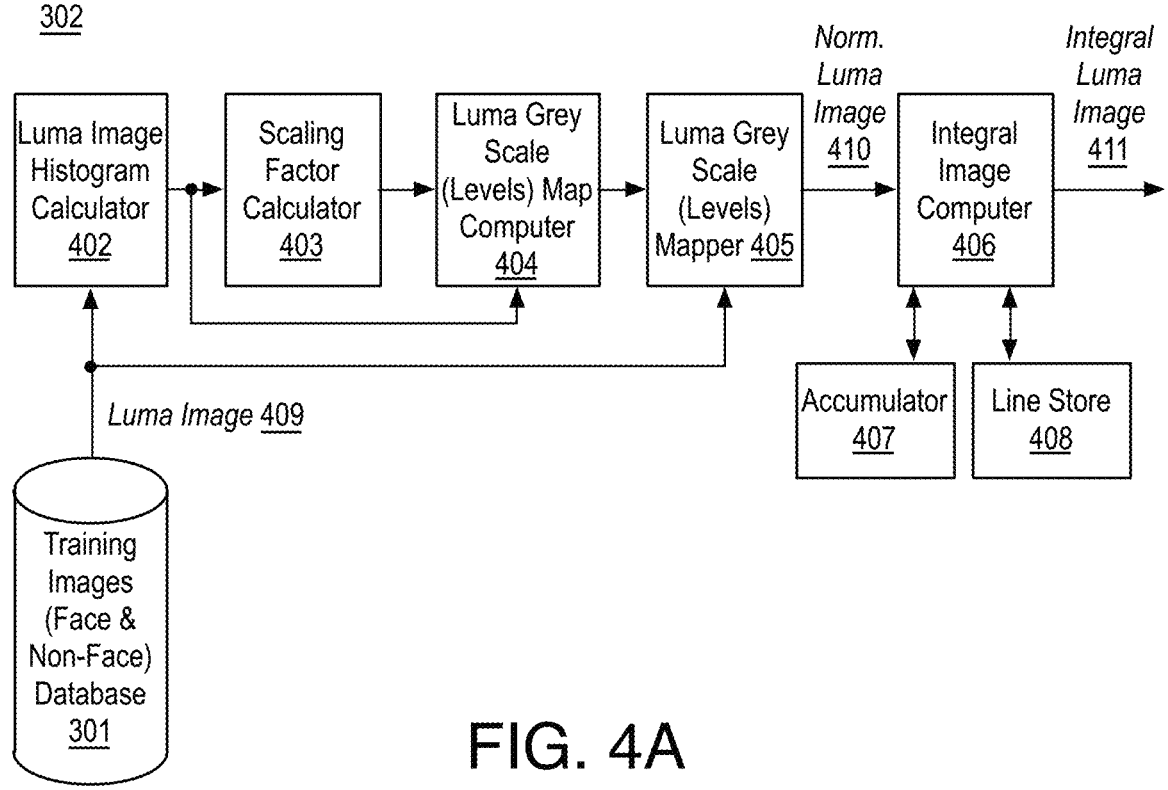
FIG. 4A illustrates an example image normalizer and integral image calculator.

FIG. 4A illustrates an example image normalizer and integral image calculator 302, arranged in accordance with at least some implementations of the present disclosure. As shown in FIG. 4A, image normalizer and integral image calculator 302 may include a luma image histogram calculator 402, a scaling factor calculator 403, a luma grey scale (levels) map computer 404, a luma grey scale map to a luma grey scale (levels) mapper 405, an integral image computer 406, an accumulator 407 and a line store 408. Also as shown, a luma component of each image or frame in training images (faces and non-faces) database 301 may be input to luma image histogram calculator 402 as luma image 409. Luma image histogram calculator 402 may determine or calculate a luma histogram for each luma image 409. Based on the luma histogram of each luma image 409, a scaling factor may be calculated or determined by scaling factor calculator 403 and input along with a luma image histogram (from luma image histogram calculator 402) to luma grey scale (levels) map computer 404, which may determine and output a luma grey scale map to a luma grey scale (levels) mapper 405, which may determine and output a normalized luma image 410. As shown, normalized luma image 410 may be provided or input to an integral image computer 406, which may include or be associated with accumulator 407 and line store 408. For example, integral image computer 406 may include logic for calculating an integral image such that the logic may send a pixel to accumulator 407, which may add it to the value currently in accumulator 407 and return it to integral image computer 406, which may then send the partial result to line store 408 that stores the previous line of integral pixels. Such processing may continue until all pixels in a line and all lines in the frame are complete, resulting in, at the output of integral image computer 406 the generated integral luma image 411, as shown.

Figure 4B:
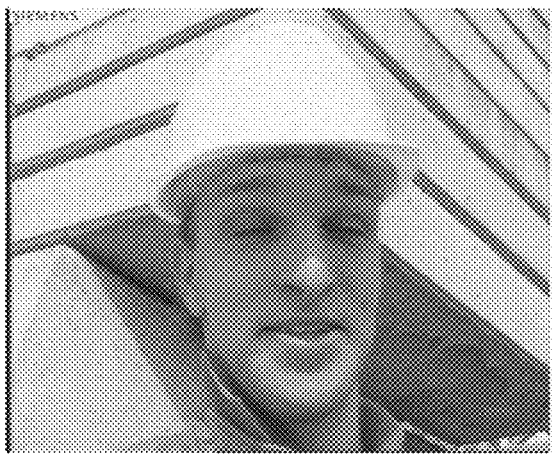
FIG. 4B illustrates an example normalized luma image based on an example luma image.
Figure 4B:
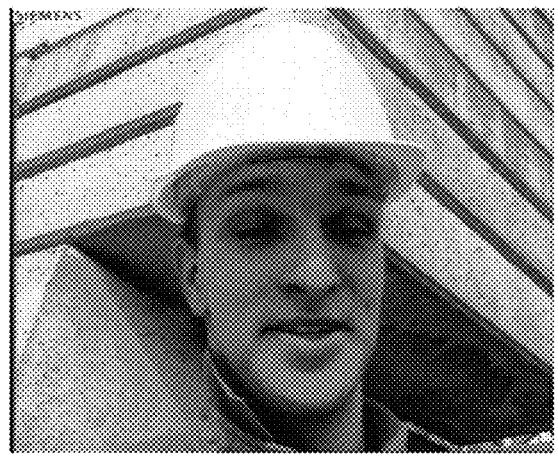

FIG. 4B illustrates an example normalized luma image 410 based on an example luma image 409, arranged in accordance with at least some implementations of the present disclosure. For example, FIG. 4B illustrates the results of image normalization for a luma signal. As shown, the image normalization process may result in increasing of the contrast of the image (e.g., increasing contrast in normalized luma image 410), which may effectively enhance the luma difference between edge area pixels and low detail area pixels. The increase in contrast may make it easier to obtain improved quality results from feature matching. As discussed, the feature matching using rectangular features may be performed on the integral image (e.g., integral luma image 411), which, as discussed, may provide a summation of all pixel values within any given rectangle of the integral image using only 3 addition operations.

Figure 5:
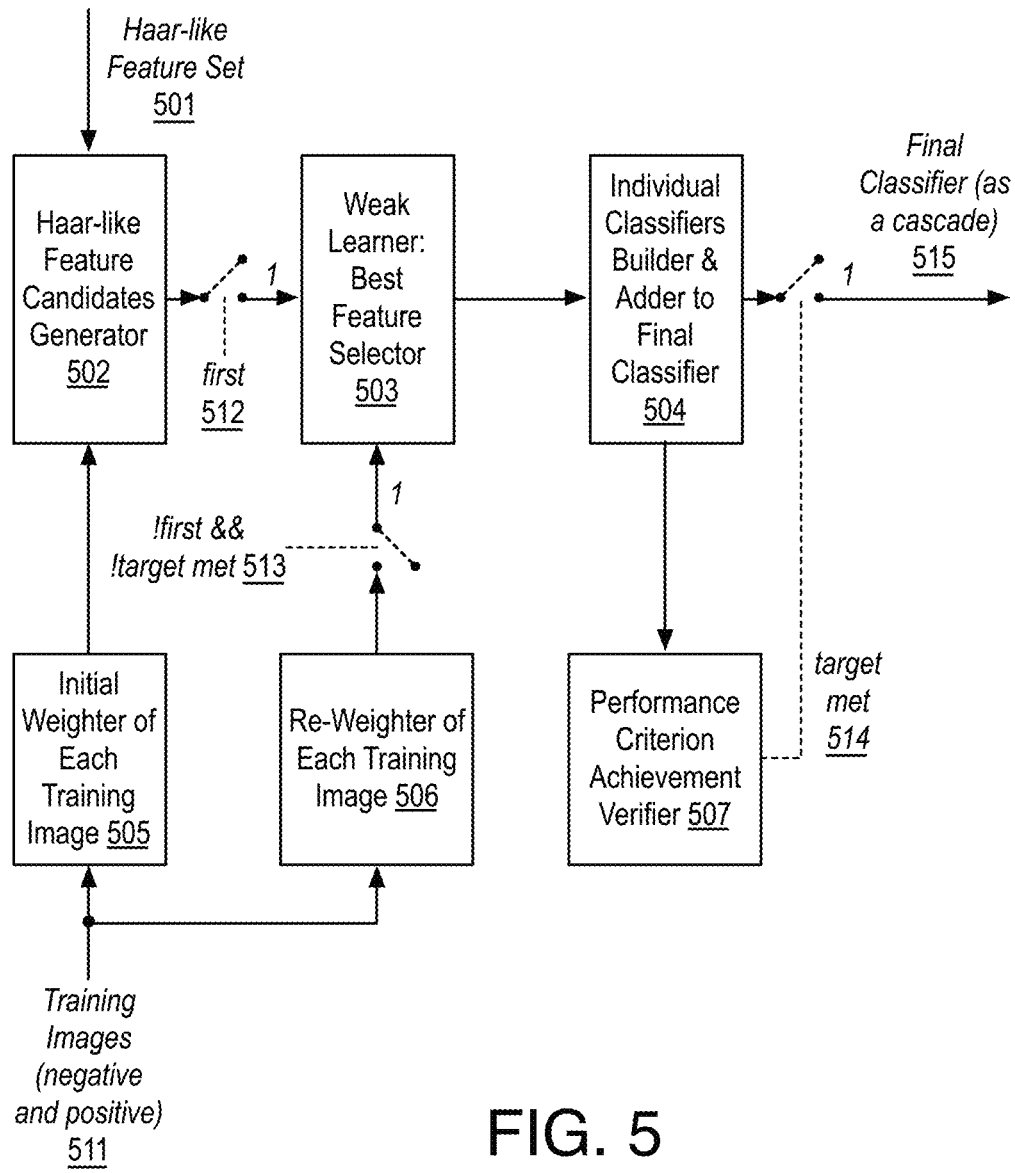
FIG. 5 illustrates an example training for creation of classifiers: adaptive booster.

FIG. 5 illustrates an example training for creation of classifiers: adaptive booster 303, arranged in accordance with at least some implementations of the present disclosure. As shown in FIG. 5, training for creation of classifiers: adaptive booster 303 may include a Haar-like feature candidates generator 502, a initial weightier of each training image module 505, a weak learner: best feature selector 503, an individual classifiers builder and adder to final classifier 504, a performance criterion achievement verifier 507, and a re-weightier of each training image module 506.

Also as shown, a Haar-like feature set 501 (e.g., a rectangular Haar-like feature set) may be provided as one input to Haar-like feature candidates generator 502, which may receive, as another input, initially weighted training images 511 (e.g., having a single weight for all face images and a different single weight for all non-face images) from initial weightier of each training image module 505. Haar-like feature candidates generator 502 may determine rectangular features that are good candidates to identify natural features of a human face such as eyes, a nose, a mouth, etc. For example, at a first iteration, (e.g., the control signal first 512 is true (e.g., 1 in FIG. 5) the feature candidates generated by Haar-like feature candidates generator 502 are input to weak learner: best feature (fi) selector 503 that may initially consider all feature candidates as weak learners, may attempt to determine specific feature candidates that may reduce matching error more than others, may apply adaptive boosting (e.g., applying higher weight to those that are slightly better), may and re-divide the feature set until all features that can reduce matching error at least more than average have been boosted.

As shown, the output of the weak learner: best feature selector 503 may be provided to individual classifiers ($C_j(x)$) builder and adder to final classifier ($C(x)$) 504, which may output classifiers determined up to the current iteration (e.g., thus far) such that a classifier is collection of well placed and boosted features that are to be compared to a quality target (e.g., a high percentage of true detection and very low percentage of false positives) as provided and verified by performance criterion achievement verifier 507. For example, performance criterion achievement verifier 507 may output a target met signal 514 such that individual classifiers builder and adder to final classifier 504 outputs the set of determined classifiers if target met signal 514 true (e.g., 1 in FIG. 5). Otherwise, if target met signal 514 is false, the classifier set determined at the current iteration is not output (e.g., as the true detection or the false positive rate is not acceptable). If it is not the first iteration and the target rate(s) have not been met (e.g., target met signal 513 is true such that either first or target met is false) then the training images may be re-weighted by increasing the weight of some of the images on which the first weak learner was producing at chance again and looking for another classifier that performs a little better than at chance. For example, such re-weighting may be performed by re-weightier of each training image module 506. Such processing may continue (e.g., the loop may iterate) until the discussed target is met (e.g., target met signal 514 is true) at which point a final classifier cascade 515 may be output.

Figure 6A:
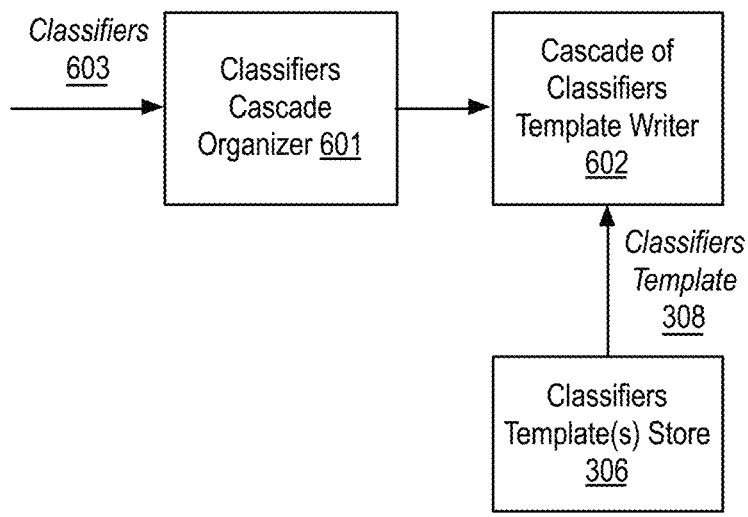
FIG. 6A illustrates an example classifiers cascade template creator.

FIG. 6A illustrates an example classifiers cascade template creator 304, arranged in accordance with at least some implementations of the present disclosure. As shown in FIG. 6A, classifiers cascade template creator 304 may include a classifiers cascade organizer 601 and a cascade of classifiers template writer 602. Also as shown, classifiers 603 may be input to classifiers cascade organizer 601 that may organize classifiers 603 as a cascade. As shown, the organized classifiers may be input to cascade of classifiers template writer 602, which may output classifiers template 308 (e.g., a template of classifiers). Classifiers template may be saved in classifiers template(s) store 306 for future use.

Figure 6B:
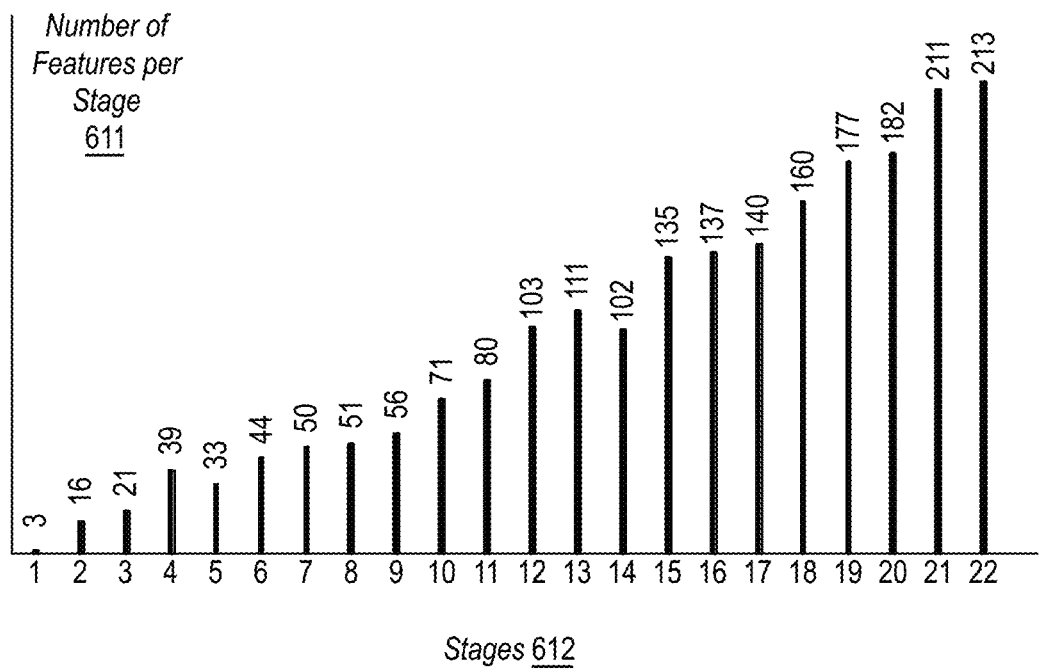
FIG. 6B illustrates an example number of features per classification stage for example classification stages of an example classifier.

FIG. 6B illustrates an example number of features per classification stage 611 for example classification stages 612 of an example classifier 610, arranged in accordance with at least some implementations of the present disclosure. As shown in FIG. 6B, classifier 610 has a total of 22 stages 612 with the classifier for each stage of stages 612 typically being more complex (e.g., in terms of number of features) as compared to its previous stage. For example, the first stage of stages 612 uses a classifier composed of 3 features (e.g., those shown in FIG. 6C(i)), the second stage of stages 612 uses a classifier composed of 16 features (e.g., those shown in FIG. 6C(ii)), and the third, fourth, fifth sixth, and seventh stages use classifiers composed of 21, 39, 33, 44, and 50 features, respectively. Also as shown, the last stage (e.g., stage 22) of states 612 uses a classifier composed of 213 features.

Figure 6C:
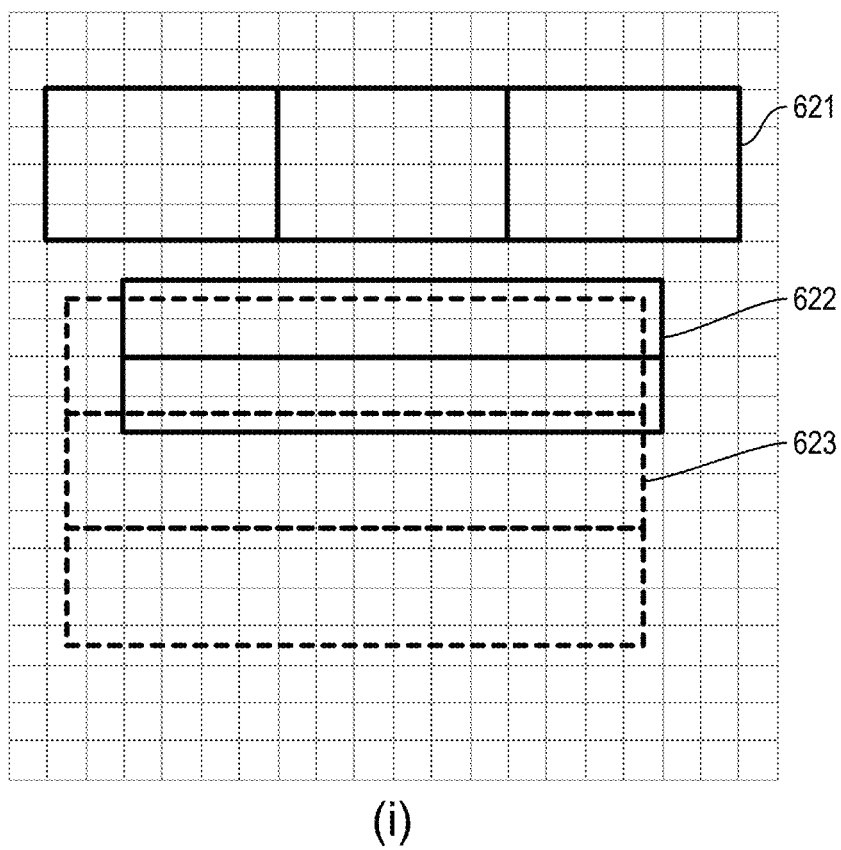
FIG. 6C illustrates example features of stages of an example classifier.
Figure 6C:
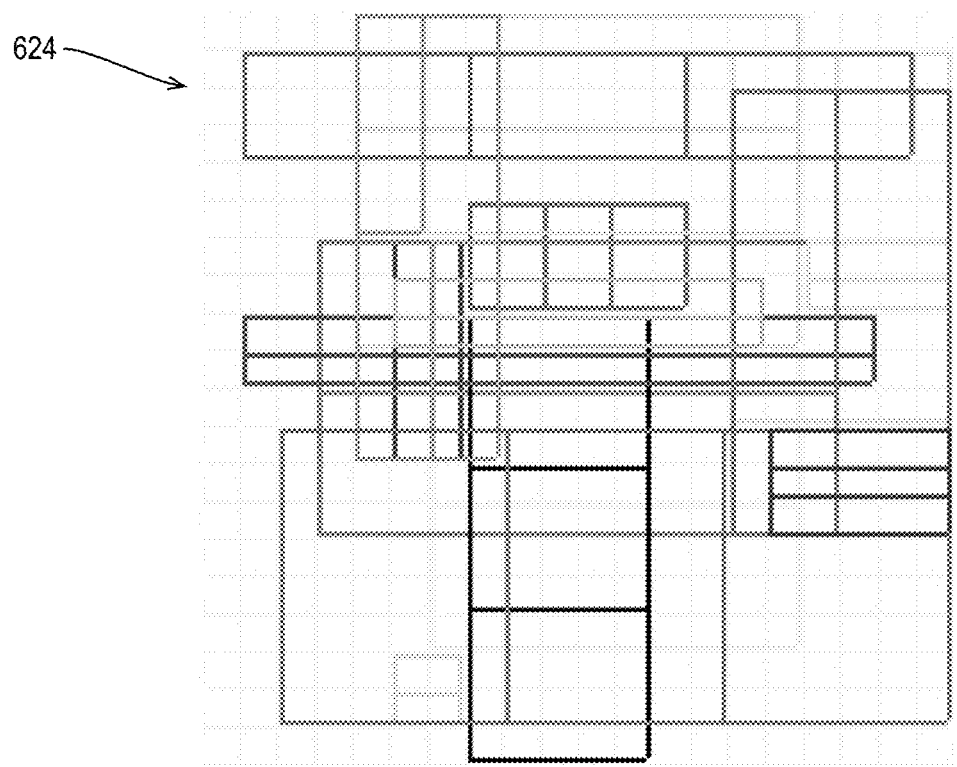

FIG. 6C illustrates example features of stages of an example classifier, arranged in accordance with at least some implementations of the present disclosure. As shown in FIG. 6C(i), a first stage of a classifier may have three features 621, 622, 623 (e.g., though shown in a 20×20 window, features 621, 622, 623 may be scaled to any suitable window size). As shown in FIG. 6C(ii), a second stage of a classifier may have 16 features 624. Although example stages, feature numbers per stage, and features are presented, any suitable number of stages, features per stage, and features may be provided.

As discussed, after a feature template (e.g., organized in a cascade) is generated in a learning or training phase, face detection may be performed by examining a window within an image (or frame) and evaluating the selected features in a cascade manner. For example, if the window fails at the first stage in the cascade (e.g., the first set of features yield no positive outcome for a face), the system may move the window to the next area of the frame, and so on. Since, in some examples, only about 0.01% of windows will pass the first stage this cascade type of testing makes the detection process fast. As discussed, a face is detected if all cascades of features pass.

Figure 7A:
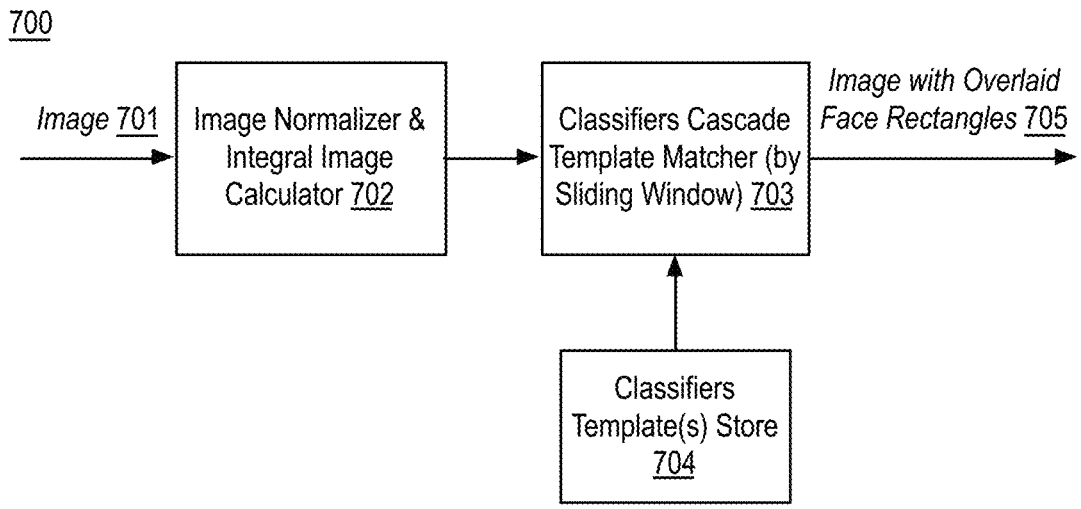
FIG. 7A illustrates an example face detection system.

FIG. 7A illustrates an example face detection system 700, arranged in accordance with at least some implementations of the present disclosure. For example, face detection system 700 may provide a Viola-Jones face detection system for images or frames. As shown in FIG. 7A, face detection system 700 may include a normalizer and integral image calculator 702, a classifiers cascade template matcher (by sliding window) 703, and a classifiers template(s) store 704.

Also as shown, an image 701 (or images image or frames) on which face detection is to be performed may be input image normalizer and integral image calculator 702, which may normalize the contrast of image 701 and determine an integral image. Normalizer and integral image calculator 702 may operate in the same manner as image normalizer and integral image calculator 302 (please refer to FIGS. 3A and 4A). Such operations will not be repeated for the sake of brevity. The normalized image output by image normalizer and integral image calculator 702 may be provided to classifiers cascade template matcher 703 that may search within the normalized luma image using classifiers from the discussed offline training and stored in classifiers template(s) store 704 (e.g., in analogy to classifiers template store 306) for potential matches of windows with face-like properties. As shown, classifiers cascade template matcher 703 may output final detected face windows in image 701 by overlaying passing windows on classifiers cascade template matcher 703 and/or identifying the position and the size of such windows. In the example of FIG. 7, classifiers cascade template matcher 703 provides an image with overlaid face rectangles 705 with such windows overlaid over 701.

Figure 7B:
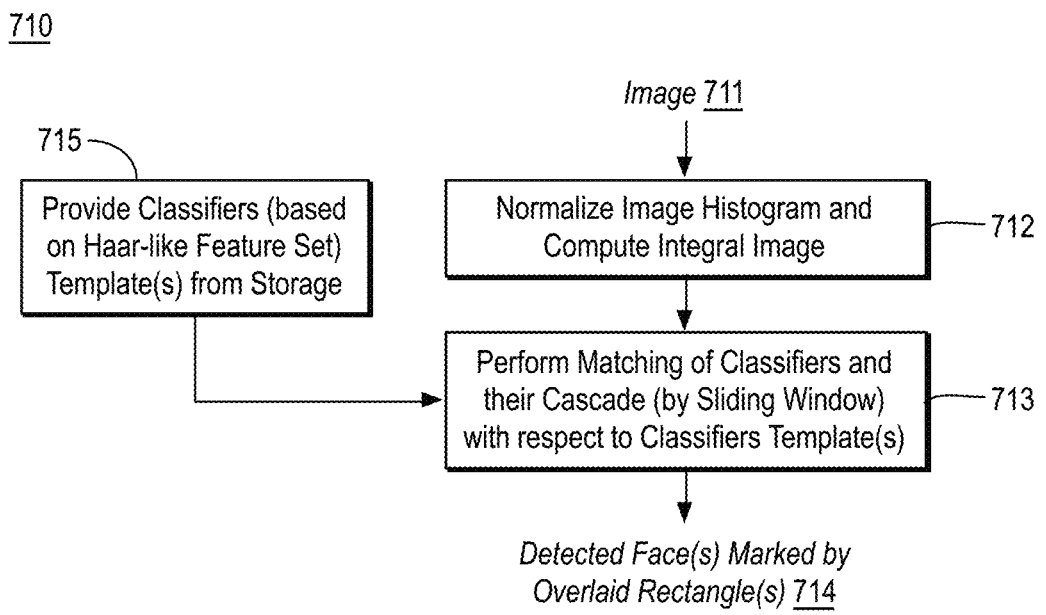
FIG. 7B illustrates an example process for performing face detection.

FIG. 7B illustrates an example process 710 for performing face detection, arranged in accordance with at least some implementations of the present disclosure. For example, process 710 may be performed by face detection system 700. As shown in FIG. 7B, an image 711 in which face(s) need to be detected may be input to operation 712, "Normalize Image Histogram and Compute Integral Image", which may normalize image 711 based on a histogram and may determine, for image 711, an integral image that may make feature/classifiers matching efficient as discussed above. The output of operation 712 may be provided to operation 713, "Perform Matching of Classifiers and their Cascade (by Sliding window) with respect to Classifiers Template(s)", which may, based on stored classifiers provided by operation 715, "Provide Classifiers (based on Haar-like Feature Set) Template(s) from Storage", perform classifiers matching in a cascade structure on the normalized luma image from operation 712. The outcome of operation 713 is the detected face windows (one or more) either overlaid on image 711 and/or identified by position and size.

Using such techniques, each sliding window being tested for face area must pass all features in all stages of the cascade classifier for a face region to be declared. Table 1 (below) shows an example number and sizes of sliding windows used in such techniques for three different image resolutions. For example, a starting sliding window size of 20×20 may be used. Furthermore, the frontal face template used may contains 22 stages, each having a number of features such as those discussed with respect to FIG. 6B. The probe window may be tested in terms of sums of pixels in the rectangle areas of Haar-like features. The resulting sum of a features (e.g., computed from integral image) may be compared to a feature threshold and it may either pass or fail. When all features pass in a stage, a cumulative stage sum may also be required to pass a corresponding stage threshold. Once the probe window is finished with processing the stages, the probe window is moved to a next position (e.g., in raster scan order) and such testing is performed again. For example, a window of size N×N being slid in a frame of size W×H is tested at a total of (W−N)×(H−N) positions. Once all probe windows at all positions are tested, the passing windows may undergo a pruning stage in which isolated windows are removed and strongly overlapping windows may be merged into a single representative window that may be declared as the detected face area. The number and sizes of such probe windows may be determined based on image resolution. As discussed, Table 1 (below) shows an example number and sizes of sliding windows for Common Intermediate Format (CIF), 480p, and 1080p resolutions.

Figure 8A:
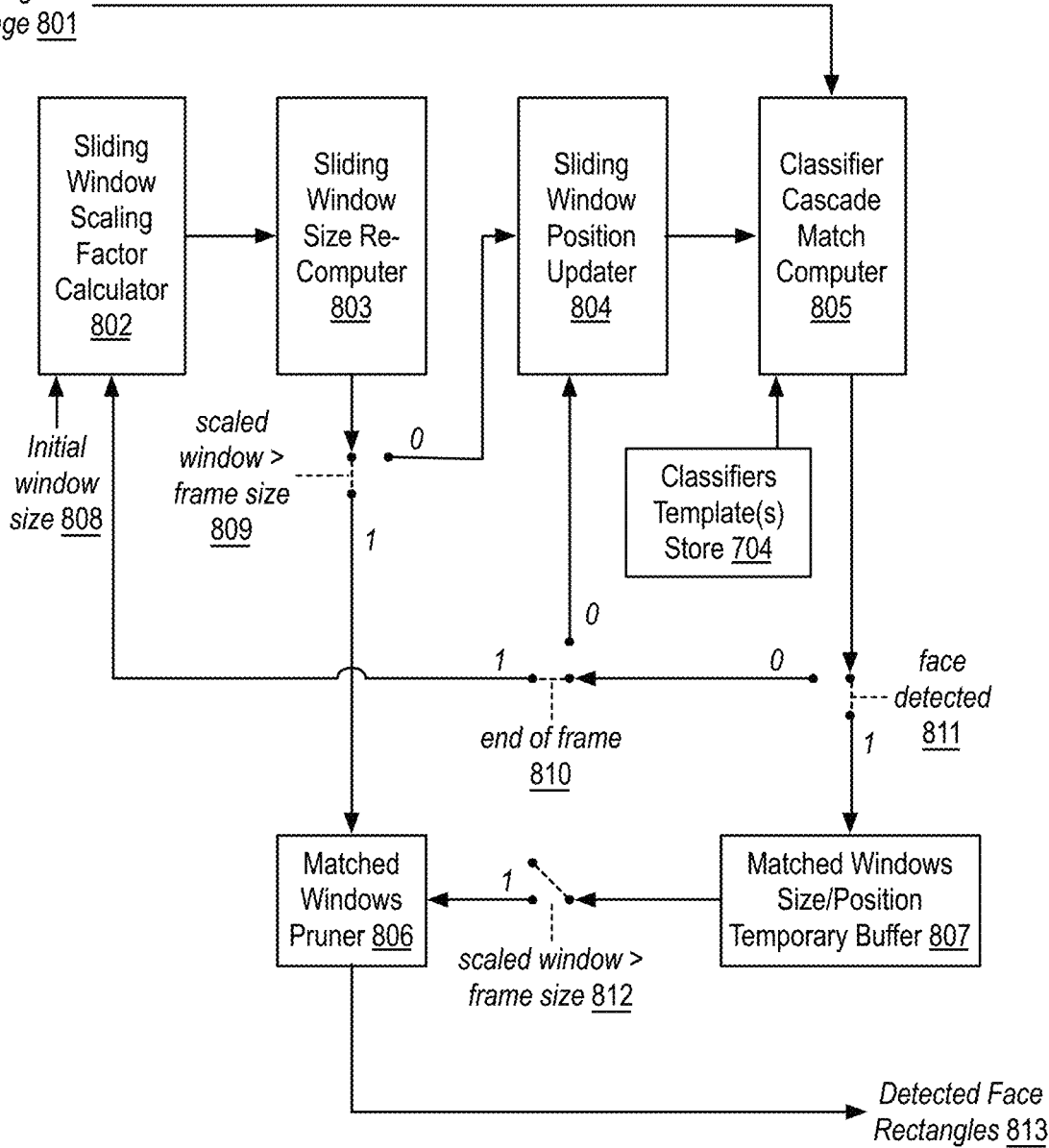
FIG. 8A illustrates an example classifiers cascade template matcher.

FIG. 8A illustrates an example classifiers cascade template matcher 703, arranged in accordance with at least some implementations of the present disclosure. As shown in FIG. 8A, classifiers cascade template matcher 703 may include a sliding window scaling factor calculator 802, a sliding window size re-computer 803, a sliding window position updater 804, a matched windows pruner 806, a classifier cascade match computer 805, a matched windows size/position temporary buffer 807, Also as shown, an initial window size 808 may be input to sliding window scaling factor calculator 802, which may output a scaling factor (e.g., 1.1 or the like) to sliding window size re-computer 803. Sliding window size re-computer 803 may output a re-scaled window size to either sliding window position updater 804 or matched windows pruner 806 depending on scaled window>frame size signal 809. For example, if the current scaled window is not greater than the frame size (e.g., scaled window>frame size signal 809 is 0), the re-scaled window size may be provided to sliding window position updater 804. If the current scaled window is greater than the frame size (e.g., scaled window>frame size signal 809 is 1), the re-scaled window size may be provided to matched windows pruner 806.

When the re-scaled window size is provided to sliding window position updater 804, sliding window position updater 804 provides updated window position for search to classifier cascade match computer 805. As shown, classifier cascade match computer 805 has two other inputs: an integral image 801 (e.g., from normalizer and integral image calculator 702, please refer to FIG. 7A) and classifiers from training stored in classifiers template(s) store 704. The output of classifier cascade match computer 805 includes information about whether a face is detected for the current sliding window or not. If a face is detected as indicated by face detected signal 811 (e.g., face detected signal 811 is 1), the size and position of the window are stored in matched windows size/position temporary buffer 807. The size of the stored window may be examined to determine if it is larger than the frame size as indicated by scaled window>frame size signal 812 and, if so (e.g., scaled window>frame size signal 812 is 1), the found window (and other windows near it stored in the same temporary buffer) may be provided to matched windows pruner 806, which may output detected face rectangles.

If no face was detected (e.g., face detected signal 811 is 0), an end of frame signal 810 may be examined and if it is true (e.g., end of frame signal 810 is 1) and, if so sliding window scaling factor calculator 802 may be reset to calculate or use the next scaling factor and the processing loop may continue. Alternatively, if end of frame signal 810 is false (e.g., end of frame signal 810 is 0), a signal is provided to sliding window position updater 804" to allow the sliding window to go to the next position and the process of trying to match classifiers at the next position or location classifier cascade match computer 805 may continue.

Figure 8B:
FIG. 8B illustrates example face detection results.
Figure 8B:

FIG. 8B illustrates example face detection results, arranged in accordance with at least some implementations of the present disclosure. For example, FIG. 8B illustrates results of face detection on the Foreman video sequence at CIF (e.g., 352×288) resolution and 30 frames/sec. As shown in FIG. 8B(i), image 821 may include all windows that passed the test of all stages of the face classifier cascade including false positives (e.g., the separate window on bottom left). FIG. 8B(ii) illustrates isolated positive windows removed and other strong positive overlapping windows solidified, merged, and replaced by a single representative window in image 822. For example, image 821 may include all windows that passed matching and image 822 may provide windows (e.g., a single window in image 822) after pruning and/or combining the passing windows.

Figure 8C:
FIG. 8C illustrates example face detection results.
Figure 8C:

FIG. 8C illustrates example face detection results, arranged in accordance with at least some implementations of the present disclosure. For example, FIG. 8C(i) illustrates an example input image 701 and FIG. 8C(ii) illustrates an example image with overlaid face rectangles 705 (please refer to FIG. 7A). For example, FIG. 8C may summarize results of face detection on a frame of the Foreman video sequence, shown in FIG. 8C(i), illustrating the final detected face marked with an overlaid window in FIG. 8C(ii).

As discussed, a number sliding windows of various sizes may be used in face detection. Table 1 below illustrates example numbers and sizes of probe windows (e.g., sliding windows) used for the three example image or frame resolutions (e.g., low definition (LD) video such as CIF (352×288), standard definition (SD) video such as 480p (704×352), and high definition (HD) video such as 1080p (1920×1080)).

For each resolution, square probe windows starting with a size of 20×20 may be used such that the probe windows may increase by a scale factor of 1.1 in each dimension (and rounded to next size) until the windows size (even in one direction) is just less than the size of the picture (e.g., a next window size with a size, in either direction, larger than the picture or frame size is not evaluated). For example, for CIF video the smallest probe window may have a size of 20×20 and the largest window may have a size 262×262 such that a total of 28 probe window sizes are used with each window 1.1 times the size of the previous window (and rounded up) as shown in Table 1. For 480p video, the smallest window size may again be 20×20 and the largest window size may be 465×465 such that a total of 34 probe window sizes are used with each window 1.1 times the size of the previous window (and rounded up). Similarly, for 1080p video, the smallest window size may be 20×20 and the largest window size may be 996×996 such that a total of 42 probe window sizes are used with each window 1.1 times the size of the previous window (and rounded up).

A Viola-Jones Face Detector, when applied on images or low resolution/frame rate video conferencing video content may have advantages over other techniques. For example, such face detection techniques may be efficient in selecting features, relatively fast, generally robust in scale and invariant to location of features, and generic and therefore may be extended to detection of other types of objects other than faces. However, Viola-Jones face detection suffers from a number of limitations such as being effective on frontal images of faces only, having low detection rates/lower robustness for the cases where faces are rotated beyond 45 degrees around horizontal or vertical axes, being sensitive to changes in lighting conditions, and, in some examples, resulting in multiple detections of the same face due to overlapping sub-windows.

For example, while Viola-Jones face detection is practical (e.g., provides good tradeoffs between quality and speed) for images or video conferencing video (e.g., may process 384×288 video at 15 fps on a 700 MHz processor), it may suffer from several problems when dealing with applications that involve general purpose, high resolution/high framerate video content, as is the case for higher quality video coding applications. First, a Viola-Jones face detector may use a limited set of templates for faces under certain restrictions (e.g., orientation, pose, profile, facial hair, etc.) can suffer from lack of sufficient robustness due to true negatives (e.g., undetected human faces in several frames of general purpose video). Second, a Viola-Jones face detector may perform face detection in each video frame independently and can therefore suffer from lack of sufficient robustness due to true negatives (e.g., undetected faces in many frames of video). Third, a Viola-Jones face detector may only use a luma signal for face detection and can therefore from a high rate of random matches (e.g., in tree leaves, rocks, etc.) that result in falsely detected faces (e.g., false positives). Fourth, Viola-Jones face detection may not differentiate between human and non-human (e.g. animal) faces such that false positives may be provided (e.g., if the goal is to detect human faces only) due to the similarity of generic facial (e.g., forehead, eyes, nose, mouth, etc.) features for animals. Fifth, a Viola-Jones face detector may be slow on general

TABLE 1

Number and Sizes of Probe Windows for Face Detection

| Resolution | Number of Probe Windows in Face Detection | Sizes of Probe Windows in Face Detection |
|---|---|---|
| Low Definition CIF (352 × 288) | 28 | [20 × 20] [22 × 22] [24 × 24] [27 × 27] [29 × 29] [32 × 32] [35 × 35] [39 × 39] [43 × 43] [47 × 47] [52 × 52] [57 × 57] [63 × 63] [69 × 69] [76 × 76] [84 × 84] [92 × 92] [101 × 101] [111 × 111] [122 × 122] [135 × 135] [148 × 148] [163 × 163] [179 × 179] [197 × 197] [217 × 217] [238 × 238] [262 × 262] |
| Standard Definition 480p (704 × 480) | 34 | [20 × 20] [22 × 22] [24 × 24] [27 × 27] [29 × 29] [32 × 32] [35 × 35] [39 × 39] [43 × 43] [47 × 47] [52 × 52] [57 × 57] [63 × 63] [69 × 69] [76 × 76] [84 × 84] [92 × 92] [101 × 101] [111 × 111] [122 × 122] [135 × 135] [148 × 148] [163 × 163] [179 × 179] [197 × 197] [217 × 217] [238 × 238] [262 × 262] [288 × 288] [317 × 317] [349 × 349] [384 × 384] [422 × 422] [465 × 465] |
| High Definition 1080p (1920 × 1080) | 42 | [20 × 20] [22 × 22] [24 × 24] [27 × 27] [29 × 29] [32 × 32] [35 × 35] [39 × 39] [43 × 43] [47 × 47] [52 × 52] [57 × 57] [63 × 63] [69 × 69] [76 × 76] [84 × 84] [92 × 92] [101 × 101] [111 × 111] [122 × 122] [135 × 135] [148 × 148] [163 × 163] [179 × 179] [197 × 197] [217 × 217] [238 × 238] [262 × 262] [288 × 288] [317 × 317] [349 × 349] [384 × 384] [422 × 422] [465 × 465] [511 × 511] [562 × 562] [618 × 618] [680 × 680] [748 × 748] [823 × 823] [905 × 905] [996 × 996] | purpose, high resolution (e.g., 1080p and above) video content, often reaching only less than 1 frame/sec even on 3 GHz processors, which may be insufficient for practical applications. Sixth, a Viola-Jones face detector may only detects face windows (e.g., rectangles) and not free-form face regions within the face windows, which may be needed for encoding efficiently in current applications.

Such shortcomings are addressed using the techniques discussed herein. For example, the techniques discussed herein may provide highly robust and fast face detection, face region extraction, and face tracking in video scenes including faster processing and better accuracy in terms of detection rate and in terms of detected face area boundaries. For example, the techniques discussed herein may improve on limitations of speed of detection and resolution of video by supplementing face detection with skin-tones detection such that face(s) may be more robustly detected without compromising on speed. Furthermore, the techniques discussed herein may improve on face detection on each video frame independently by providing tracking of detected faces across frames to improve on missed detected and robustness. Also, the techniques discussed herein may improve on the limitation of only uses luma signal for face detection by adding a significant validation step that requires validation of detected face(s) for valid human skin-tones to reduce random matches (e.g., from clocks, tree leaves, rocks, etc.). Further still, the techniques discussed herein may improve on the lack of differentiation between human and non-human (e.g. animal) faces by using human skin-tone colors as a differentiator and/or validator, which may provide more reliable face detection. Also, the techniques discussed herein may improve processing speed, particularly on high resolution (1080p or higher) video content applying the face detector on a significantly down sampled video frame (e.g., by 4 or 8 in each direction) and/or by applying the face detector on key-frames only and temporally tracking movement of face(s) in between key-frames. Finally, the techniques discussed herein may improve on the detection of rectangular face windows detecting, in addition to face windows, free-form face regions within and around the face windows by efficiently computing a skin tone map and applying it to detected face windows and to skin tone regions connected to the face windows to accurately represent face regions.

Such techniques may improve overall performance by using a downsampled luma plane (e.g., instead of a full size luma plane) for face detection and by performing face detection only on key frames and with detected faces tracked in non-key frames. Such techniques may improve robustness by eliminating false positives by face validation that uses a skin probability map to evaluate detected faces (e.g., if the overall probability of skin within a detected face region is low, the detected face may be dropped (invalidated)). Furthermore, such techniques may improve robustness and accuracy by using validated faces to further enhance the skin probability map such that the enhanced skin probability map may be used to create a binary skin map in and around the face regions, which, in turn, may be used to create a more accurate, complex free-shaped or free-form face region.

Figure 9:
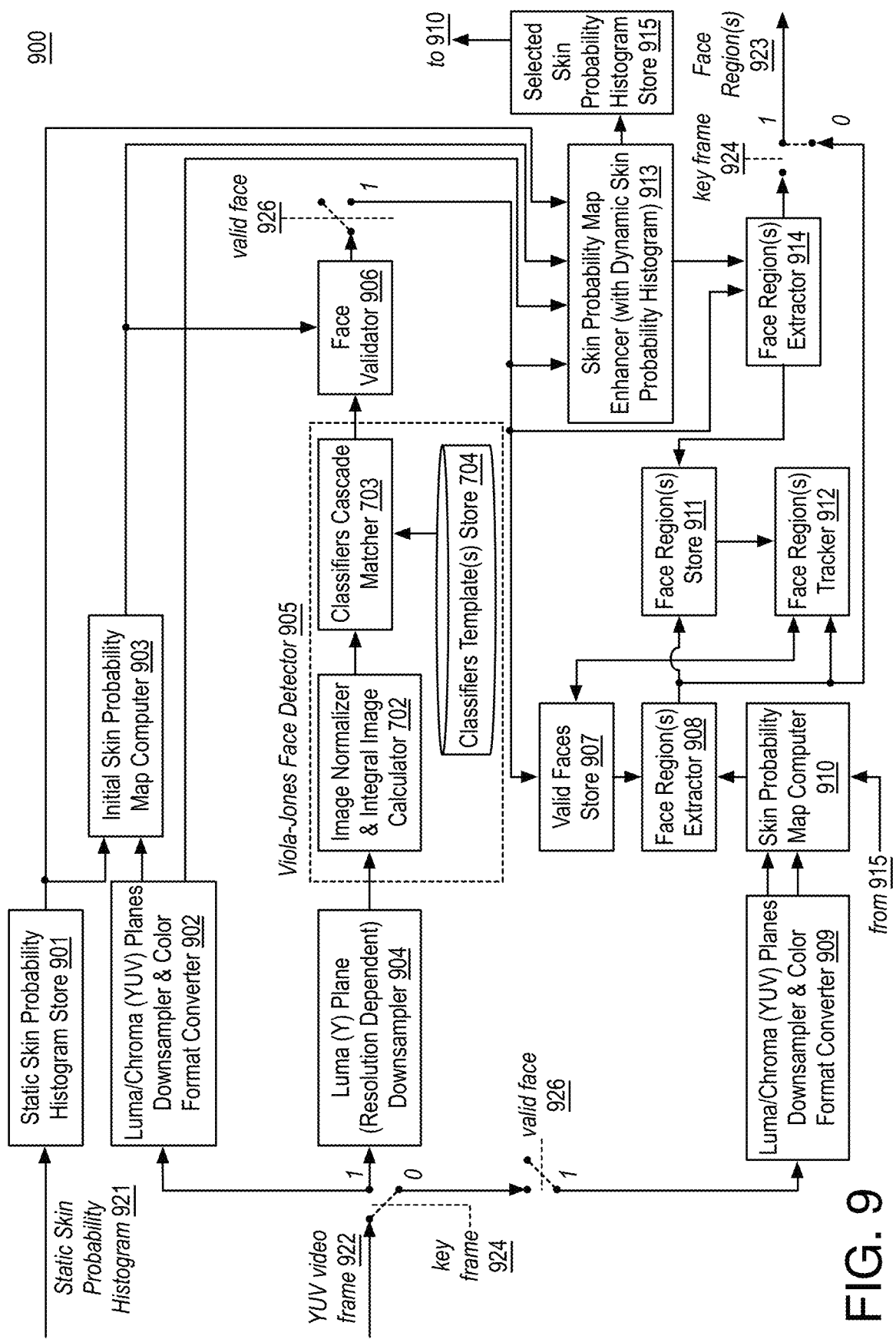
FIG. 9 illustrates a block diagram of an example system for face region detection and tracking.

FIG. 9 illustrates a block diagram of an example system 900 for face region detection and tracking, arranged in accordance with at least some implementations of the present disclosure. As shown in FIG. 9, system 900 may include a luma (Y) plane downsampler 904, a Viola-Jones face detector 905 (which may include frame normalizer and integral frame calculator 702, classifiers cascade template matcher 703, and classifiers template(s) store 704), a face validator 906, a luma/chroma (YUV) planes downsampler and color space format converter 902, a initial skin probability map computer 903, a static skin probability histogram store 901, a skin probability map enhancer 913, a face region(s) extractor 914, a selected skin probability histogram store 915, a luma/chroma (YUV) planes downsampler and color space format converter 909, a skin probability map computer 910, a face region(s) extractor 908, a face region(s) store 911, a face region(s) tracker 912, and a valid faces store 907.

Also as shown in FIG. 9, an input image or video frame 922 may be received by system 900. Input image or video frame 922 may include any suitable image or video data such as an input (YUV 4:2:0) frame of video or the like. As shown, input image or video frame 922 may be processed differently depending on whether or not it is a key frame (e.g., as provided by key frame signal 924). The determination of whether input image or video frame 922 is key-frame or not may be made using any suitable technique or techniques such as whether the frame index corresponding to input image or video frame 922 is a multiple of key frame index and/or whether input image or video frame 922 is a scene change frame, or the like.

If input image or video frame 922 is a key frame (e.g., key frame signal 924 is true or 1), the luma (Y) plane of input image or video frame 922 may be downsampled by luma (Y) plane downsampler 904. As shown, luma (Y) plane downsampler 904 may perform resolution dependent downsampling. The downsampled luma plane (e.g., the downsampled frame) may be normalized and a corresponding integral frame may be computed by frame normalizer and integral frame calculator 702 of Viola-Jones face detector 905. The integral frame may be searched for features using features stored in classifiers template(s) store 704 by classifiers cascade template matcher 703. Detected feature windows may be validated by face validator 906 and stored in valid faces store 907.

Furthermore, potentially in parallel, input image or video frame 922 may be analyzed for presence of human skin-tones. As shown, luma/chroma (YUV) planes downsampler and color space format converter 902 may downsample luma and chroma and the convert color space of input image or video frame 922 to the Yrg color space. Initial skin probability map computer 903 may receive the downsampled and color converted image or frame and a static skin probability histogram 921 from static skin probability histogram store 901 and initial skin probability map computer 903 may determine an initial skin probability map. The resultant initial skin probability map may be input to face validator 906, which may provide a valid face signal 926 (e.g., a binary signal per face window identifying if a face window includes a valid face or not).

If one or more valid face windows are found (e.g., as indicated by valid face signal 926 being true or 1), free-form face regions may be extracted. To extract free-form face regions, skin probability map enhancer 913 (which may implement a dynamic skin probability histogram as shown) may receive valid faces from face validator 906, a skin probability map from initial skin probability map computer 903, and a training based skin probability histogram from static skin probability histogram store 901, and skin probability map enhancer 913 may compute an improved or enhanced skin probability map. The enhanced skin probability map and valid faces from face validator 906 may be input to face region(s) extractor 914. Face region(s) extractor 914 may locate and output free-form face regions. As shown, skin probability map enhancer 913 may also output a best or selected histogram from among two choices (e.g., a static skin probability histogram and a dynamic skin probability histogram and store the selected histogram in selected skin probability histogram store 915.

Returning to the determination of whether input image or video frame 922 is a key-frame. If input image or video frame 922 is not a key frame (e.g., key frame signal 924 is false or 0) and is expected to contain one or more valid faces (e.g., as indicated by valid face signal 926), luma/chroma (YUV) planes downsampler and color space format converter 909 may downsample luma and chroma and convert the convert color space of input image or video frame 922 to the Yrg color space. As shown, skin probability map computer 910 may receive the downsampled and color converted image or frame and a selected histogram from selected skin probability histogram store 915 and skin probability map computer 910 may compute a skin probability map. The resultant skin probability map may be input to face region(s) extractor 908, which may locate and output free-form face regions. As shown, the free-form face regions may be input with the output of face region(s) store 911 to face region(s) tracker 912. Face region(s) tracker 912 may track free-from face regions and store the free-from face regions for later use.

As discussed, system 900 may provide a key-frame path and a non-key frame path to provide extraction of free-form face regions. For the key-frame path, such free-form face regions extraction may include explicitly locating face regions and, for the non-key frame path, such free-form face regions extraction may include implicitly tracking key-frame located face regions. Discussion now turns to components of system 900.

Figure 10A:
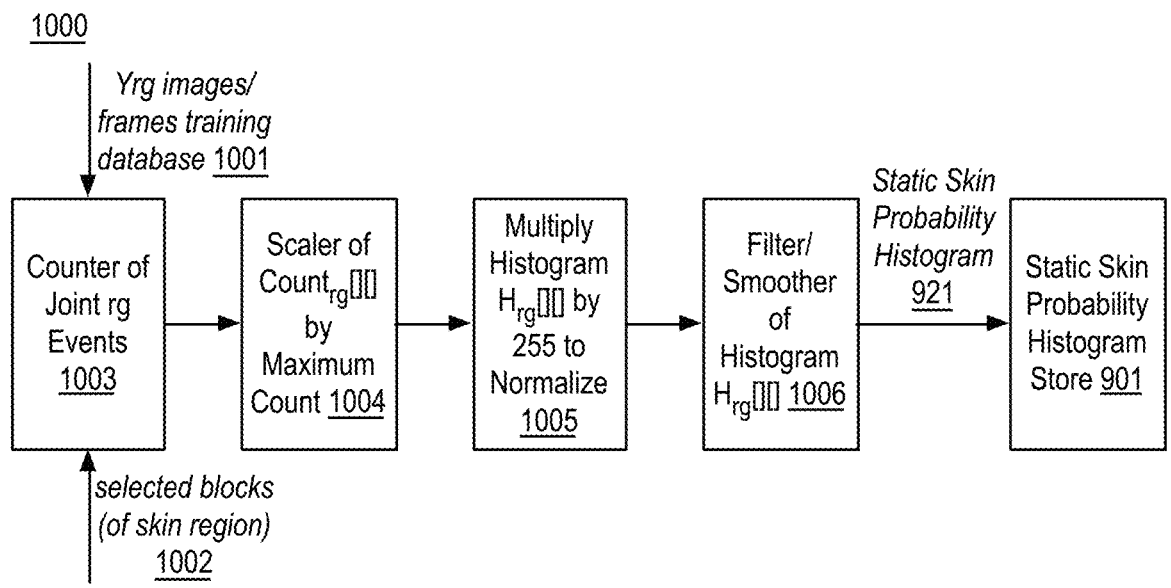
FIG. 10A illustrates an example static skin probability histogram computer.

FIG. 10A illustrates an example static skin probability histogram computer 1000, arranged in accordance with at least some implementations of the present disclosure. For example, static skin probability histogram computer 1000 may be used in a training phase (e.g., offline with respect to system 900 of FIG. 9) to generate a histogram of skin probabilities, referred to herein as a static histogram or static skin probability histogram as it is computed a priori. As shown in FIG. 10A, static skin probability histogram computer 1000 may include a counter of joint rg events module 1003, a scaler of $Count_{rg}[\ ][\ ]$ by maximum count module 1004, a multiply histogram $H_{rg}[\ ][\ ]$ by 255 to normalizer module 1005, and a filter/smoother of Histogram $H_{rg}[\ ][\ ]$ module 1006.

Also as shown, training images or video frames 1001 may be input to counter of joint rg events module 1003. For example, training images or video frames 1001 may include training images or video frames in Yrg format along with selected blocks (e.g., by hand or other means) of skin regions of the training images or frames. Counter of joint rg events module 1003 may count (e.g., as characterized by $Count_{rg}[\ ][\ ]$) how many times each combination of rg values events are present in selected skin area blocks. As shown, $Count_{rg}[\ ][\ ]$ may be provided to scaler of $Count_{rg}[\ ][\ ]$ by maximum count module 1004, which may divide $Count_{rg}[\ ][\ ]$ by a maximum value of such counts to compute a normalized histogram $H_{rg}[\ ][\ ]$. The normalized histogram may be provided to multiply histogram $H_{rg}[\ ][\ ]$ by 255 to normalize module 1005, which may rescale $H_{rg}[\ ][\ ]$ to the 0-255 range with the resulting array characterized as a skin probability histogram. The skin probability histogram may be smoothed by filter/smoother of Histogram $H_{rg}[\ ][\ ]$ module 1006 and the resulting histogram may be static skin probability histogram 921, which may be output and stored in static skin probability histogram store 901 (please refer to FIG. 9).

Figure 10B:
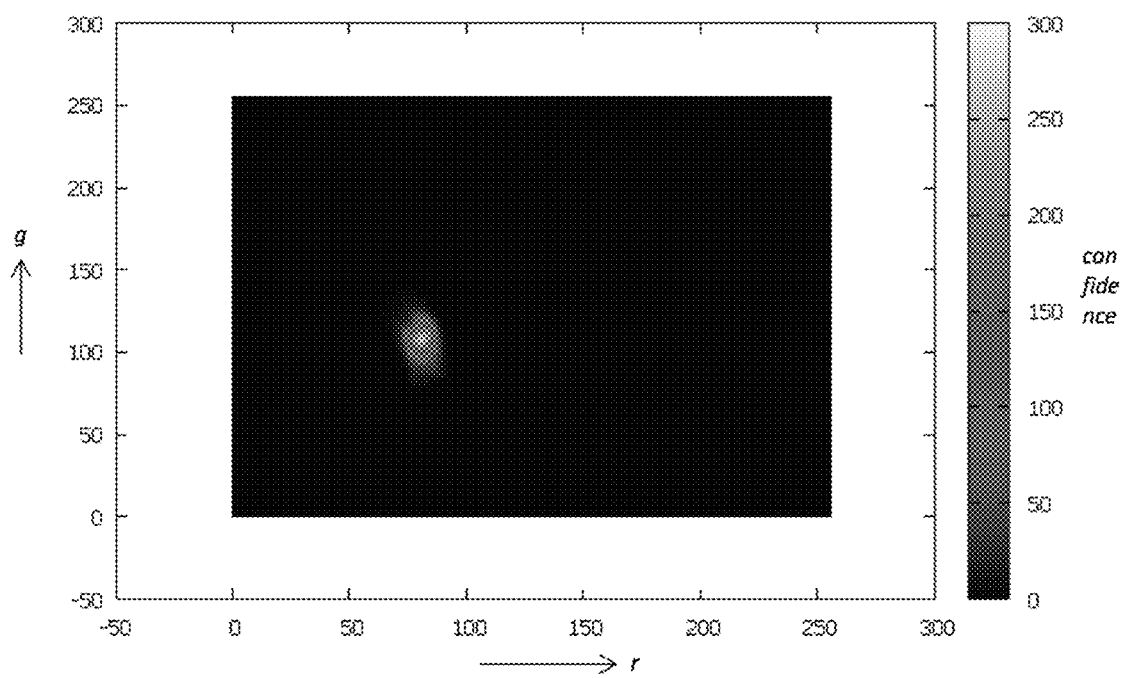
FIG. 10B illustrates an example skin-tones rg color histogram.

FIG. 10B illustrates an example skin-tones rg color histogram 1010, arranged in accordance with at least some implementations of the present disclosure. As shown in FIG. 10B, skin-tones rg color histogram 1010 shows high probability events in rg color space normalized to value of 255. The x-axis of skin-tones rg color histogram 1010 represents the value of the 'r' component, the y-axis represents the value of the 'g' component, and the z-axis (not shown) represents the frequency of joint rg events. For example, the dark areas of skin-tones rg color histogram 1010 represent joint rg events of low probability while the lighter areas represents high probability events. For example, dark greyish regions correspond to somewhat lower confidence rg events that represent skin tone/face colors whereas the lighter greyish regions correspond to higher confidence rg events that represent skin tone/face colors.

Figure 11:
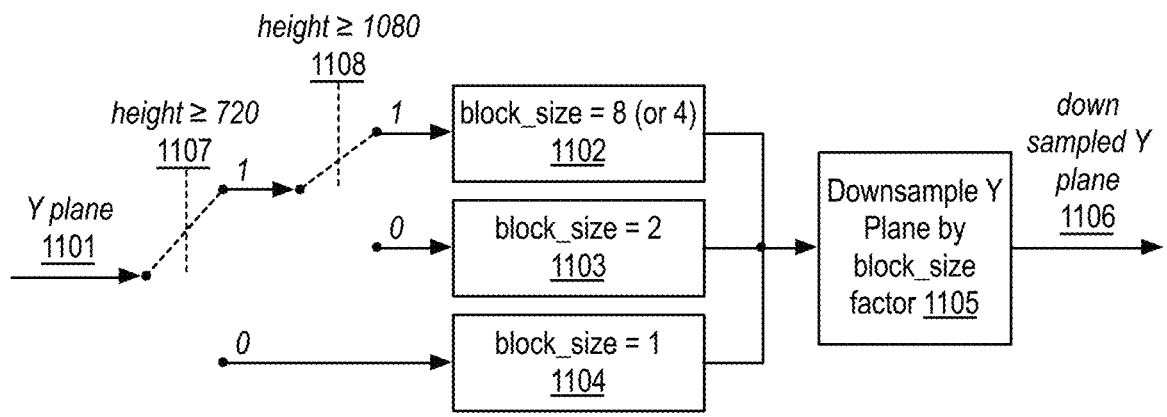
FIG. 11 illustrates an example luma (Y) plane downsampler.

FIG. 11 illustrates an example luma (Y) plane downsampler 904, arranged in accordance with at least some implementations of the present disclosure. For example, luma (Y) plane downsampler 904 may provide a resolution dependent luma plane downsampler. As shown in FIG. 11, luma (Y) plane downsampler 904 may include a block_size=8 (or 4) module 1102, a block_size=2 module 1103, a block_size=1 module 1104, and a downsample Y plane by block_size factor module 1105.

Luma (Y) plane downsampler 904 may subsample the input luma plane of input image or video frame 922 responsive to the resolution of input image or video frame 922, which may reduce face detection processing time by applying higher downsampling factors to higher resolution content while the low resolution content is downsampled at a lower factor or not downsampled. As shown, a resolution of a luma (Y) plane 1101 of input image or video frame 922 may be examined and used to select the downsampling performed (e.g., based on selection of block size for downsampling). For example, if an image/frame height is less than 720 pixels (as controlled by height ≥720 signal 1107 being false or 0), the chosen downsampling factor is 1, as set by block_size=1 module 1104. If the image/frame height is ≥720 but <1080 (as controlled by height ≥720 signal 1107 being true or 1 and height ≥1080 signal 1108 being false or 0), the chosen downsampling factor is 2, as set by block_size=2 module 1103. If the image/frame height is ≥1080 (as controlled by height ≥720 signal 1107 being true or 1 and height ≥1080 signal 1108 being true or 1), the chosen downsampling factor is 8 (or 4), as set by block_size=8 (or 4) module 1102. As shown, the arrangement of two switches (as controlled by height ≥720 signal 1107 and height ≥1080 signal 1108) and the corresponding 3 block_size selection modules 1102, 1103, 1104, allow the aforementioned choice of downsampling factors. As shown, downsample Y plane by block_size factor module 1105 may perform downsampling to generate a downsampled Y plane 1106. Such downsampling may include filtering prior to subsampling or direct subsampling.

With reference to FIG. 9, downsampled Y plane 1106 (e.g., the downsampled output of luma (Y) plane downsampler 904) may be used by Viola-Jones face detector 905 including frame normalizer and integral frame calculator 702, classifiers cascade template matcher 703, and classifiers template(s) store 704. For example, frame normalizer and integral frame calculator 702 may normalize the values of downsampled Y plane 1106 (e.g., an input frame) by calculating its histogram from which a lookup table for normalization may be constructed used to create a normalized luma frame. The normalized luma frame has an increased contrast that allows improvement in the detection rate when using Haar features, as discussed herein. Next, based on the normalized luma frame just computed, frame normalizer and integral frame calculator 702 may calculate the integral luma frame. As discussed, the reason for calculation of the integral luma frame is to allow fast feature calculation since having a luma frame in this form allows calculation of a sum of luma values of a block based on only 3 additions.

Feature matching may then be performed by classifiers cascade template matcher 703 (please refer also to FIG. 8A). The number of stages and features themselves may be pre-decided as discussed with the features being generated by training using a database of frontal positive faces and negative faces. To speed up training, a classifier booster (e.g., Ada-Boost) maybe applied to provide faster training times. The resulting features from training may be stored classifiers template store 704. Classifiers cascade template matcher 703 may (by a sliding window) may perform feature matching using the number and exact Haar-like features at each stage of the implemented cascade from classifiers template store 704. For example, classifiers cascade template matcher 703 may slide a window containing Haar-like features across the integral image in search of an area that resembles face features. The Haar-like features may be tested in a cascade manner with a number of features tested in each stage of the cascade. For example, the search may move to the next stage of the cascade only if all features belonging to a stage pass the threshold test. If any feature fails, the window may be moved to the next location without the just examined area being labeled as potential face-area. Once all potential windows that resemble face-areas are found, pruning may be applied as discussed herein. Such pruning may be used to remove isolated positives and also to merge windows that significantly overlap into one common face-like area.

The output of such face detection processing may identify face windows that are then sent for validation and face region extraction, both of which require a skin probability map. Components for generating the skin probability map which include luma/chroma (YUV) planes downsampler and color space format converter 902 and initial skin probability map computer 903 as discussed next.

Figure 12A:
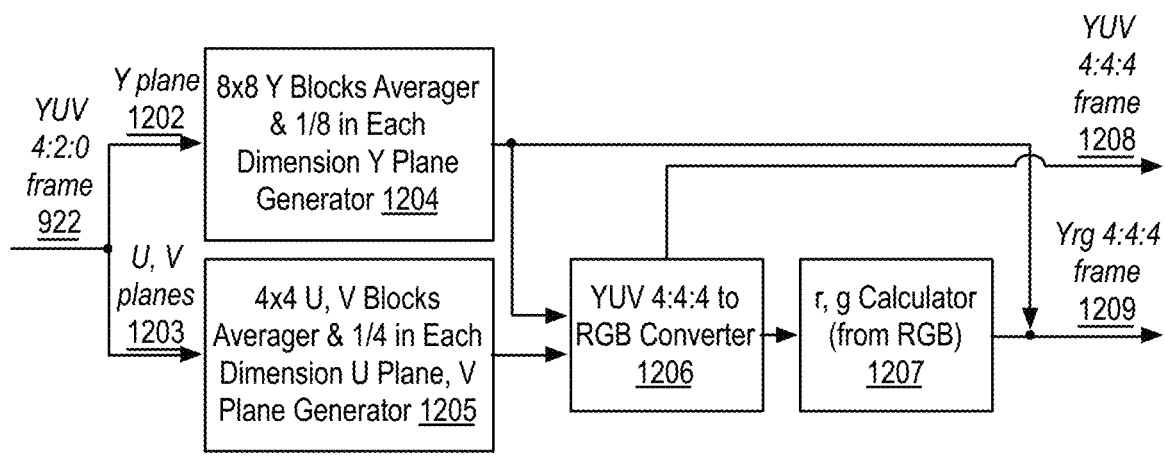
FIG. 12A illustrates an example luma/chroma (YUV) planes downsampler and color space format converter.

FIG. 12A illustrates an example luma/chroma (YUV) planes downsampler and color space format converter 902 or 909, arranged in accordance with at least some implementations of the present disclosure. As shown in FIG. 12A, include luma/chroma (YUV) planes downsampler and color space format converter 902/909 may include a 8×8 Y blocks averager and ⅛ in each dimension Y plane generator 1204, a 4×4 U, V blocks averager and ¼ in each dimension U plane, V plane generator 1205, a YUV 4:4:4 to RGB converter 1206, and a r, g calculator (from RGB) module 1207.

Also as shown, input image or video frame 922 (e.g., an input YUV 4:2:0 image/frame) may be separated into Y plane 1202 and U and V planes 1203. Each 8×8 block of Y plane 1202 may be represented by an average value to generate a modified Y-plane that is ⅛$^{th}$ in size both horizontally and vertically (overall modified Y-plane is 1/64 in size of original Y-plane) as provided by 8×8 Y blocks averager and ⅛ in each dimension Y plane generator 1204. Similarly, each 4×4 block of U and V planes 1203 may be replaced by corresponding 4×4 U and 4×4 V plane averages to provide a modified U plane and a modified V plane each ¼$^{th}$ in size in each dimension (overall modified U-plane and modified V-plane are 1/16 in size of original U- and V-planes) by 4×4 U, V blocks averager and ¼ in each dimension U plane, V plane generator 1205. Such processing may provide all 3 downsampled planes of the same size. For example, if originally a frame of YUV 4:2:0 video is of CIF size with Y resolution of 352×288, and U and V resolution of 176×144, after 8:1 downsampling (due to 8×8 block averaging) in each direction of the luma plane and 4:1 downsampling (due to 4×4 bock averaging) in each direction of each of the U and V planes, the modified Y, U, V planes that result are all 44×36 in size. Such downsampling may create a lower resolution frame to allow significant reduction in overall computations (without notable difference in quality) in subsequent operations. The modified YUV frame with equal size YUV planes may be characterized as a YUV 4:4:4 format frame 1208, which may, after recombining the Y and U, V planes be provided as output.

The YUV 4:4:4 format frame may be converted to a RGB24 format frame (with the results rounded to the nearest integer and clipped to [0,255] range) by YUV 4:4:4 to RGB converter 1206. For example, YUV 4:4:4 to RGB converter 1206 may implement the following color conversion matrix to generate R, G, and B planes as provided by Equations (4), (5), and (6):

$$R=Y+1.14\times(V-128) \quad (4)$$

$$G=Y-0.395\times(U-128)-0.581\times(V-128) \quad (5)$$

$$B=Y+2.032\times(U-128) \quad (6)$$

As shown, the RGB24 format frame may be converted to a Yrg format frame (with the results rounded to the nearest integer and clipped to [0,255] range) by r, g calculator (from RGB) module 1207 that may implement the following conversion matrix to generate r and g planes as provided by Equations (7) and (8) below. Although the Y-plane may also be recalculated, since it is almost identical to the Y plane of YUV 4:4:4 format frame 1208, the Y plane from YUV 4:4:4 format frame 1208 may be used, saving additional computations.

$$r=(R\times255)/(R+G+B+1) \quad (7)$$

$$g=(G\times255)/(R+G+B+1) \quad (8)$$

As shown, such conversions may provide a Yrg 4:4:4 format frame 1209, which may be provided as output. Such conversions may be advantageous because the normalized Yrg color format (in particular r, g color planes) may be more suitable for detection of human skin tones than the YUV color format. As shown, overall, include luma/chroma (YUV) planes downsampler and color space format converter 902/909 outputs scaled and color converted frames in YUV 4:4:4 and Yrg 4:4:4 formats for other operations.

Figure 12B:
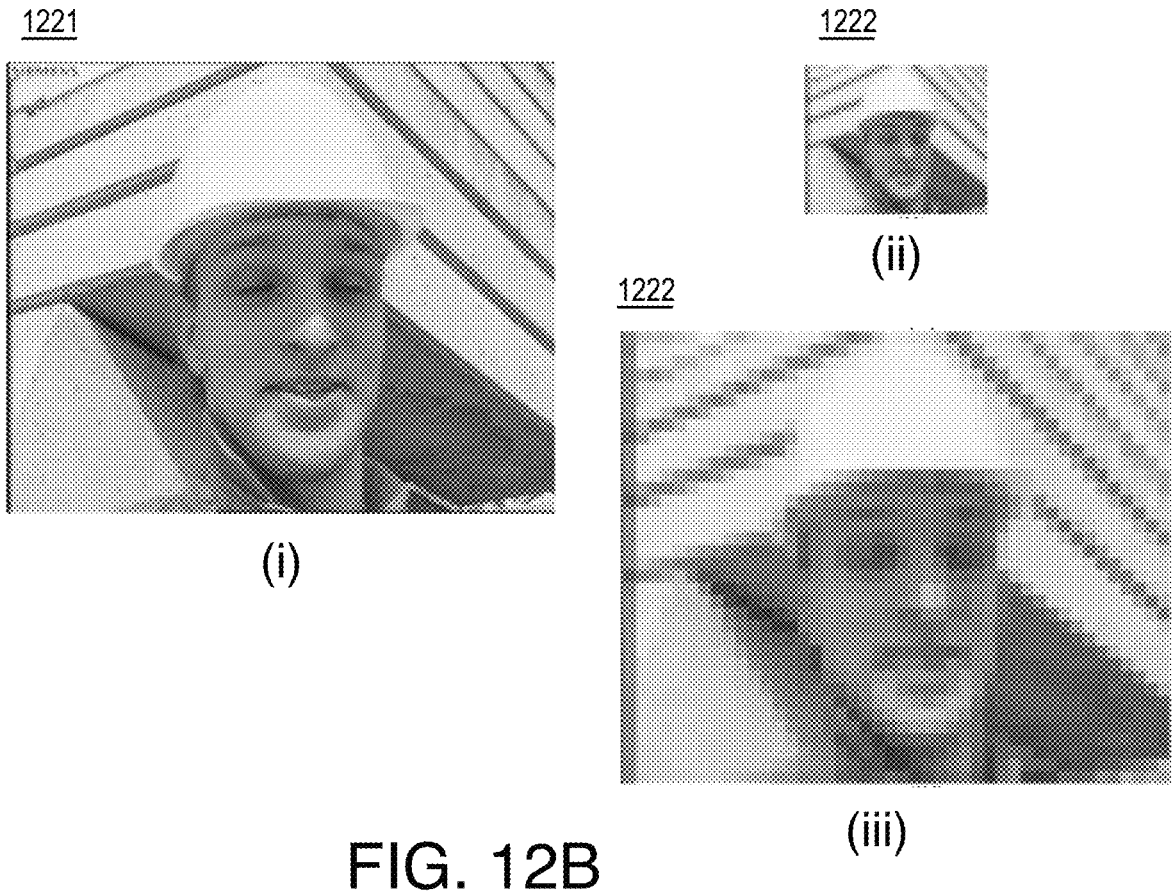
FIG. 12B illustrates an example YUV 4:2:0 frame 1221 and an example downsampled YUV 4:4:4: frame 1222.

FIG. 12B illustrates an example YUV 4:2:0 frame 1221 and an example downsampled YUV 4:4:4: frame 1222, arranged in accordance with at least some implementations of the present disclosure. As shown in FIG. 12B(i), YUV 4:2:0 frame 1221 may be an original YUV 4:2:0 input frame (e.g., of CIF resolution from the Foreman sequence). FIG. 12B(ii) illustrates downsampled YUV 4:4:4: frame 1222, which is the same frame of the same sequence downsampled to ⅛$^{th}$ size in each direction by averaging as discussed herein. Furthermore, FIG. 12B(iii) illustrates an enlarged version (e.g., by pixel repeat) of downsampled YUV 4:4:4: frame 1222 to provide comparison with the input frame (e.g., YUV 4:2:0 frame 1221).

Figure 13:
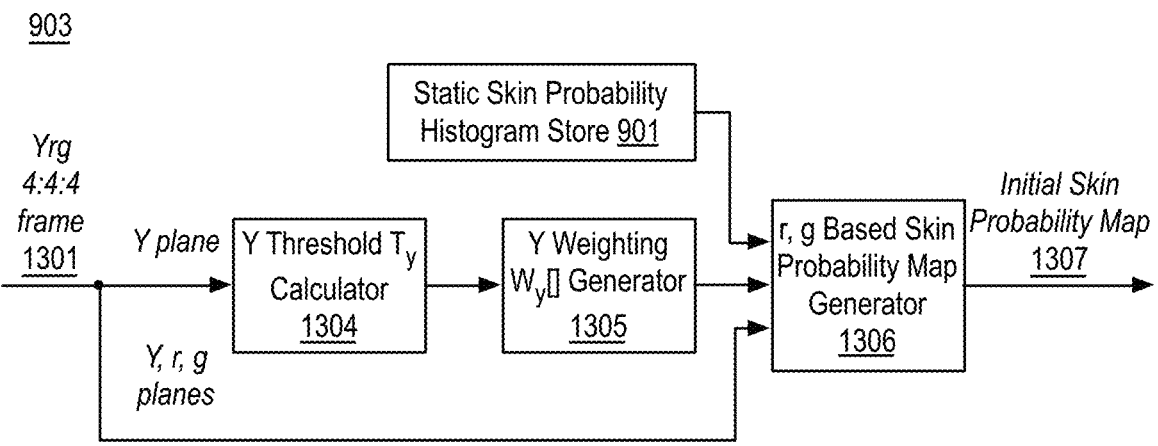
FIG. 13 illustrates an example initial skin probability map computer.

FIG. 13 illustrates an example initial skin probability map computer 903, arranged in accordance with at least some implementations of the present disclosure. For example, initial skin probability map computer 903 may be used for generation of skin probability maps in key frames. As shown in FIG. 13, initial skin probability map computer 903 may include a luma (Y) threshold ($T_y$) calculator 1304, a luma (Y) weighting ($W_y[\ ]$) generator 1305, and an r, g based skin probability map generator 1306.

As shown, a skin probability map table may be used with a Yrg frame 1301 (e.g., a converted 4:4:4 Yrg frame) to generate an initial skin probability map 1307 (e.g., a block accurate initial skin probability map). As shown, to create an adaptive luma histogram, a determination of luma threshold ($T_y$) may be performed by luma (Y) threshold ($T_y$) calculator 1304 and adapted Y histogram values may be computed by luma (Y) weighting ($W_y[\ ]$) generator 1305.

In an embodiment, luma (Y) threshold ($T_y$) calculator 1304 may determine Y threshold $T_y$ subject to the following rules: $lo \le T_y < hi$ (e.g., lo=10, hi=50). The reason luma values in the [0 . . . 9] range are not used in the Y histogram is because these values represent very dark areas often not related to scene objects. Furthermore, the value of $T_y$ may be limited to 50. Furthermore, luma threshold $T_y$ may be computed by luma (Y) threshold ($T_y$) calculator 1304 as per the following steps as provided by Pseudocode (1)

```
Pseudocode (1):
    Calculate Luma Histogram H_y[0..255]
    Initialize Luma threshold T_y = 10 and sum=0
    Set threshold thr = 0.3*(w*h - Σ_{i=0}^9 H_y[i])  //30% of total
    number of pixels that have value
        >= 10
    while (T_y<50 && sum < thr) {
        sum += H_y[T_y]
        T_y++
    }
```

Once $T_y$ is determined by luma (Y) threshold ($T_y$) calculator 1304, it may be used to determine Y weighting function $W_y[Y]$ by luma (Y) weighting ($W_y[\ ]$) generator 1305.

For example, weighting function, $W_y[Y]$, may be used to enhance a skin probability map. For example, weighting function, $W_y[Y]$, may have three states such that when input luma values are between 0 and $a \times T_y$, weighting function, $W_y[Y]$, may output a value of zero, when the input value is greater than $a \times T_y$ and less than $T_y$, weighting function, $W_y[Y]$, may output a linearly adjusted value based on the input, and, when the input value is greater than or equal to $T_y$, weighting function, $W_y[Y]$, may output a value of 255. For example, a may be a predetermined multiplier such that a may have any suitable value. In an embodiment, a may have a value of ⅞.

For example, weighting function, $W_y[Y]$, may be expressed by the following relationship as provided by Equation (9):

$$W_y(Y) = \begin{cases} 0, & Y \le \lfloor a \times T_y \rfloor \\ (Y - \lfloor a \times T_y \rfloor) \times \left\lfloor \dfrac{255}{T_y - \lfloor a \times T_y \rfloor} \right\rfloor, & \lfloor a \times T_y \rfloor < Y < T_y \\ 255, & Y \ge T_y \end{cases} \quad (9)$$

Given the input Yrg frame (e.g., Yrg frame 1301), the following may be used by r, g based skin probability map generator 1306 to compute initial pixel-accurate skin probability map 1307 as provided by Equation (10):

$$SkinProb[i] = H_{rg}[r_i][g_i] \times W_y[Y_i]/255 \quad (10)$$

where $Y_i$, $r_i$, $g_i$ are values of luma, Y, and normalized red, r, and normalized green, g, signal for the i-th pixel in the current Yrg frame, $H_{rg}[r_i][g_i]$ is the value of a 2D skin probability histogram corresponding to index (r, g), $W_y[Y_i]$ is the value of the weighting as a function of luma value of and SkinProb[i] is the value of final skin probability mask for the i-th pixel. For example, r, g based skin probability map generator 1306 may generate initial pixel-accurate skin probability map 1307 by, for each pel i, using $r_i$, $g_i$ to look up histogram $H_{rg}[\ ][\ ]$ and multiplying by weight $W_y[\ ]/255$.

FIG. 14A illustrates an example face validator 906, arranged in accordance with at least some implementations of the present disclosure. For example, face validator 906 may validate "raw" face rectangles detected by face detector 905 based on an initial skin probability map from the previous stage used to measure the reliability of each face area being validated. As shown in FIG. 14A, face validator 906 may include a calculator of percentage skin area per face window 1402 and a percentage skin area comparator with $T_s$ threshold per face window 1403.

Also as shown, a face area such as any of face rectangles 1401 may be considered valid only if the average percentage of skin pixels in the windowed area exceeds 40% (e.g., as shown by percentage skin area comparator with $T_s$ threshold per face window 1403 having an area ≥40) and, otherwise, the face area of face rectangles 1401 is declared invalid and removed from the set of detected faces. Although illustrated with an example threshold of 40%, any suitable threshold may be used. For example, calculator of percentage skin area per face window 1402 may calculate, based on initial skin probability map 1307, the percentage of skin area in each face rectangle of face rectangles 1401. Percentage skin area comparator with $T_s$ threshold per face window 1403 may then determine whether the percentage skin area calculated by calculator of percentage skin area per face window 1402 is less than a pre-decided threshold ($T_s$) or not. For example, a face area may be validated only if the average skin percentage per pixel (from the area) exceeds $T_s$ (e.g., 40%). For example, percentage skin area comparator with $T_s$ threshold per face window 1403 may provide valid face signal 926 such that if valid face signal 926 is true or 1, a face rectangle of face rectangles 1401 is output as a face rectangle of valid face rectangles 1404 and, if valid face signal 926 is false or 0, a face rectangle of face rectangles 1401 is output as a face rectangle of invalid face rectangles 1405 (e.g., discarded).

FIG. 14B illustrates example face rectangles 1413, 1414 of a frame 1411, arranged in accordance with at least some implementations of the present disclosure. As shown in FIG. 14B(i) frame 1411 of an outdoor scene from a movie may, after face detection, have associated therewith face rectangles 1413, 1414. Furthermore, with reference to FIG. 9, face validator 906 may analyzes both face rectangles 1413, 1414 (e.g., claimed face windows) for presence of skin tones to determine if either are valid. As shown in FIG. 14B(ii), the resultant processing may concludes that face rectangle 1413 has a sufficient skin-tone region to qualify as a valid face window whereas face rectangle 1414 does not include any notable skin tone region and is deemed to be an invalid face window and should be deleted or discarded from the list of valid face windows.

Figure 15A:
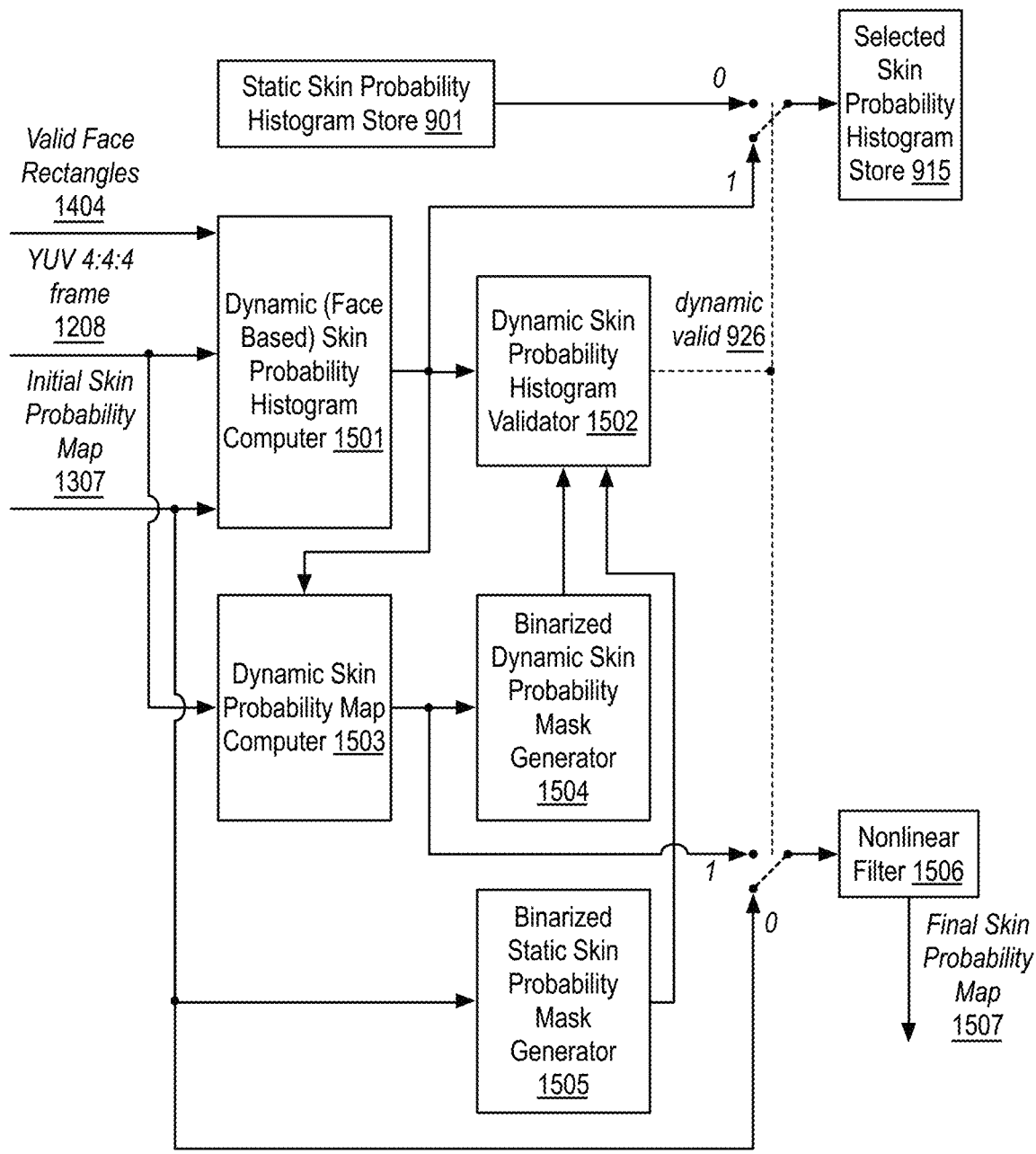
FIG. 15A illustrates an example skin probability map enhancer.

FIG. 15A illustrates an example skin probability map enhancer 913, arranged in accordance with at least some implementations of the present disclosure. For example, skin probability map enhancer 913 may enhance an initial skin probability map by creating a dynamic skin probability (e.g., lookup table) from the samples taken within the detected facial rectangular areas (e.g., with high probability samples taken based on the initial skin probability map).

As shown in FIG. 15A, skin probability map enhancer 913 may include a dynamic skin probability histogram computer 1501, a dynamic skin probability histogram validator 1502, a dynamic skin probability map computer 1503, a binarized dynamic skin probability mask generator 1504, a binarized static skin probability mask generator 1505, and a nonlinear filter 1506. As shown, skin probability map enhancer 913 may generates three outputs: a control signal characterized as dynamic valid 926, a histogram characterized as a dynamic skin probability histogram (output from dynamic skin probability histogram computer 1501), and a map characterized as final skin probability map 1507. For example, if dynamic valid 926 is true, the dynamic skin probability map after nonlinear filtering is output as final skin probability map 1507 and, if dynamic valid 926 is false, the initial skin probability map after nonlinear filtering is output as final skin probability map 1507. Furthermore, if dynamic valid 926 is true, the computed dynamic skin probability histogram is copied to selected skin probability histogram store 915 and, if dynamic valid 926 is false, the offline generated static skin probability histogram is copied to selected skin probability histogram store 915 (e.g., from static skin probability histogram store 901).

Also as shown, initial skin probability map 1307, detected valid face rectangles 1404, and YUV 4:4:4 format frame 1208 are input to dynamic skin probability histogram computer 1501, which may compute and output face-area based skin probability histogram characterized as a dynamic skin probability histogram. The dynamic skin probability histogram is input to dynamic skin probability map computer 1503, which may also receive YUV 4:4:4 format frame 1208 and may generate a dynamic skin probability map. As shown, the dynamic skin probability map may be input to binarized dynamic skin probability mask generator 1504 that may use a threshold, $T_d$, to binarize the dynamic skin probability map to determine a binarized dynamic skin probability mask.

Furthermore, initial skin probability map 1307 is input to binarized static skin probability mask generator 1505, which may use a threshold, $T_s$, to binarize initial skin probability map 1307 to generate a binarized static skin probability mask. The binarized dynamic skin probability mask, the binarized static skin probability mask, and the dynamic skin probability histogram are input to dynamic skin probability histogram validator 1502, which may analyze such inputs and generate at its output dynamic valid 926. When the value of dynamic valid 926 is true or 1, it indicates that the results of dynamic skin-tone processing are better than results obtainable from static pre-stored values from training. Alternatively, when dynamic valid 926 is false or 0, it indicates that the static pre-stored values offer a more robust solution. For example, if dynamic valid 926 is true or 1, the dynamic skin probability histogram is considered to be the most effective histogram and is thus copied to selected skin probability histogram store 915. If dynamic valid 926 is false or 0, the static skin probability histogram is considered to be the most effective histogram and is thus copied to selected skin probability histogram store 915.

The components of skin probability map enhancer 913 will now be discussed in detail.

Dynamic skin probability histogram validator 1502 computes a dynamic face-based skin probability histogram from valid face areas (e.g., as provided by valid face rectangles 1404) For example, dynamic skin probability histogram validator 1502 may use YUV 4:4:4 format frame 1208, valid face rectangles 1404, and initial skin probability map 1307 as input and may output the dynamic skin probability histogram. Dynamic skin probability histogram validator 1502 is described in more detail with respect to FIG. 16.

Dynamic skin probability map computer 1503 computes the dynamic skin probability map by inputting YUV 4:4:4 format frame 128 and the dynamic skin probability histogram to a U,V based probability map generator, which, for each pel T, performs a lookup from histogram $H_{UV}[\ ][\ ]$ using values of $U_i$, $V_i$. This operation can be summarized by the following as provided by Equation (10):

$$\text{SkinProb}[i] = H_{UV}[U_i][V_i] \qquad (10)$$

The dynamic skin probability map is converted to a binary mask by the binarized dynamic skin probability mask generator 1504. For example, binarized dynamic skin probability mask generator 1504 may perform a process of binarization of the dynamic skin probability map to generate a mask based on a threshold, $T_d$. For example, threshold, $T_d$, may be set to 30%, meaning $T_d=((30*100)/255)\times100$.

The static skin probability map is converted to a binary mask by binarized static skin probability mask generator 1505. For example, binarized static skin probability mask generator 1505 may perform a process of binarization of the static skin probability map to generate a mask requires based on a threshold, $T_s$. For example, threshold, $T_s$, may be set to 30%, meaning $T_s=((30*100)/255)\times100$ yields good results. Thresholds $T_d$ and $T_s$ may be the same or they may be different.

Dynamic skin probability histogram validator 1502 is used to validate the computed dynamic skin probability histogram. For example, dynamic skin probability histogram validator 1502 may use two statistics to measure the stability of the resulting probability map: P1, the percentage that the skin probability is strong (e.g. over 30%) within faces area, and P2, the percentage that the skin probability is strong in the block-accurate frame. For example, both the P1 and the P2 percentages may be compared to the corresponding statistics (S1 and S2 percentages) of the general static probability histogram. If (S1−P1)−3*(S2−P2)≤0, the dynamic face-based histogram is validated, otherwise the dynamic histogram is deemed unreliable and the static skin probability histogram should be used.

Furthermore, the dynamic skin probability histogram may be examined for shape complexity with respect to the static skin probability histogram. For example, the two binarized probability maps (static and dynamic) may be used. The size of a difference map (SZD) in terms of number of different pixels may be computed. A shape complexity measure (SHC) of a binary mask is also computed as follows: (total number of vertical and horizontal transitions from 0 to 1 within the mask)/(mask width+mask height). The valid face-based histogram (e.g., the dynamic skin probability histogram) is invalidated by setting dynamic valid 926 to false or 0 if SHC >1.5 and SZD <20% of the mask. If the dynamic skin probability histogram is invalidated, then the static skin probability map is used as discussed. However, if dynamic skin probability histogram is valid (e.g., dynamic valid 926 is true or 1), the skin probability map is recomputed using the dynamic skin probability histogram.

In skin probability map enhancer 913, nonlinear filter 1506 reduces sudden changes (characterized herein as noise) in the skin probability mask, which is block-based. Nonlinear filter 1506 thus reduces noise, preserves edges, and increases connectedness in the skin probability mask. Nonlinear filter 1506 may utilize any suitable filter such as a 5×5 median-filter or a simplified 5×5 median-like filter (e.g., which chooses a pixel within a 5×5 area that is closest to the average of the 5×5 area).

Figure 15B:
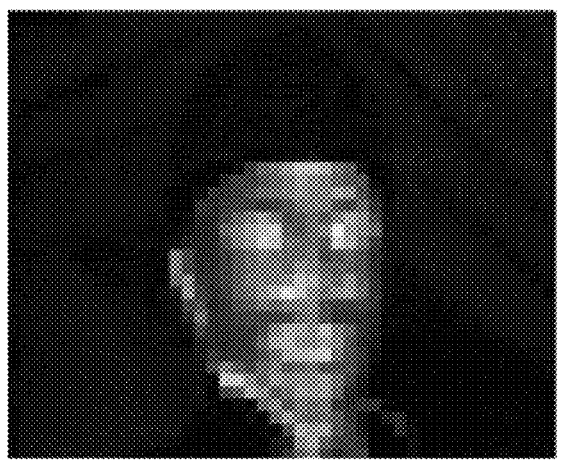
FIG. 15B illustrates example results of nonlinear filtering of a skin probability mask.
Figure 15B:
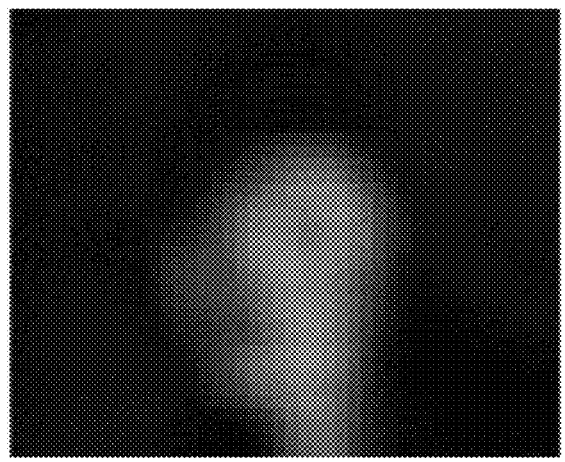

FIG. 15B illustrates example results of nonlinear filtering of a skin probability mask, arranged in accordance with at least some implementations of the present disclosure. FIG. 15B(i) illustrates a skin probability mask 1511 of one frame of the Foreman sequence before filtering and FIG. 15B(ii) illustrates a skin probability mask 1512 of the same frame of the Foreman sequence after nonlinear filtering.

Figure 16:
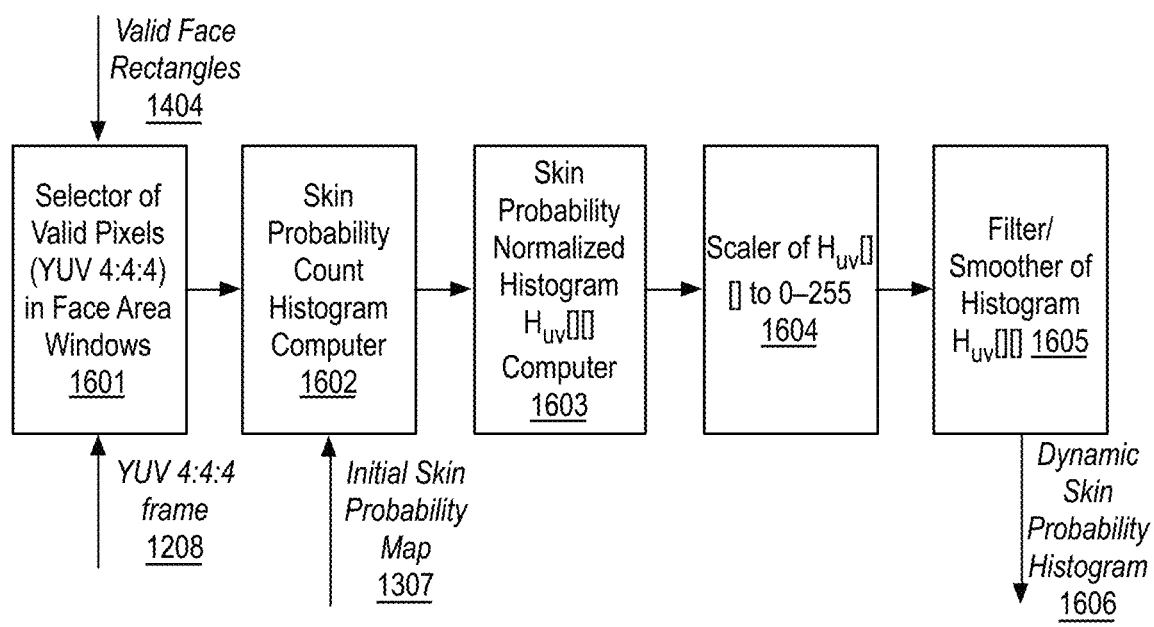
FIG. 16 illustrates an example dynamic skin probability histogram computer.

FIG. 16 illustrates an example dynamic skin probability histogram computer 1501, arranged in accordance with at least some implementations of the present disclosure. As shown in FIG. 16, dynamic skin probability histogram computer 1501 may include a selector of valid pixels in face area windows 1601, a skin probability count histogram computer 1602, a skin probability normalized histogram $H_{uv}[\ ][\ ]$ computer 1603, a scaler of $H_{uv}[\ ][\ ]$ to 0-255 module 1604, and a filter/smoother of histogram $H_{uv}[\ ][\ ]$ 1605.

Also as shown, YUV 4:4:4 format frames 1208 and valid face rectangles 1404 (e.g., detected valid face-area windows) are input to selector of valid pixels in face area windows 1601, which may select blocks or pixels that belong to valid face area in YUV 4:4:4 format frames 1208 and may output the detected valid face area to skin probability count histogram computer 1602. Skin probability count histogram computer 1602 may receive the valid face area and compute a histogram of weighted count $HWCount_{uv}[u(x,y)][v(x,y)]$ for every joint $u(x,y)$, $v(x,y)$ event, using init_skin_prob_map[x][y] (e.g., initial skin probability map 1307) as weights where x,y represent selected pixels. For example, the described relationship can be expressed as provide in Equation (11):

$$HWCount_{uv}[u(x,y)][v(x,y)]+=\text{init\_skin\_prob\_map}[x][y] \quad (11)$$

As shown, the skin probability count histogram $HWCount_{uv}[u(x,y)][v(x,y)]$ may be normalized by skin probability normalized histogram $H_{uv}[\ ][\ ]$ computer 1603 by dividing each $HWCount_{uv}[u(x,y)][v(x,y)]$ value by the maximum value of $HWCount[\ ][\ ]$, resulting in a normalized skin probability histogram $H_{uv}[u(x,y)][v(x,y)]$ that may be input to scaler of $H_{uv}[\ ][\ ]$ to 0-255 module 1604. Scaler of $H_{uv}[\ ][\ ]$ to 0-255 module 1604 multiplies each value of $H_{uv}[\ ][\ ]$ and then inputs it to filter/smoother of histogram $H_{uv}[\ ][\ ]$ 1605, which may apply a smoothing filter on the $H_{uv}[\ ][\ ]$ array, resulting in the final histogram characterized as dynamic skin probability histogram 1606, which may be rewritten back into the $H_{uv}[\ ][\ ]$ array.

Figure 17A:
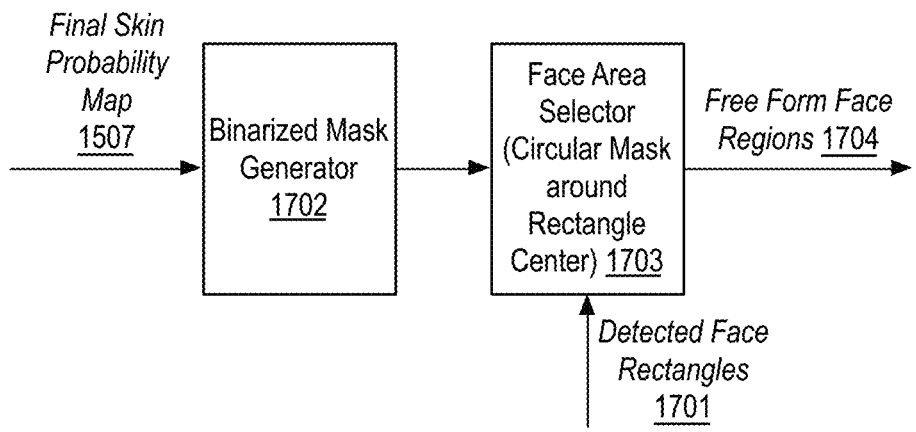
FIG. 17A illustrates an example face region extractor.

FIG. 17A illustrates an example face region extractor 908 or 914, arranged in accordance with at least some implementations of the present disclosure. For example, face region extraction may be the final step performed on a key frame. As shown in FIG. 17A, face region extractor 908 or 914 may include a binarized mask generator 1702 and a face area selector 1703.

Also as shown, final skin probability map 1507 may be input to binarized mask generator 1702 (e.g., a binarized mask generator with a threshold, $T_a$=30*100/255% age), which may use a strong probability threshold, $T_a$, set to 30% (e.g., $T_a$=(30×100)/255% age) or the like to binarize final skin probability map 1507 to generate a binarized mask. As shown, the binarized mask is input, along with detected face rectangles 1701 (e.g., valid face rectangles 1404 in the context of face region extractor 908 or 914), to face area selector 1703 (e.g., a face area selector using a circular mask around the rectangle center), which may use, centered at the center of the initial face square area or rectangular area, a circular mask of r+r/2 (e.g., where r is the side of the square). As shown, face area selector 1703 may output all pixels in the circular area with a 1 or true in the binarized skin probability map (e.g., with a 1 or true indicating a face region) as free form face regions 1704. For example, free form face regions 1704 may be provided as face region(s) 923 (please refer to FIG. 9).

Figure 17B:
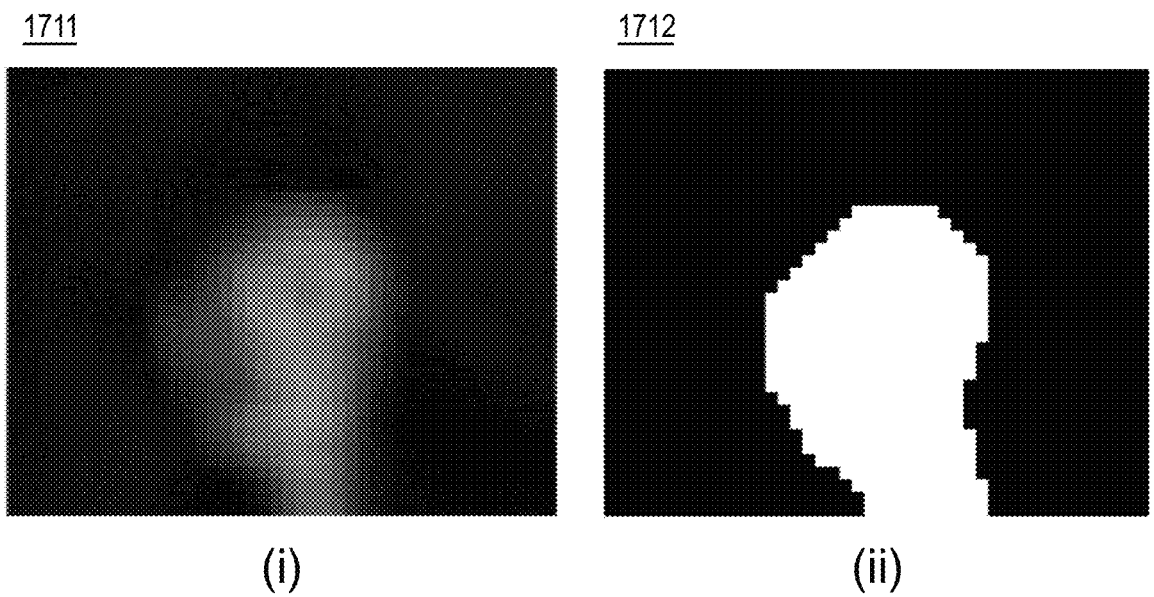
FIG. 17B illustrates an example skin probability map and an example binary mask.

FIG. 17B illustrates an example skin probability map 1711 and an example binary mask 1712, arranged in accordance with at least some implementations of the present disclosure. For example, FIG. 17B shows an example of free-form face region mask generation. For example, FIG. 17B(i) illustrates, for a frame of the Foreman test sequence, a final skin probability map (e.g., final skin probability map 1507 as output by skin probability map enhancer 913). FIG. 17B(ii) illustrates the binarization of skin probability map 1711 to provide a resultant binary mask 1712.

Figure 17C:
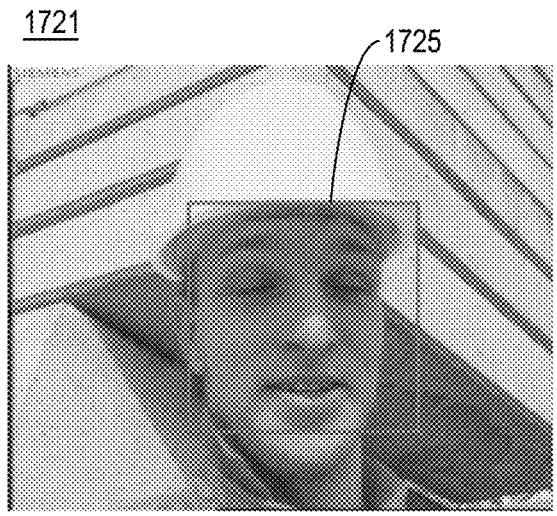
FIG. 17C illustrates an example extraction of a free form face region.
Figure 17C:
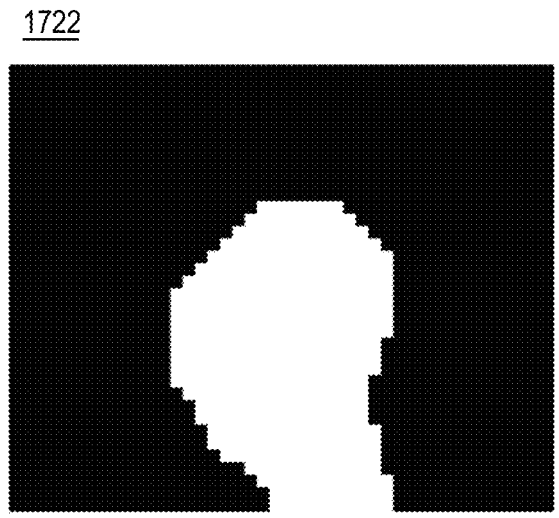
Figure 17C:
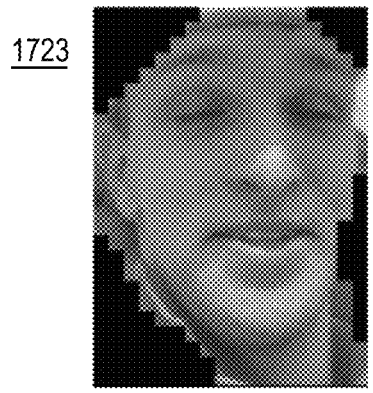

FIG. 17C illustrates an example extraction of a free form face region, arranged in accordance with at least some implementations of the present disclosure. For example, FIG. 17C illustrates an example extraction of a free form shape regions from a face windows detected by a face detector (and after validation by a face validator). For example, FIG. 17C(i) illustrates, for a frame 1721 of the Foreman test sequence, a detected face window 1725. FIG. 17C(ii) illustrates a computed binarized skin region map for a region around detected face window 1725. FIG. 17C(iii) illustrates an extracted free form shape resulting from application of the binarized skin region map to frame 1721 of the Foreman test sequence.

Figure 18:
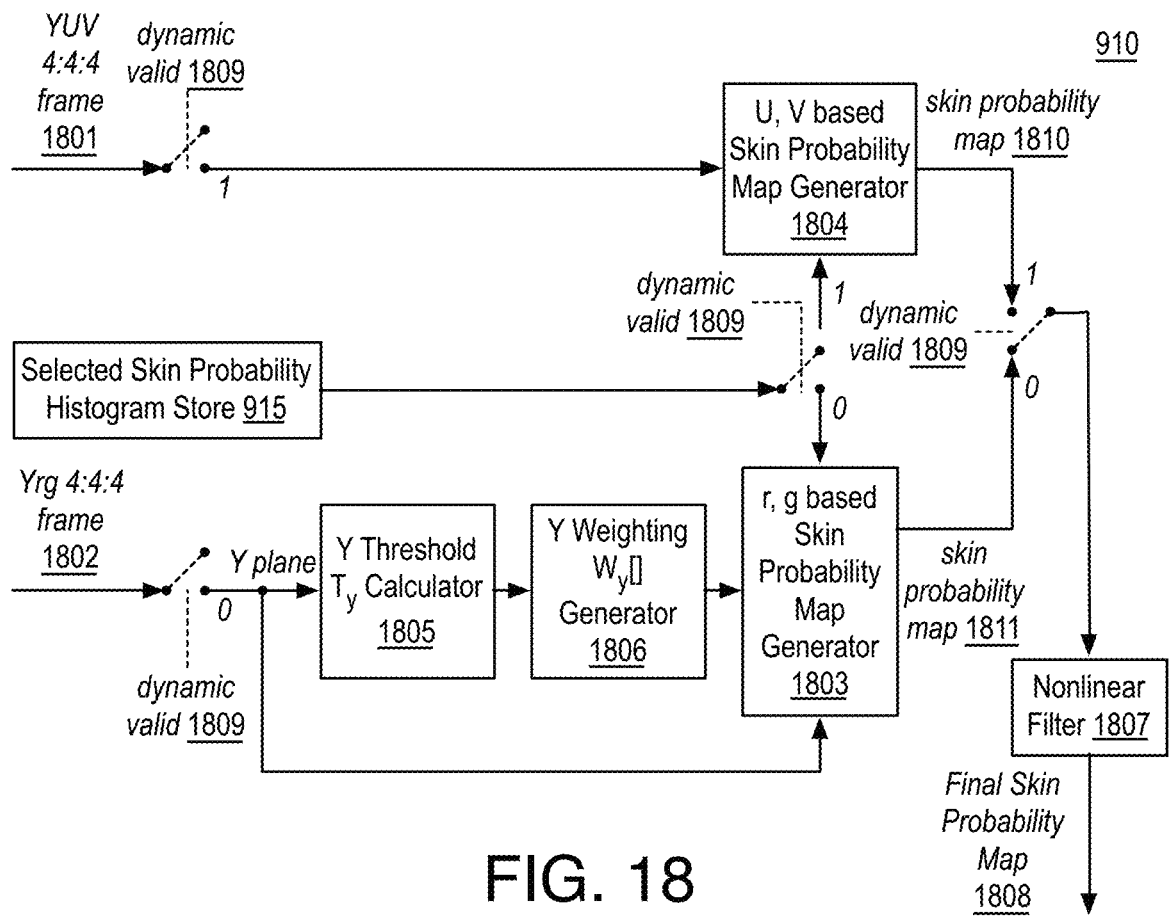
FIG. 18 illustrates an example skin probability map computer.

FIG. 18 illustrates an example skin probability map computer 910, arranged in accordance with at least some implementations of the present disclosure. For example, frames in two different color formats (e.g., YUV 4:4:4 or Yrg 4:4:4 as provided by luma/chroma (YUV) planes downsampler and color space format converter 909) may be input and processed depending on the value of the binary signal dynamic valid 1809. When dynamic valid 1809 is true or 1, the input with YUV 4:4:4 frame 1801 is enabled. When dynamic valid 1809 is false or 0, the input of Yrg 4:4:4 frame 1802 is enabled. As shown in FIG. 17A, skin probability map computer 910 may include a U, V based skin probability map generator 1804, a r, g based skin probability map generator 1803, a luma (Y) threshold ($T_y$) calculator 1805, luma (Y) weighting ($W_y[\ ]$) generator 1806, and a nonlinear filter 1807.

Also as shown, when the input corresponding to YUV 4:4:4 frame 1801 (e.g., YUV 4:4:4 color format) is enabled (e.g., dynamic valid is true or 1), YUV 4:4:4 frame 1801 is provided to U, V based skin probability map generator 1804, which may use YUV 4:4:4 frame 1801 (e.g., the input frame) and the dynamic skin probability histogram stored in selected skin probability histogram store 915 to generate a skin probability map 1810. Skin probability map 1810 may be generated by, for each pixel (e.g., located at an index value of 'i'), using corresponding $U_i$ and $V_i$ values to lookup a value of $H_{UV}[U_i][V_i]$ which may provide the corresponding value (e.g., form) skin probability map 1810.

When the input corresponding to Yrg 4:4:4 frame 1802 (e.g., Yrg 4:4:4 color format) is enabled (e.g., dynamic valid is false or 0), Yrg 4:4:4 frame 1802 is provided to r, g based skin probability map generator 1803, which may use Yrg 4:4:4 frame 1802 (e.g., the input frame) and the static skin probability histogram stored in selected skin probability histogram store 915 and a luma signal weighter, $W_y[\ ]$, to generate skin probability map 1810. To generate the luma signal weighter, $W_y[\ ]$, for Yrg 4:4:4 frame 1802, a luma threshold, $T_y$, may be determined by luma (Y) threshold ($T_y$) calculator 1805 as discussed with respect to luma (Y) threshold ($T_y$) calculator 1304 of FIG. 13. The luma threshold, $T_y$, may be provided to luma (Y) weighting ($W_y[\ ]$) generator 1806, which may determine the luma signal weighter, $W_y[\ ]$, as discussed with respect to luma (Y) weighting ($W_y[\ ]$) generator 1305 of FIG. 13. The luma signal weighter, $W_y[\ ]$, may be implemented by r, g based skin probability map generator 1803 in a luma weighting function as discussed with respect to r, g based skin probability map generator 1306 and weighting function $W_y[Y]$. For example, a typical value of threshold, $T_y$, computed per frame is in range of 10 and 50 and is computed such that it results in about 30% of pixels that have value of greater than 10, as discussed herein. For example, a skin probability map 1811 may be generated by, for each pixel located at index 'i' using corresponding $r_i$, and $g_i$ values to lookup a value of $H_{rg}[r_i][g_i]$ and multiplying it with the luma weighter $W_y[Y_i]/255$ (e.g., SkinProb[i]=$H_{rg}[r_i][g_i] \times W_y[Y_i]/255$).

As shown, skin probability map 1810 or skin probability map 1811 (e.g., depending on whether YUV 4:4:4 frame 1801 or Yrg 4:4:4 frame 1802 was used) may be nonlinear filtered (e.g., by 5×5 median filtering) by nonlinear filter 1807 to generate a final skin probability map 1808, which may be output from skin probability map computer 910.

Figure 19A:
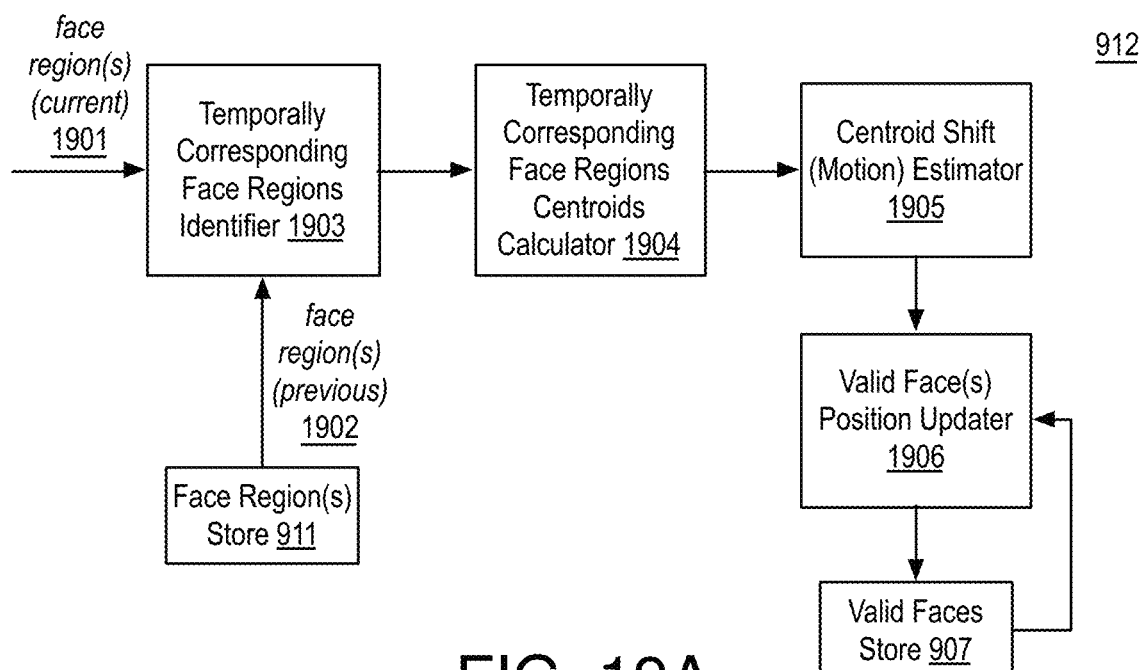
FIG. 19A illustrates an example face region(s) tracker.

FIG. 19A illustrates an example face region(s) tracker 912, arranged in accordance with at least some implementations of the present disclosure. As shown, face region(s) tracker 912 may include a temporally corresponding face regions identifier 1903, a temporally corresponding face regions centroids calculator 1904, a centroid shift (motion) estimator 1905, and a valid face(s) position updater 1906.

Since multiple faces can be within a video frame and the number of detected/tracked faces from frame-to-frame may vary, a correspondence may be established between face region(s) in a current frame with those in previous frame. For example, as shown, temporally corresponding face regions identifier 1903 may provide correspondence between face region(s) (current) 1901 (e.g., face regions for a current frame) and face region(s) (previous) 1902 (e.g., face regions for previous current frame). Such temporally corresponding face region(s) (or windows) in previous and current frames may be provided to temporally corresponding face regions centroids calculator 1904, which may, for each face region, determine a centroid (e.g., the center of center of mass of each face region). Such centroids of face region(s) may be provided to centroid shift (motion) estimator 1905, which may determine a shift (or motion) vector by differencing centroids between corresponding face regions (e.g., between a previous and a current frame). The shift motion vector or vectors may be input to valid face(s) position updater 1906, which may shift (inner) face regions or window(s) detected in a previous frame to new position(s). Such newly positioned updated face window(s) may then be stored in valid face(s) store 907 and may become the starting point for tracking in a next frame, and so on. Such processing may be summarized as follows.

Facial regions are determined only at key frames. To keep the processing speed fast, for each face region, the face region tracker uses basic features of face regions (e.g., segments) and determines the displacement of face segments from frame to frame. Then, for each face region, the following may be performed: determine a corresponding segment (e.g., segment which covers more than 50% of the face region), compute the difference (in x and y direction) between the center of the segment bounding box in the current and previous frames, determine a difference motion vector [dx,dy] as follows: dx=Cx−Cx' (where Cx is the x-coordinate location of the centroid of the corresponding segment in the current frame and Cx' is the x-coordinate location of the centroid of the corresponding segment in the previous frame) and dy=Cy−Cy' (where Cy is the y-coordinate location of the centroid of the corresponding segment in the current frame and Cy' is the y-coordinate location of the centroid of the corresponding segment in the previous frame), and updating the face region according to the motion vector from the previous frame by adding the (dx,dy) differential motion vector to the face area bounding box.

Figure 19B:
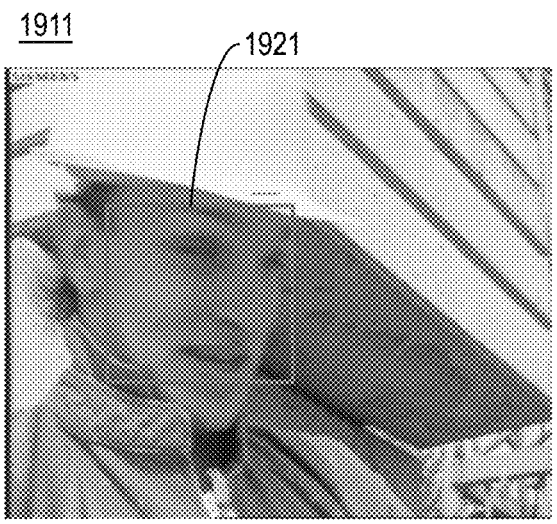
FIG. 19B illustrates example operations and partial results of face region tracking.
Figure 19B:
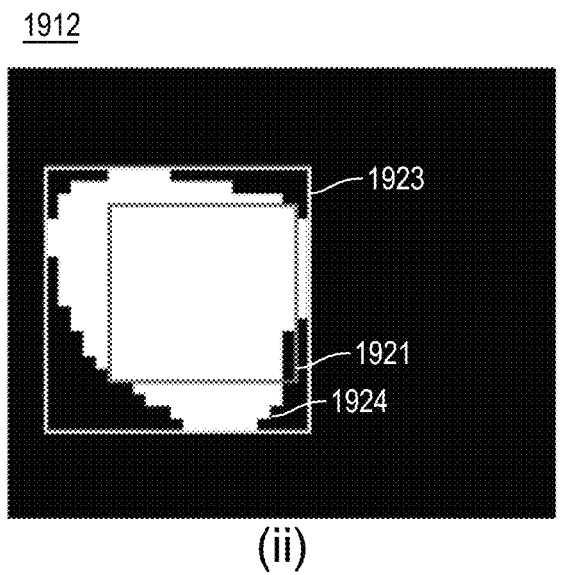
Figure 19B:
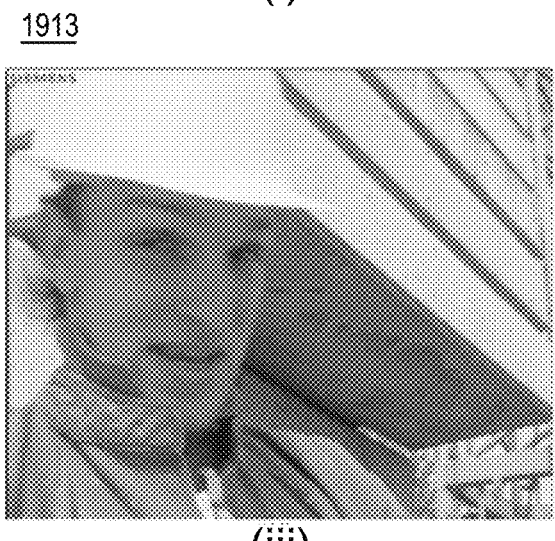
Figure 19B:
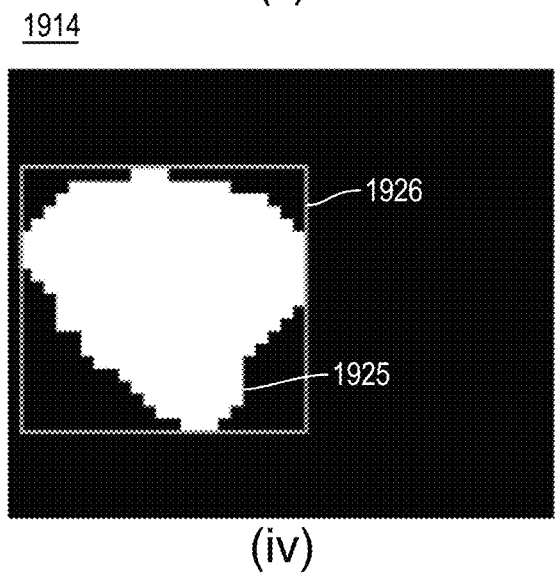
Figure 19B:
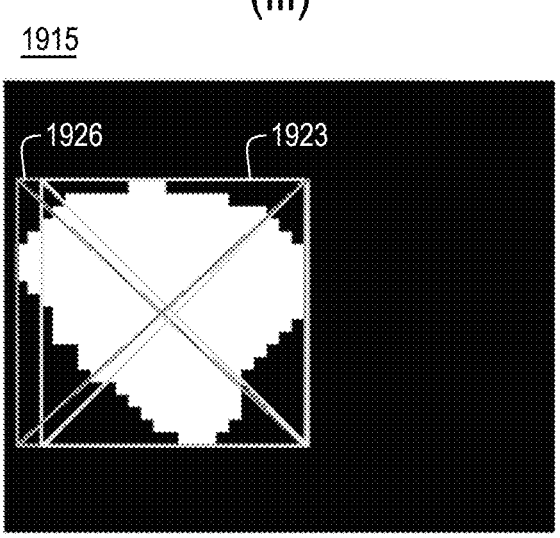
Figure 19B:
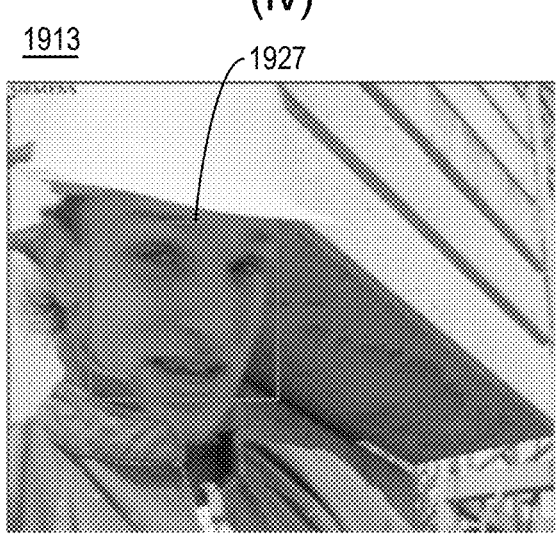

FIG. 19B illustrates example operations and partial results of face region tracking, arranged in accordance with at least some implementations of the present disclosure. For example, such operations and partial results are illustrated with respect to the Foreman sequence. For example, FIG. 19B(i) illustrates a previous frame 1911 of the Foreman sequence with an overlaid rectangular window 1921 (e.g., a face detection window) illustrating a location of the face. FIG. 19B(ii) illustrates, for the same frame, a mask 1912 with the overlaid rectangular window 1921 showing the location of the face (e.g., the face detection window is the inner window), a segmented free-form face region boundary mask 1924 (e.g., generated using the rectangular face window and a skin-tone mask as discussed herein), an external bounding box 1923 based on segmented free-form face region boundary mask 1924.

FIG. 19B(iii) illustrates a current frame of the Foreman sequence 1913 and FIG. 19B(iv) illustrates, for the same frame, of the Foreman sequence, a skin tone based free-form face region boundary mask 1925 obtained by searching near free-form face region boundary mask 1924 from the previous frame 1911. FIG. 19B(iv) also illustrates an overlaid rectangular window 1926, which is a bounding box to the detected free-form face region boundary mask 1925.

Next, FIG. 19B(v) illustrates external bounding box 1926 (e.g., the face region and bounding box of FIG. 19B(iv) and its centroid (e.g., as the center of the X provided within the bounding box) and external bounding box 1923 (e.g., the overlaid face window bounding box from previous frame 1912 and its centroid (e.g., as the center of the X provided within the bounding box). As discussed, a shift vector (dx, dy) may be computed based on distances in the x and y directions between the two centroids (e.g., the centroids of external bounding box 1923 and external bounding box 1926). In the illustrated example, the shift vector is (−1,0). FIG. 19B(vi) illustrates, for current frame 1913, a location of an inner face window 1927 determined based on the location of overlaid rectangular window 1921 from frame 1911 (e.g., the window from the previous frame) compensated by the shift vector (e.g., moved by (−1,0) for current frame 1913. The updated location of inner window 1927 may then used as a starting face window location for a subsequent frame, for which the face window may be similarly updated and used for the following frame, and so forth, which may provide for tracking of face window. Such tracking may be reset by a key frame as discussed herein such that face tracking is reset and a new Viola-Jones feature matching search is conducted for face detection in the key frame.

Furthermore, while the aforementioned discussion refers to detection and tracking of a single face window, without loss of generality, such techniques also apply to detection of multiple faces within a frame and tracking of a face window per face over a number of frames.

Figure 20:
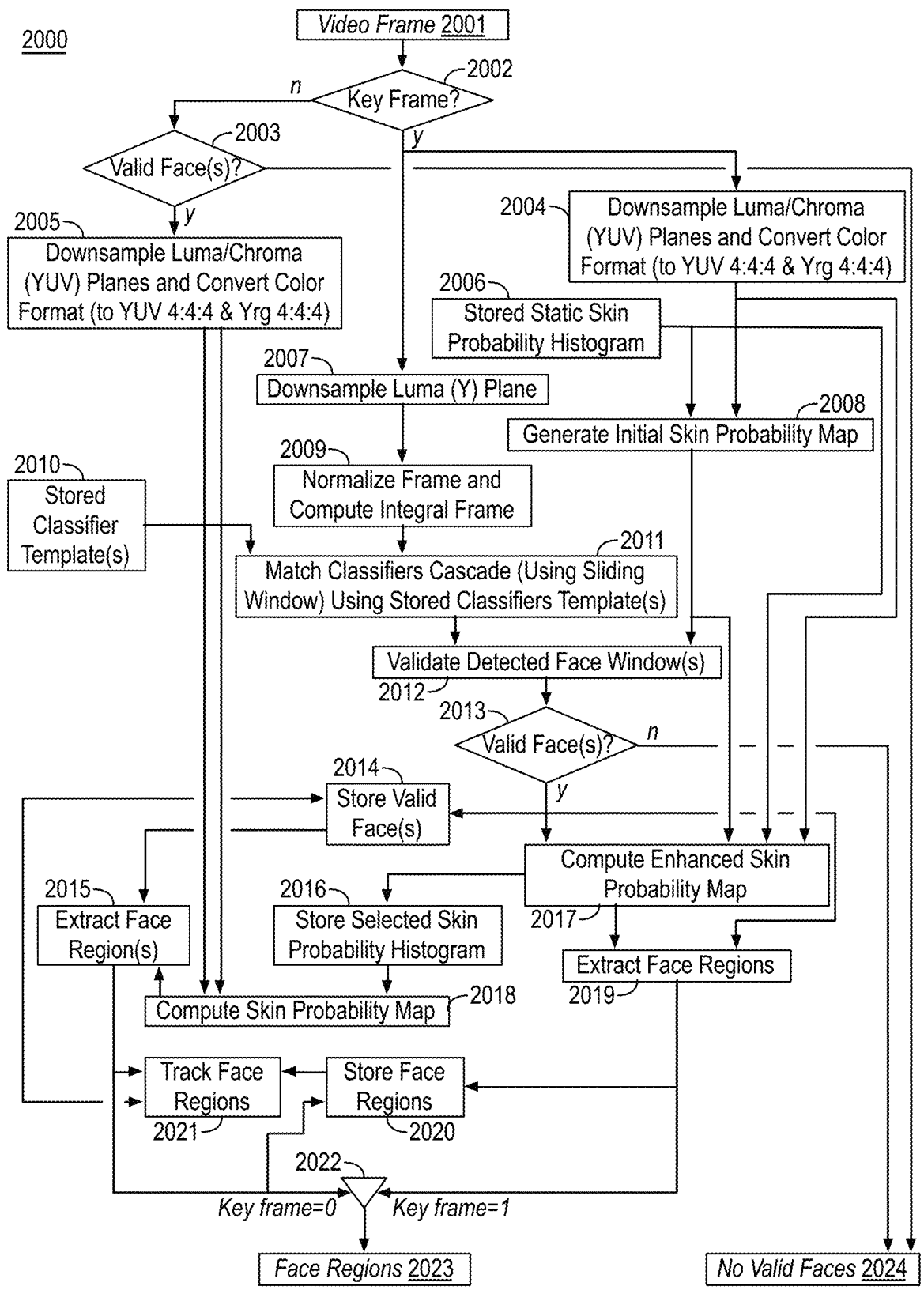
FIG. 20 is a flow diagram illustrating an example process for face region detection and tracking.

FIG. 20 is a flow diagram illustrating an example process 2000 for face region detection and tracking, arranged in accordance with at least some implementations of the present disclosure. Process 2000 may include one or more operations 2001-2024 as illustrated in FIG. 20. For example, process 2000 may be performed by system 900 as discussed with respect to FIG. 9.

As shown, process 2000 may begin at operation 2001, "Video Frame", where an input (e.g., YUV 4:2:0) frame may be received. At operation 2002, "Key Frame?", a determination may be made as to whether the video frame is a key frame. The determination as to whether a frame is a key-frame or not may be made based on whether the frame index corresponding to the frame is a multiple of a key frame index and/or whether the frame is a scene change frame. If the frame is determined to be a key frame, the frame may undergo processing on two parallel sub-paths.

For example, for key frames as determined at operation 2002, on a first sub-path, the luma (Y) plane of the frame may be downsampled at operation 2007, "Downsample Luma (Y) Plane" and the downsampled luma plane may be normalized and an integral frame may be computed at operation 2009, "Normalize Frame and Compute Integral Frame". The integral frame determined at operation 2009 may be searched for features using stored feature templates from stored classifiers template(s) 2010 at operation 2011, "Classify Features (Using Sliding Window) Using Stored Classifiers Templates," which may provide detected face windows. The detected face windows may be validated by at operation 2012, "Validate Detected Face Window", where valid face windows may be detected as discussed below. As shown, if no valid faces are detected as determined at operation 2013, "Valid Face(s)", processing may end for the current frame at operation 2024, "No Valid Faces", where no valid faces may be determined.

Optionally in parallel to the discussed first sub-path for key frames, a second sub-path may process the input frame for the presence of human skin-tones. For example, at operation 2004, "Downsample Luma/Chroma (YUV) Planes and Convert Color Format (to YUV 4:4:4 and Yrg 4:4:4)", luma and chroma planes of the key frame may be downsampled and converted to the YUV and Yrg color spaces. The Yrg color converted frame may be provided to operation 2008, "Generate Initial Skin Probability Map", where an initial skin probability map may be generated. The result of the operations 2009 and 2011 may be provided to aforementioned operation 2012, where a binary signal per face window may be determined that identifies whether a face window includes a valid face or not. If one or more valid face window(s) are found, processing may continue such that free-form face regions may be extracted at operation 201.

For example, at operation 2017, "Compute Enhanced Skin Probability Map", valid faces from operation 2013, a skin probability map from the operation 2008, a YUV 4:4:4 converted frame from operation 2004, and a training based skin probability histogram from stored static skin probability histogram 2006 may be received and an improved skin probability map may generated. The output of operation 2017 may be provided with valid faces from operation 2012 to operation 2019, "Extract Face Region(s)", where free-form face regions may be located. As shown the free-form face regions may be stored at operation 2020, "Store Face Regions." Furthermore, operation 2017 outputs a best histogram from two choices (e.g., a static skin probability histogram and a dynamic skin probability histogram), which may be stored at operation 2016, "Store Selected Histogram."

Returning to operation 2002, if the received video frame is not a key frame and contains valid faces as determined at operation 2003, "Valid Face(s)", the frame may be downsampled (e.g., the luma and chroma planes may be downsampled) and color format to converted YUV 4:2:0 and Yrg 4:2:0 at operation 2005, "Downsample Luma/Chroma (YUV) Planes and Convert Color Format (to YUV 4:4:4: and Yrg 4:4:4). If no valid faces are in the frame, processing may end at operation 2024. Processing may continue from operation 2005 at operation 2018, "Compute Skin Probability Map", such that both formats (e.g., YUV 4:4:4: and Yrg 4:4:4) along with the stored selected skin probability histogram stored at operation 2016 are received and a skin probability map may be generated. The skin probability map may be provided to operation 2015, "Extract Face Region(s)", where free-form face regions may be located. As shown, the free-form face regions from operation 2015 and the free-form face regions from operation 2020 may be received at operation 2021, "Track Face Region(s)", where the free-from face regions may be tracked and stored at operation for later use.

Thus, both paths, the key-frame path and the non key-frame path, result in extraction of free-form face regions. In the case of the key-frame path, the free-form face regions are extracted by searching for and finding valid face windows and explicitly extracting face regions. In the case of the non key-frame path, the free-form face regions are extracted by implicitly tracking key-frame located face regions.

Figure 21:
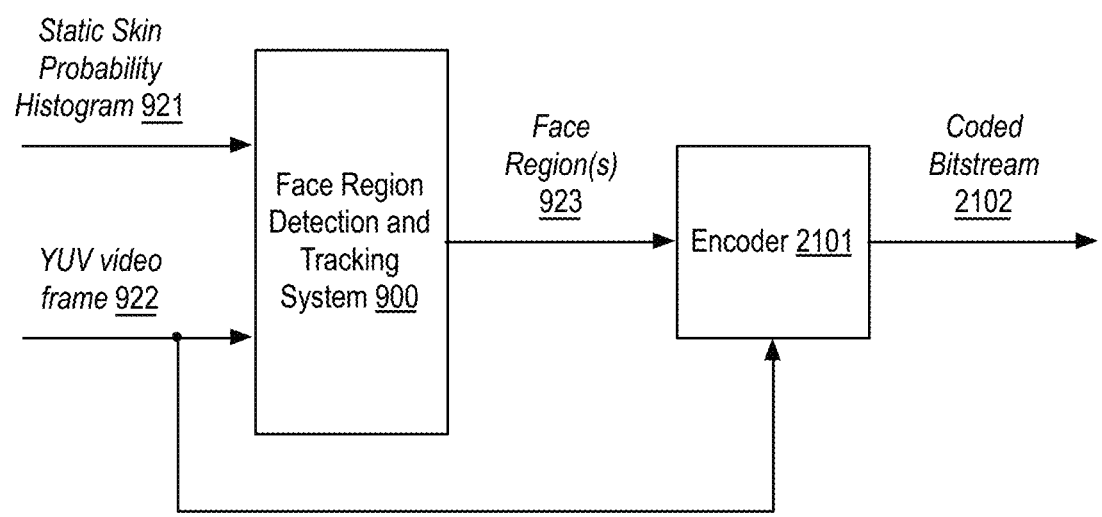
FIG. 21 is an illustrative diagram of an example system for providing improved coding based on face region detection and tracking.

FIG. 21 is an illustrative diagram of an example system 2100 for providing improved coding based on face region detection and tracking, arranged in accordance with at least some implementations of the present disclosure. As shown in FIG. 21, system 2100 may include face region detection and tracking system 900 and an encoder 2101. Face region detection and tracking system 900 may include any components, modules, or the like discussed herein with respect to system 900 and/or as discussed in detail with respect to the components or modules of system 900. As shown, system 900 may provide face region(s) 923 such as free form face regions as discussed herein. In addition or in the alternative, system 900 may provide other data or signals generated by system 900 such as valid face rectangles or the like. Furthermore, in addition or in the alternative, encoder 2101 may provide a signal or signals to system 900 inducing whether YUV video frame 922 is a key frame or the like. Also, as discussed, although illustrated with respect to YUV video frame 922, system 2100 may receive any number of video frames, video sequences, or the like in any suitable color space.

For example, system 900 may receive YUV video frame 922 and perform a multi-stage facial search of YUV video frame 922 based on predetermined feature templates and a predetermined number of stages to determine one or more candidate face regions in YUV video frame 922. Such candidate face regions in YUV video frame 922 may be tested based on static skin probability histogram 921 (e.g., skin tone information) to determine whether the candidate face regions are valid face regions. Invalid face regions, if any, may be discarded. Valid face regions, if any, or data corresponding thereto may be provided to encoder 2101 via face region(s) 923 and encoder 2101 may encode YUV video frame 922 based on face region(s) 923 to generate coded bitstream 2102.

System 900 may determine face region(s) 923 using any techniques discussed herein. Encoder 2101 may encode YUV video frame 922 (and other video frames) based on face region(s) 923 (including face regions for such other video frames) to generate coded bitstream 2102 using any suitable technique or techniques. In an embodiment, encoding a video frame based on a valid face region includes reducing a quantization parameter corresponding to the valid face region (e.g., reducing a quantization parameter in a block or blocks of the valid face region to improve the corresponding image quality upon decode coded bitstream 2102). In an embodiment, encoding a video frame based on a valid face region includes adjusting a lambda value for the valid face region (e.g., adjusting a lambda value in a block or blocks of the valid face region to improve the corresponding image quality upon decode coded bitstream 2102). In an embodiment, encoding a video frame based on a valid face region includes disabling skip coding for the valid face region.

Encoder 2101 may include any suitable encoder that may encode video frames into any suitable format. For example, encoder 2101 may be a standards compliant encoder such that coded bitstream 2102 is a standards compliant bitstream. For example, coded bitstream may be an H.264/Advanced Video Coding (AVC) compliant bitstream, an H.265/High Efficiency Video Coding (HEVC) compliant bitstream, a VP9 compliant bitstream, a VP10 compliant bitstream, an Alliance for Open Media (AOM) compliant bitstream, or the like.

For example, system 900 may provide a fast face detector for coding HD such that system 900 may provide for updating face location frequently to enable high quality coding (e.g., by reducing the quantizer or adjusting the lambda value appropriately or both) of face regions (Region of Interest (ROI)) in improved video coding (e.g., AVC, HEVC, VP9, VP10 or AOM video coding). Free shape faces at block accuracy (e.g., 4×4 or 8×8) or even down to pixel accuracy as provided by face region(s) 923 may be used to enable high quality coding (e.g., by reducing the quantizer or adjusting the lambda value appropriately or both) of face regions (Region of Interest (ROI)) in improved video coding (e.g., AVC, HEVC, VP9, VP10 or AOM video coding). Furthermore, face tracking used to update positions of face rectangles or face regions may enable high quality coding (e.g., by reducing the quantizer or adjusting the lambda value appropriately or both) of face regions (Region of Interest (ROI)) in improved video coding (e.g., AVC, HEVC, VP9, VP10 or AOM video coding). Further coding improvements may be provided with respect to a face region (Region of Interest (ROI)) by not enabling skipping or other means by which bit savings occur at the expense of quality degradation in video coding as per video coding based on AVC, HEVC, VP9, VP10 or AOM specifications.

Figure 22:
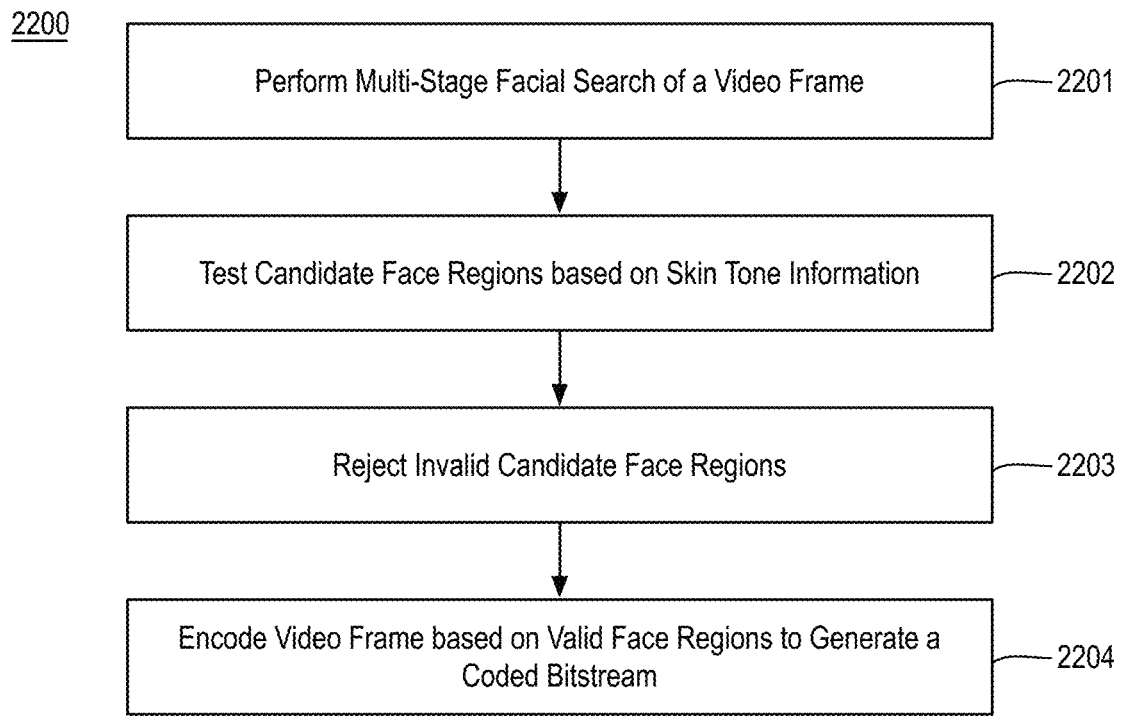
FIG. 22 is a flow diagram illustrating an example process for performing video coding based on face detection.

FIG. 22 is a flow diagram illustrating an example process 2200 for performing video coding based on face detection, arranged in accordance with at least some implementations of the present disclosure. Process 2200 may include one or more operations 2201-2204 as illustrated in FIG. 22. Process 2200 may form at least part of a video coding process. By way of non-limiting example, process 2200 may form at least part of a video coding process as performed by system 2100 as discussed herein. Furthermore, process 2200 will be described with reference to system 2300 of FIG. 23.

Figure 23:
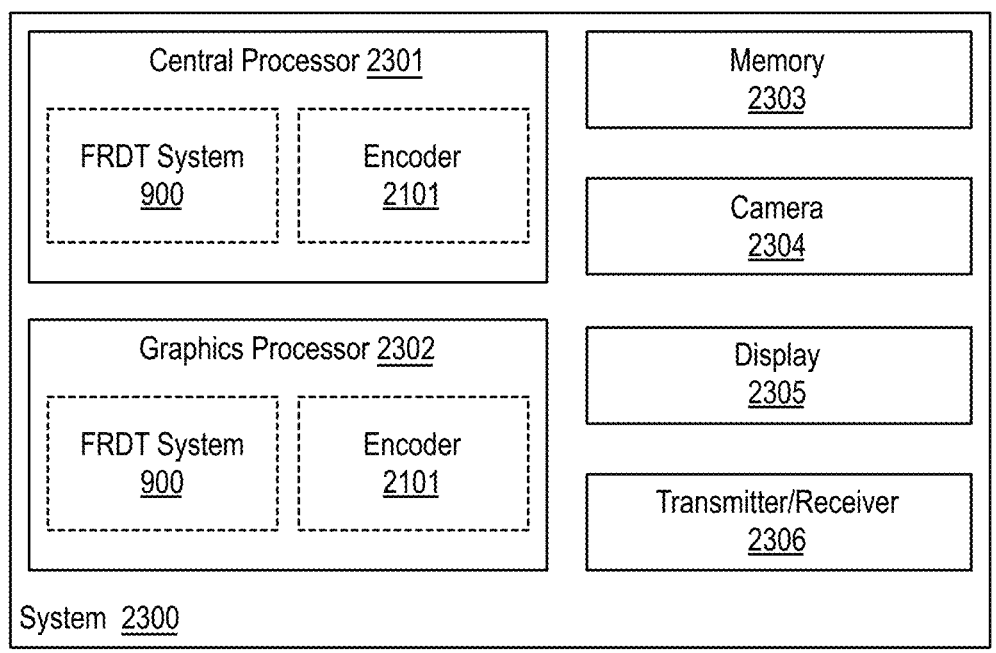
FIG. 23 is an illustrative diagram of an example system for performing video coding based on face detection.

FIG. 23 is an illustrative diagram of an example system 2300 for performing video coding based on face detection, arranged in accordance with at least some implementations of the present disclosure. As shown in FIG. 23, system 2300 may include a central processor 2301, a graphics processor 2302, a memory 2303, a camera 2304, a display 2305, and a transmitter/receiver 2306. In some embodiments system 2300 may not include camera 2304, display 2305, and/or transmitter/receiver 2306. As shown, central processor 2301 and/or graphics processor 2302 may implement face region detection and tracking (FRDT) system 900 and/or encoder 2101. System 900 and encoder 2101 may include any system and encoder as discussed herein or combinations thereof. In the example of system 2300, memory 2303 may store frame data, image data, face recognition and/or tracking data, and/or bitstream data or any related data such as any other data discussed herein.

As shown, in some embodiments, face region detection and tracking system 900 and/or encoder 2101 may be implemented via central processor 2301. In other embodiments, one or more or portions of face region detection and tracking system 900 and/or encoder 2101 may be implemented via graphics processor 2302. In yet other embodiments, face region detection and tracking system 900 and/or encoder 2101 may be implemented by an image processing unit, an image processing pipeline, a video processing pipeline, or the like. In some embodiments, face region detection and tracking system 900 and/or encoder 2101 may be implemented in hardware as a system-on-a-chip (SoC).

Graphics processor 2302 may include any number and type of graphics processing units that may provide the operations as discussed herein. Such operations may be implemented via software or hardware or a combination thereof. For example, graphics processor 2302 may include circuitry dedicated to manipulate and/or analyze images or frames obtained from memory 2303. Central processor 2301 may include any number and type of processing units or modules that may provide control and other high level functions for system 2300 and/or provide any operations as discussed herein. Memory 2303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 2303 may be implemented by cache memory. In an embodiment, one or more or portions of face region detection and tracking system 900 and/or encoder 2101 may be implemented via an execution unit (EU) of graphics processor 2302 or another processor. The EU may include, for example, programmable logic or circuitry such as a logic core or cores that may provide a wide array of programmable logic functions. In an embodiment, one or more or portions of face region detection and tracking system 900 and/or encoder 2101 may be implemented via dedicated hardware such as fixed function circuitry or the like. Fixed function circuitry may include dedicated logic or circuitry and may provide a set of fixed function entry points that may map to the dedicated logic for a fixed purpose or function. Camera 2304 may be any suitable camera or device that may obtain image or frame data for processing such as encode processing as discussed herein. Display 2305 may be any display or device that may present image or frame data such as decoded images or frames as discussed herein. Transmitter/receiver 2306 may include any suitable transmitter and/or receiver that may transmit or receive bitstream data as discussed herein.

System 2300 may implement any devices, systems, encoders, decoders, modules, units, or the like as discussed herein. Furthermore, system 2300 may implement any processes, operations, or the like as discussed herein. System 2300 may have any suitable form factor. For example, system 2300 may be implemented by a camera, a smart-phone, an ultrabook, a tablet, a wearable device, a monitor, a desktop computer, a set top box, or the like.

Returning to discussion of FIG. 22, process 2200 may begin at operation 2201, where a multi-stage facial search of a received video frame may be performed to determine candidate face regions (e.g., one or more or no candidate face regions). The multi-stage facial search may be performed using any suitable technique or techniques. In an embodiment, the multi-stage facial search may be performed by system 900 as implemented via central processor 2301. In an embodiment, the multi-stage facial search is performed based on predetermined feature templates and a predetermined number of stages to determine a first candidate face region and a second candidate face region in the video frame. The received video frame may be any suitable video frame in any suitable format. In an embodiment, process 2200 may include determining the received video frame is a key frame of a video sequence (e.g., the video frame may be one of multiple frames of a video sequence) and the multi-stage facial search may be performed responsive to the received video frame being a key frame. For example, no search may be performed if the received video frame is not a key frame. For such non key frames, face tracking may be performed as is discussed further below.

Processing may continue at operation 2202, where testing of the candidate face regions based on skin tone information may be performed to determine the candidate face regions are valid and/or invalid face regions. The testing of candidate face regions based on skin tone information may be performed using any suitable technique or techniques. In an embodiment, the testing may be performed by system 900 as implemented via central processor 2301. In an embodiment, the skin tone information is a skin probability map as discussed herein. In an embodiment, as discussed, the candidate face regions may include a first candidate face region and a second candidate face region. In an embodiment, process 2200 may include determining the received video frame is a key frame of a video sequence (e.g., as discussed with respect to operation 2201) and the testing of candidate face regions may be performed responsive to the received video frame being a key frame. For example, no testing may be performed if the received video frame is not a key frame. For such non key frames, face tracking may be performed as is discussed.

Processing may continue at operation 2203, where any invalid face regions detected at operation 2202 may be rejected or discarded. Such invalid face regions may be discarded using any suitable technique or techniques. In an embodiment, the discarding or rejecting may be performed by system 900 as implemented via central processor 2301. In an embodiment, the discussed second candidate face region may be determined to be invalid at operation 2202 and the second candidate face region may be rejected or discarded.

Processing may continue at operation 2204, where the video frame may be encoded based on any detected face regions to generate a coded bitstream. The video frame may be encoded using any suitable technique or techniques. In an embodiment, the video frame may be encoded by encoder 2101 as implemented via central processor 2301. In an embodiment, encoding may be performed based on the discussed first candidate region being a valid face region. Encoding the video frame based on the valid face region may include reducing a quantization parameter corresponding to the valid face region (e.g., the first candidate face region), adjusting a lambda value for valid face region (e.g., the first candidate face region), and/or disabling skip coding for the valid face region (e.g., the first candidate face region). The coded bitstream may include any suitable bitstream. For example, the coded bitstream may be a standards compliant bitstream such as an H.264/Advanced Video Coding (AVC) compliant bitstream, an H.265/High Efficiency Video Coding (HEVC) compliant bitstream, a VP9 compliant bitstream, a VP10 compliant bitstream, or an Alliance for Open Media (AOM) AV1 compliant bitstream The described candidate face regions may have any suitable shape such as square or rectangular or the like or such candidate face regions may be free from face regions as discussed herein. In an embodiment, process 2200 may include, for a square or rectangular face region or the like, determining a free form shape face region corresponding to the square or rectangular face region. The discussed encoding of the video frame may then be based on the free form shape face region. For example, a square or rectangular face region may be accepted as valid based on testing using skin tone information, a free form shape face region corresponding to the square or rectangular face may be determined, and the video frame may be encoded based on the free form shape face region (e.g., by reducing a quantization parameter, adjusting a lambda value, and/or disabling skip coding for the free form shape face region).

In an embodiment, determining a free form shape face region corresponding to a square or rectangular face region may include determining a free form shape face region having pixel accuracy or a small block accuracy (e.g., 2×2 pixel blocks, 4×4 pixel blocks, or the like). In an embodiment, determining a free form shape face region may include generating an enhanced skip probability map corresponding to the square or rectangular face region, binarizing the enhanced skip probability map, and overlaying the binarized enhanced skip probability map over at least a portion of the video frame to provide the free form shape face region. In an embodiment, the video frame is a key frame of a video sequence and a second video frame (e.g., subsequent frame) is a non-key frame of the video sequence and process 2200 may further include performing face detection in the second video frame of the video sequence based on the free form shape face region. In an embodiment, a second free form shape face region may be tracked in the second video frame based on the free form shape face region in the video frame. For example, tracking the second free form shape face region may include determining a location of a second valid face region in the second video frame based on a displacement offset with respect to the first candidate face region. In an embodiment, process 2200 may further include determining the displacement offset based on an offset between a centroid of a bounding box around a skin enhanced region corresponding to the first candidate face region and a second centroid of a second bounding box around a second skin enhanced region in the second video frame.

Although process 2200 and system 2300 are discussed with respect to an encode use case (e.g., to improve coding quality and/or efficiency) for valid face regions determined at operation 2203, other use cases for such valid face regions are available. For example, a process for face detection may include receiving a video frame, performing a multi-stage facial search of the video frame based on predetermined feature templates and a predetermined number of stages to determine a first candidate face region and a second candidate face region in the video frame, testing the first and second candidate face regions based on skin tone information to determine the first candidate face region is a valid face region and the second candidate face region is an invalid face region, and rejecting the second candidate face region, as discussed with respect to operations 2201-2203, and outputting the first candidate face region as a valid face region for further processing. Such further processing may include any particular use case.

In an embodiment, the received video frame is a video frame of a sequence of surveillance video frames and processing may include performing face recognition in the surveillance video frames based on the valid face region. For example, surveillance footage may be analyzed to perform person or face recognition on the surveillance video frames based on the valid face region. In an embodiment, surveillance footage may be analyzed to determine a person is either present in the surveillance video frames or not based on the valid face region.

In an embodiment, the received video frame is a video frame of a sequence of video frames and processing may include adding a marker corresponding to the received video frame to search the received video frame for a person based on the valid face region. For example, the search may include a person detection or a person or face recognition search.

In an embodiment, the received video frame is a video frame of a sequence of video frames and processing may include providing an index indicative of a person being present in the video frame based on the valid face region. For example, the index may be used as a movie index indicating the presence of a character or actor in the movie based on the valid face region.

In an embodiment, the received video frame is a video frame of a sequence of videoconferencing frames and processing may include encoding the video frame based at least in part on the valid face region to generate a coded bitstream. For example, in the context of videoconferencing, only the valid face region or portions of the frame including the valid face region (e.g., portions including people) may be encoded while background regions may not be encoded into the bitstream. In addition or in the alternative, the valid face region may be coded with improved quality in such videoconferencing contexts.

In an embodiment, the received video frame is a video frame of a sequence of video frames and processing may include encoding the video frame based at least in part on the valid face region to generate a coded bitstream. For example, the coded bitstream may not be compliant with current standards and the coded bitstream may include metadata corresponding to the valid face region. For example, the metadata may include an indicator of the valid face region (e.g., that the video frame has a valid face region), a location and/or size of the valid face region, information indicating an outline of the valid face region, or the like. Furthermore, at a separate device (e.g., a decoding device), the coded bitstream may be decoded to generate a decoded (or reconstructed) video frame and to determine the metadata corresponding to the valid face region in the bitstream. At the decoder, such decoded metadata may be used to further process the video frame. For example, the valid face region may be replaced (e.g., with a static image or the like) based on the decoded metadata, the valid face region cropped and image data corresponding only to the valid face region may be displayed based on the decoded metadata, or the decoded video frame may be indexed or marked for further search or the like based on the decoded metadata.

Process 2200 may be performed in series or at least partially in parallel for any number of video frames, video sequences, or the like. Process 2200 may provide improved video coding based on face detection and tracking such that improved compression and/or improved quality may be attained.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 24:
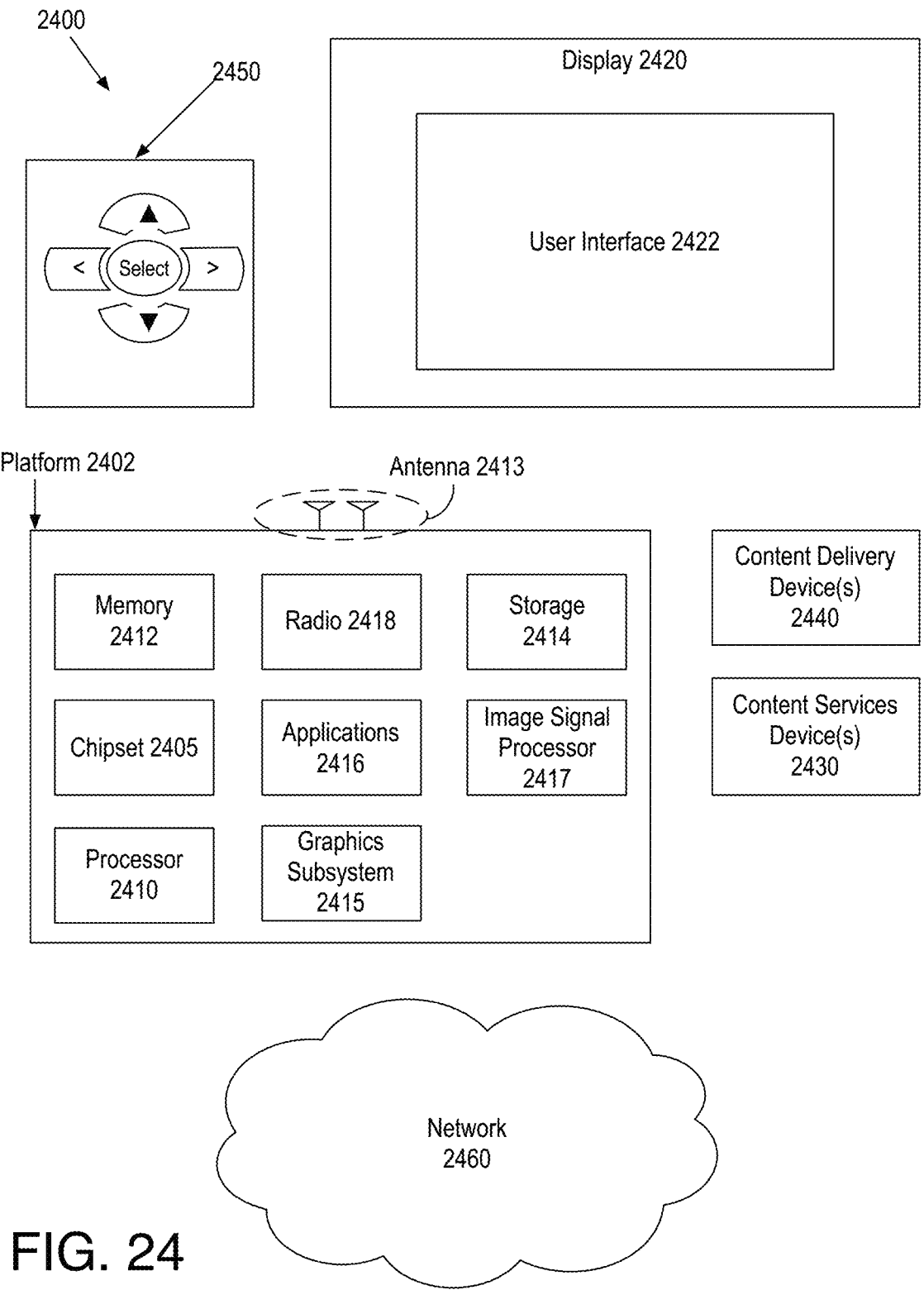
FIG. 24 is an illustrative diagram of an example system.

FIG. 24 is an illustrative diagram of an example system 2400, arranged in accordance with at least some implementations of the present disclosure. In various implementations, system 2400 may be a mobile device system although system 2400 is not limited to this context. For example, system 2400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2400 includes a platform 2402 coupled to a display 2420. Platform 2402 may receive content from a content device such as content services device(s) 2430 or content delivery device(s) 2440 or other content sources such as image sensors 2419. For example, platform 2402 may receive image data as discussed herein from image sensors 2419 or any other content source. A navigation controller 2450 including one or more navigation features may be used to interact with, for example, platform 2402 and/or display 2420. Each of these components is described in greater detail below.

In various implementations, platform 2402 may include any combination of a chipset 2405, processor 2410, memory 2411, antenna 2413, storage 2414, graphics subsystem 2415, applications 2416, image signal processor 2417 and/or radio 2418. Chipset 2405 may provide intercommunication among processor 2410, memory 2411, storage 2414, graphics subsystem 2415, applications 2416, image signal processor 2417 and/or radio 2418. For example, chipset 2405 may include a storage adapter (not depicted) capable of providing intercommunication with storage 2414.

Processor 2410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2410 may be dual-core processor(s), dual-core mobile processor(s), and so forth.

Memory 2411 may be implemented as a volatile memory device such as, but not limited to, a Random Access Memory (RAM), Dynamic Random Access Memory (DRAM), or Static RAM (SRAM).

Storage 2414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2414 may include technology to increase the storage performance enhanced protection for valuable digital media when multiple hard drives are included, for example.

Image signal processor 2417 may be implemented as a specialized digital signal processor or the like used for image processing. In some examples, image signal processor 2417 may be implemented based on a single instruction multiple data or multiple instruction multiple data architecture or the like. In some examples, image signal processor 2417 may be characterized as a media processor. As discussed herein, image signal processor 2417 may be implemented based on a system on a chip architecture and/or based on a multi-core architecture.

Graphics subsystem 2415 may perform processing of images such as still or video for display. Graphics subsystem 2415 may be a graphics processing unit (GPU) or a visual processing unit (VPU), for example. An analog or digital interface may be used to communicatively couple graphics subsystem 2415 and display 2420. For example, the interface may be any of a High-Definition Multimedia Interface, DisplayPort, wireless HDMI, and/or wireless HD compliant techniques. Graphics subsystem 2415 may be integrated into processor 2410 or chipset 2405. In some implementations, graphics subsystem 2415 may be a stand-alone device communicatively coupled to chipset 2405.

The image and/or video processing techniques described herein may be implemented in various hardware architectures. For example, image and/or video functionality may be integrated within a chipset. Alternatively, a discrete graphics and/or video processor may be used. As still another implementation, the image and/or video functions may be provided by a general purpose processor, including a multi-core processor. In further embodiments, the functions may be implemented in a consumer electronics device.

Radio 2418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2418 may operate in accordance with one or more applicable standards in any version.

In various implementations, display 2420 may include any television type monitor or display. Display 2420 may include, for example, a computer display screen, touch screen display, video monitor, television-like device, and/or a television. Display 2420 may be digital and/or analog. In various implementations, display 2420 may be a holographic display. Also, display 2420 may be a transparent surface that may receive a visual projection. Such projections may convey various forms of information, images, and/or objects. For example, such projections may be a visual overlay for a mobile augmented reality (MAR) application. Under the control of one or more software applications 2416, platform 2402 may display user interface 2422 on display 2420.

In various implementations, content services device(s) 2430 may be hosted by any national, international and/or independent service and thus accessible to platform 2402 via the Internet, for example. Content services device(s) 2430 may be coupled to platform 2402 and/or to display 2420. Platform 2402 and/or content services device(s) 2430 may be coupled to a network 2460 to communicate (e.g., send and/or receive) media information to and from network 2460. Content delivery device(s) 2440 also may be coupled to platform 2402 and/or to display 2420.

Image sensors 2419 may include any suitable image sensors that may provide image data based on a scene. For example, image sensors 2419 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 2419 may include any device that may detect information of a scene to generate image data.

In various implementations, content services device(s) 2430 may include a cable television box, personal computer, network, telephone, Internet enabled devices or appliance capable of delivering digital information and/or content, and any other similar device capable of uni-directionally or bi-directionally communicating content between content providers and platform 2402 and/display 2420, via network 2460 or directly. It will be appreciated that the content may be communicated uni-directionally and/or bi-directionally to and from any one of the components in system 2400 and a content provider via network 2460. Examples of content may include any media information including, for example, video, music, medical and gaming information, and so forth.

Content services device(s) 2430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2402 may receive control signals from navigation controller 2450 having one or more navigation features. The navigation features of navigation controller 2450 may be used to interact with user interface 2422, for example. In various embodiments, navigation controller 2450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2450 may be replicated on a display (e.g., display 2420) by movements of a pointer, cursor, focus ring, or other visual indicators displayed on the display. For example, under the control of software applications 2416, the navigation features located on navigation controller 2450 may be mapped to virtual navigation features displayed on user interface 2422, for example. In various embodiments, navigation controller 2450 may not be a separate component but may be integrated into platform 2402 and/or display 2420. The present disclosure, however, is not limited to the elements or in the context shown or described herein.

In various implementations, drivers (not shown) may include technology to enable users to instantly turn on and off platform 2402 like a television with the touch of a button after initial boot-up, when enabled, for example. Program logic may allow platform 2402 to stream content to media adaptors or other content services device(s) 2430 or content delivery device(s) 2440 even when the platform is turned "off." In addition, chipset 2405 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2400 may be integrated. For example, platform 2402 and content services device(s) 2430 may be integrated, or platform 2402 and content delivery device(s) 2440 may be integrated, or platform 2402, content services device(s) 2430, and content delivery device(s) 2440 may be integrated, for example. In various embodiments, platform 2402 and display 2420 may be an integrated unit. Display 2420 and content service device(s) 2430 may be integrated, or display 2420 and content delivery device(s) 2440 may be integrated, for example. These examples are not meant to limit the present disclosure.

In various embodiments, system 2400 may be implemented as a wireless system, a wired system, or a combination of both. When implemented as a wireless system, system 2400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 24.

Figure 25:
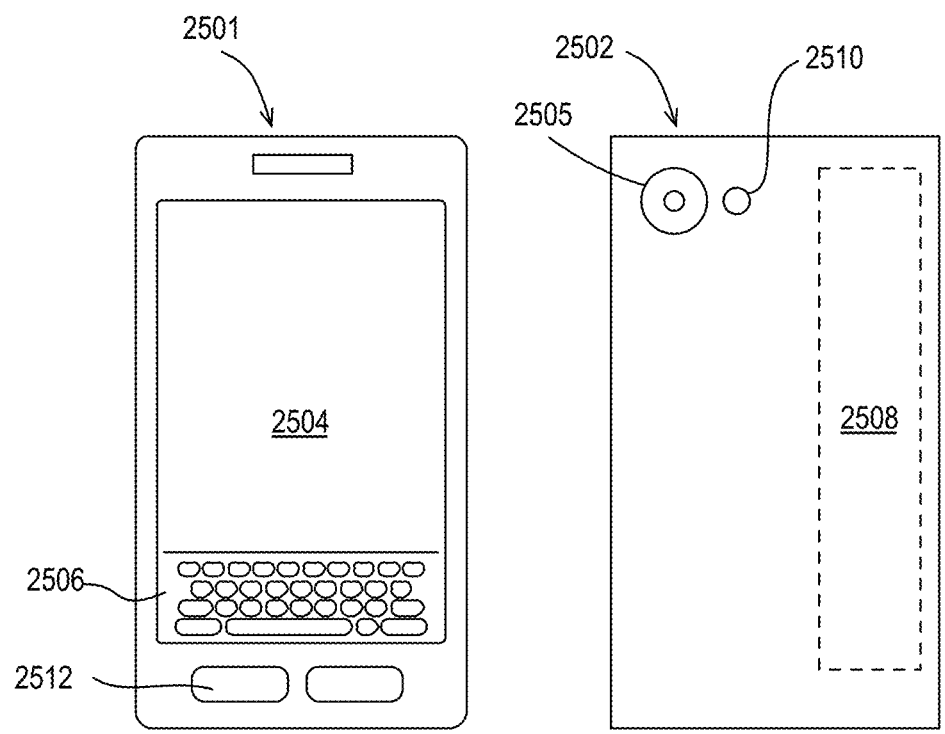
FIG. 25 illustrates an example small form factor device, all arranged in accordance with at least some implementations of the present disclosure.

As described above, system 2400 may be embodied in varying physical styles or form factors. FIG. 25 illustrates an example small form factor device 2500, arranged in accordance with at least some implementations of the present disclosure. In some examples, system 2400 may be implemented via device 2500. In various embodiments, for example, device 2500 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 25, device 2500 may include a housing with a front 2501 and a back 2502. Device 2500 includes a display 2504, an input/output (I/O) device 2506, and an integrated antenna 2508. Device 2500 also may include navigation features 2511. I/O device 2506 may include any suitable I/O device for entering information into a mobile computing device. Examples for I/O device 2506 may include an alphanumeric keyboard, a numeric keypad, a touch pad, input keys, buttons, switches, microphones, speakers, voice recognition device and software, and so forth. Information also may be entered into device 2500 by way of microphone (not shown), or may be digitized by a voice recognition device. As shown, device 2500 may include a camera 2505 (e.g., including a lens, an aperture, and an imaging sensor) and a flash 2510 integrated into back 2502 (or elsewhere) of device 2500. In other examples, camera 2505 and/or flash 2510 may be integrated into front

2501 of device 2500 and/or additional cameras (e.g., such that device 2500 has front and back cameras) may be provided.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, computer implemented method for performing video coding based on face detection comprises receiving a video frame, performing a multi-stage facial search of the video frame based on predetermined feature templates and a predetermined number of stages to determine a first candidate face region and a second candidate face region in the video frame, testing the first and second candidate face regions based on skin tone information to determine the first candidate face region is a valid face region and the second candidate face region is an invalid face region, rejecting the second candidate face region and outputting the first candidate face region, and encoding the video frame based at least in part on the first candidate face region being a valid face region to generate a coded bitstream.

Further to the first embodiments, the skin tone information comprises a skin probability map.

Further to the first embodiments, the video frame comprises one of a plurality of video frames of a video sequence and the method further comprises determining the video frame is a key frame of the video sequence, wherein said performing the multi-stage facial search is performed in response to the video frame being a key frame of the video sequence.

Further to the first embodiments, the video frame comprises one of a plurality of video frames of a video sequence and the method further comprises determining the video frame is a key frame of the video sequence, wherein said testing the first and second candidate face regions based on skin tone information is performed in response to the video frame being a key frame of the video sequence.

Further to the first embodiments, the video frame comprises one of a plurality of video frames of a video sequence and the method further comprises determining the video frame is a key frame of the video sequence, wherein said performing the multi-stage facial search is performed in response to the video frame being a key frame of the video sequence and/or said testing the first and second candidate face regions based on skin tone information is performed in response to the video frame being a key frame of the video sequence.

Further to the first embodiments, the first candidate face region comprises a rectangular region and the method further comprises determining a free form shape face region corresponding to the first candidate face region, wherein the free form shape face region has at least one of a pixel accuracy or a small block of pixels accuracy.

Further to the first embodiments, the first candidate face region comprises a rectangular region and the method further comprises determining a free form shape face region corresponding to the first candidate face region, wherein the free form shape face region has at least one of a pixel accuracy or a small block of pixels accuracy, and wherein determining the free form shape face region comprises generating an enhanced skip probability map corresponding to the first candidate face region, binarizing the enhanced skip probability map, and overlaying the binarized enhanced skip probability map over at least a portion of the video frame to provide the free form shape face region.

Further to the first embodiments, the first candidate face region comprises a rectangular region and the method further comprises determining a free form shape face region corresponding to the first candidate face region, wherein the free form shape face region has at least one of a pixel accuracy or a small block of pixels accuracy, and wherein the video frame comprises a key frame of a video sequence and a second video frame comprises a non-key frame of the video sequence and the method further comprises performing face detection in the second video frame of the video sequence based on the free form shape face region.

Further to the first embodiments, the first candidate face region comprises a rectangular region and the method further comprises determining a free form shape face region corresponding to the first candidate face region, wherein the free form shape face region has at least one of a pixel accuracy or a small block of pixels accuracy, and wherein the video frame comprises a key frame of a video sequence and a second video frame comprises a non-key frame of the video sequence and the method further comprises performing face detection in the second video frame of the video sequence based on the free form shape face region and tracking a second free form shape face region in the second video frame based on the free form shape face region in the video frame.

Further to the first embodiments, the first candidate face region comprises a rectangular region and the method further comprises determining a free form shape face region corresponding to the first candidate face region, wherein the free form shape face region has at least one of a pixel accuracy or a small block of pixels accuracy, and wherein the video frame comprises a key frame of a video sequence and a second video frame comprises a non-key frame of the video sequence and the method further comprises performing face detection in the second video frame of the video sequence based on the free form shape face region and tracking a second free form shape face region in the second video frame based on the free form shape face region in the video frame, wherein tracking the second free form shape face region comprises determining a location of a second valid face region in the second video frame based on a displacement offset with respect to the first candidate face region.

Further to the first embodiments, the first candidate face region comprises a rectangular region and the method further comprises determining a free form shape face region corresponding to the first candidate face region, wherein the free form shape face region has at least one of a pixel accuracy or a small block of pixels accuracy, and wherein the video frame comprises a key frame of a video sequence and a second video frame comprises a non-key frame of the video sequence and the method further comprises performing face detection in the second video frame of the video sequence based on the free form shape face region and tracking a second free form shape face region in the second video frame based on the free form shape face region in the video frame, wherein tracking the second free form shape face region comprises determining a location of a second valid face region in the second video frame based on a displacement offset with respect to the first candidate face region, and the method further comprises determining the displacement offset based on an offset between a centroid of a bounding box around a skin enhanced region corresponding to the first candidate face region and a second centroid of a second bounding box around a second skin enhanced region in the second video frame.

Further to the first embodiments, encoding the video frame based at least in part on the first candidate face region being a valid face region comprises at least one of reducing a quantization parameter corresponding to the first candidate face region, adjusting a lambda value for the first candidate face region, or disabling skip coding for the first candidate face region.

Further to the first embodiments, the bitstream comprises at least one of an H.264/Advanced Video Coding (AVC) compliant bitstream, an H.265/High Efficiency Video Coding (HEVC) compliant bitstream, a VP9 compliant bitstream, a VP10 compliant bitstream, or an Alliance for Open Media (AOM) AV1 compliant bitstream.

In one or more second embodiments, a system for performing video coding based on face detection comprises a memory configured to store a video frame and a processor coupled to the memory, the processor to receive the video frame, to perform a multi-stage facial search of the video frame based on predetermined feature templates and a predetermined number of stages to determine a first candidate face region and a second candidate face region in the video frame, to test the first and second candidate face regions based on skin tone information to determine the first candidate face region is a valid face region and the second candidate face region is an invalid face region, to reject the second candidate face region and outputting the first candidate face region, and to encode the video frame based at least in part on the first candidate face region being a valid face region to generate a coded bitstream.

Further to the second embodiments, the skin tone information comprises a skin probability map.

Further to the second embodiments, the video frame comprises one of a plurality of video frames of a video sequence and the processor is further to determine the video frame is a key frame of the video sequence, wherein the processor is to perform the multi-stage facial search or test the first and second candidate face regions based on skin tone information in response to the video frame being a key frame of the video sequence.

Further to the second embodiments, the first candidate face region comprises a rectangular region and the processor is further to determine a free form shape face region corresponding to the first candidate face region, wherein the free form shape face region has at least one of a pixel accuracy or a small block of pixels accuracy.

Further to the second embodiments, the first candidate face region comprises a rectangular region and the processor is further to determine a free form shape face region corresponding to the first candidate face region, wherein the free form shape face region has at least one of a pixel accuracy or a small block of pixels accuracy and the processor to determine the free form shape face region comprises the processor to generate an enhanced skip probability map corresponding to the first candidate face region, to binarize the enhanced skip probability map, and to overlay the binarized enhanced skip probability map over at least a portion of the video frame to provide the free form shape face region.

Further to the second embodiments, the first candidate face region comprises a rectangular region and the processor is further to determine a free form shape face region corresponding to the first candidate face region, wherein the free form shape face region has at least one of a pixel accuracy or a small block of pixels accuracy, wherein the video frame comprises a key frame of a video sequence and a second video frame comprises a non-key frame of the video sequence, and the processor is further to perform face detection in the second video frame of the video sequence based on the free form shape face region.

Further to the second embodiments, the first candidate face region comprises a rectangular region and the processor is further to determine a free form shape face region corresponding to the first candidate face region, wherein the free form shape face region has at least one of a pixel accuracy or a small block of pixels accuracy, wherein the video frame comprises a key frame of a video sequence and a second video frame comprises a non-key frame of the video sequence, and the processor is further to perform face detection in the second video frame of the video sequence based on the free form shape face region and to track a second free form shape face region in the second video frame based on the free form shape face region in the video frame.

Further to the second embodiments, the first candidate face region comprises a rectangular region and the processor is further to determine a free form shape face region corresponding to the first candidate face region, wherein the free form shape face region has at least one of a pixel accuracy or a small block of pixels accuracy, wherein the video frame comprises a key frame of a video sequence and a second video frame comprises a non-key frame of the video sequence, and the processor is further to perform face detection in the second video frame of the video sequence based on the free form shape face region and to track a second free form shape face region in the second video frame based on the free form shape face region in the video frame, wherein the processor to track the second free form shape face region comprises the processor to determine a location of a second valid face region in the second video frame based on a displacement offset with respect to the first candidate face region.

Further to the second embodiments, the first candidate face region comprises a rectangular region and the processor is further to determine a free form shape face region corresponding to the first candidate face region, wherein the free form shape face region has at least one of a pixel accuracy or a small block of pixels accuracy, wherein the video frame comprises a key frame of a video sequence and a second video frame comprises a non-key frame of the video sequence, and the processor is further to perform face detection in the second video frame of the video sequence based on the free form shape face region and to track a second free form shape face region in the second video frame based on the free form shape face region in the video frame, wherein the processor to track the second free form shape face region comprises the processor to determine a location of a second valid face region in the second video frame based on a displacement offset with respect to the first candidate face region, wherein the processor is further to determine the displacement offset based on an offset between a centroid of a bounding box around a skin enhanced region corresponding to the first candidate face region and a second centroid of a second bounding box around a second skin enhanced region in the second video frame.

Further to the second embodiments, to encode the video frame based at least in part on the first candidate face region being a valid face region comprises the processor to reduce a quantization parameter corresponding to the first candidate face region, adjust a lambda value for the first candidate face region, or disable skip coding for the first candidate face region.

In one or more third embodiments, a system comprises means for receiving a video frame, means for performing a multi-stage facial search of the video frame based on predetermined feature templates and a predetermined number of stages to determine a first candidate face region and a second candidate face region in the video frame, means for testing the first and second candidate face regions based on skin tone information to determine the first candidate face region is a valid face region and the second candidate face region is an invalid face region, means for rejecting the second candidate face region and outputting the first candidate face region, and means for encoding the video frame based at least in part on the first candidate face region being a valid face region to generate a coded bitstream.

Further to the third embodiments, the video frame comprises one of a plurality of video frames of a video sequence and the system further comprises means for determining the video frame is a key frame of the video sequence, wherein the means for performing the multi-stage facial search perform the multi-stage facial search in response to the video frame being a key frame of the video sequence.

Further to the third embodiments, the video frame comprises one of a plurality of video frames of a video sequence and the system further comprises means for determining the video frame is a key frame of the video sequence, wherein the means for testing the first and second candidate face regions based on skin tone information perform the testing in response to the video frame being a key frame of the video sequence.

Further to the third embodiments, the first candidate face region comprises a rectangular region and the system further comprises means for determining a free form shape face region corresponding to the first candidate face region, wherein the free form shape face region has at least one of a pixel accuracy or a small block of pixels accuracy.

Further to the third embodiments, the first candidate face region comprises a rectangular region and the system further comprises means for determining a free form shape face region corresponding to the first candidate face region, wherein the free form shape face region has at least one of a pixel accuracy or a small block of pixels accuracy, wherein the means for determining the free form shape face region comprise means for generating an enhanced skip probability map corresponding to the first candidate face region, means for binarizing the enhanced skip probability map, and means for overlaying the binarized enhanced skip probability map over at least a portion of the video frame to provide the free form shape face region.

Further to the third embodiments, the first candidate face region comprises a rectangular region and the system further comprises means for determining a free form shape face region corresponding to the first candidate face region, wherein the free form shape face region has at least one of a pixel accuracy or a small block of pixels accuracy, wherein the video frame comprises a key frame of a video sequence and a second video frame comprises a non-key frame of the video sequence, the system further comprising means for performing face detection in the second video frame of the video sequence based on the free form shape face region.

Further to the third embodiments, the first candidate face region comprises a rectangular region and the system further comprises means for determining a free form shape face region corresponding to the first candidate face region, wherein the free form shape face region has at least one of a pixel accuracy or a small block of pixels accuracy, wherein the video frame comprises a key frame of a video sequence and a second video frame comprises a non-key frame of the video sequence, the system further comprising means for performing face detection in the second video frame of the video sequence based on the free form shape face region, and the system further comprises means for tracking a second free form shape face region in the second video frame based on the free form shape face region in the video frame.

Further to the third embodiments, the means for encoding the video frame based at least in part on the first candidate face region being a valid face region comprises at least one of means for reducing a quantization parameter corresponding to the first candidate face region, means for adjusting a lambda value for the first candidate face region, or means for disabling skip coding for the first candidate face region.

In one or more fourth embodiments, at least one machine readable medium comprises a plurality of instructions that, in response to being executed on a device, cause the device to perform video coding based on face detection by receiving a video frame, performing a multi-stage facial search of the video frame based on predetermined feature templates and a predetermined number of stages to determine a first candidate face region and a second candidate face region in the video frame, testing the first and second candidate face regions based on skin tone information to determine the first candidate face region is a valid face region and the second candidate face region is an invalid face region, rejecting the second candidate face region and outputting the first candidate face region, and encoding the video frame based at least in part on the first candidate face region being a valid face region to generate a coded bitstream.

Further to the fourth embodiments, the first candidate face region comprises a rectangular region and the machine readable medium comprises further instructions that, in response to being executed on the device, cause the device to perform video coding based on face detection by determining a free form shape face region corresponding to the first candidate face region, wherein the free form shape face region has at least one of a pixel accuracy or a small block of pixels accuracy.

Further to the fourth embodiments, determining the free form shape face region comprises generating an enhanced skip probability map corresponding to the first candidate face region, binarizing the enhanced skip probability map, and overlaying the binarized enhanced skip probability map over at least a portion of the video frame to provide the free form shape face region.

Further to the fourth embodiments, the video frame comprises a key frame of a video sequence and a second video frame comprises a non-key frame of the video sequence, the machine readable medium comprising further instructions that, in response to being executed on the device, cause the device to perform video coding based on face detection by performing face detection in the second video frame of the video sequence based on the free form shape face region.

Further to the fourth embodiments, the video frame comprises a key frame of a video sequence and a second video frame comprises a non-key frame of the video sequence, the machine readable medium comprising further instructions that, in response to being executed on the device, cause the device to perform video coding based on face detection by performing face detection in the second video frame of the video sequence based on the free form shape face region, the machine readable medium comprising further instructions that, in response to being executed on the device, cause the device to perform video coding based on face detection by tracking a second free form shape face region in the second video frame based on the free form shape face region in the video frame.

Further to the fourth embodiments, encoding the video frame based at least in part on the first candidate face region being a valid face region comprises at least one of reducing a quantization parameter corresponding to the first candidate face region, adjusting a lambda value for the first candidate face region, or disabling skip coding for the first candidate face region.

In one or more fifth embodiments, a computer implemented method for performing face detection comprises receiving a video frame, performing a multi-stage facial search of the video frame based on predetermined feature templates and a predetermined number of stages to determine a first candidate face region and a second candidate face region in the video frame, testing the first and second candidate face regions based on skin tone information to determine the first candidate face region is a valid face region and the second candidate face region is an invalid face region, and rejecting the second candidate face region and outputting the first candidate face region as a valid face region for further processing.

Further to the fifth embodiments, the received video frame comprises a video frame of a sequence of surveillance video frames and the method further comprises performing face recognition in the surveillance video frames based on the valid face region.

Further to the fifth embodiments, the received video frame comprises a video frame of a sequence of decoded video frames and the method further comprises adding a marker corresponding to the received video frame to perform face recognition on the received video frame based on the valid face region.

Further to the fifth embodiments, the received video frame comprises a video frame of a sequence of decoded video frames and the method further comprises the received video frame comprises a video frame of a sequence of decoded video frames and the method further comprises.

Further to the fifth embodiments, the received video frame comprises a video frame of a sequence of video frames received during a device login attempt and the method further comprises performing face recognition based on the valid face region and allowing access to the device if a secured face is recognized.

Further to the fifth embodiments, the received video frame comprises a video frame of a sequence of videoconferencing frames and the method further comprises encoding the video frame based at least in part on the valid face region to generate a coded bitstream.

Further to the fifth embodiments, the received video frame comprises a video frame of a sequence of videoconferencing frames and the method further comprises encoding the video frame based at least in part on the valid face region to generate a coded bitstream, wherein encoding the video frame comprises not encoding a background region of the video frame into the bitstream.

Further to the fifth embodiments, the method further comprises encoding the video frame based at least in part on the valid face region to generate a coded bitstream, wherein encoding the video frame comprises including metadata corresponding to the valid face region in the bitstream.

Further to the fifth embodiments, the method further comprises encoding the video frame based at least in part on the valid face region to generate a coded bitstream, wherein encoding the video frame comprises including metadata corresponding to the valid face region in the bitstream, and decoding the coded bitstream to generate a decoded video frame and to determine the metadata corresponding to the valid face region in the bitstream.

Further to the fifth embodiments, the method further comprises encoding the video frame based at least in part on the valid face region to generate a coded bitstream, wherein encoding the video frame comprises including metadata corresponding to the valid face region in the bitstream, decoding the coded bitstream to generate a decoded video frame and to determine the metadata corresponding to the valid face region in the bitstream, and at least one of replacing the valid face region based on the decoded metadata, cropping and displaying image data corresponding only to the valid face region based on the decoded metadata, or indexing the decoded video frame based on the decoded metadata.

In one or more sixth embodiments, a system for performing face detection comprises a memory configured to store a video frame and a processor coupled to the memory, the processor to receive the video frame, to perform a multi-stage facial search of the video frame based on predetermined feature templates and a predetermined number of stages to determine a first candidate face region and a second candidate face region in the video frame, to test the first and second candidate face regions based on skin tone information to determine the first candidate face region is a valid face region and the second candidate face region is an invalid face region, and to reject the second candidate face region and output the first candidate face region as a valid face region for further processing.

Further to the sixth embodiments, the received video frame comprises a video frame of a sequence of surveillance video frames and the processor is further to perform face recognition in the surveillance video frames based on the valid face region.

Further to the sixth embodiments, the received video frame comprises a video frame of a sequence of decoded video frames and the processor is further to add a marker corresponding to the received video frame to perform face recognition on the received video frame based on the valid face region or to provide an index indicative of a person being present in the video frame based on the valid face region.

Further to the sixth embodiments, the received video frame comprises a video frame of a sequence of video frames received during a device login attempt and the processor is further to perform face recognition based on the valid face region and to allow access to the device if a secured face is recognized.

Further to the sixth embodiments, the received video frame comprises a video frame of a sequence of videoconferencing frames and the processor is further to encode the video frame based at least in part on the valid face region to generate a coded bitstream, wherein the processor to encode the video frame comprises the processor to not encode a background region of the video frame into the bitstream.

Further to the sixth embodiments, the processor is further to encode the video frame based at least in part on the valid face region to generate a coded bitstream, wherein the processor to encode the video frame comprises the processor to include metadata corresponding to the valid face region in the bitstream, the system further comprising a decoder to decode the coded bitstream to generate a decoded video frame and to determine the metadata corresponding to the valid face region in the bitstream and to replace the valid face region based on the decoded metadata, crop and display image data corresponding only to the valid face region based on the decoded metadata, or index the decoded video frame based on the decoded metadata.

In one or more seventh embodiments, a system comprises means for receiving a video frame, means for performing a multi-stage facial search of the video frame based on predetermined feature templates and a predetermined number of stages to determine a first candidate face region and a second candidate face region in the video frame, means for testing the first and second candidate face regions based on skin tone information to determine the first candidate face region is a valid face region and the second candidate face region is an invalid face region, and means for rejecting the second candidate face region and outputting the first candidate face region as a valid face region for further processing.

Further to the seventh embodiments, the received video frame comprises a video frame of a sequence of surveillance video frames and the system further comprises means for performing face recognition in the surveillance video frames based on the valid face region.

Further to the seventh embodiments, the received video frame comprises a video frame of a sequence of decoded video frames and the system further comprises means for adding a marker corresponding to the received video frame to perform face recognition on the received video frame based on the valid face region or means for providing an index indicative of a person being present in the video frame based on the valid face region.

Further to the seventh embodiments, the received video frame comprises a video frame of a sequence of video frames received during a device login attempt and the system further comprises means for performing face recognition based on the valid face region and means for allowing access to the device if a secured face is recognized.

Further to the seventh embodiments, the received video frame comprises a video frame of a sequence of videoconferencing frames and the system further comprises means for encoding the video frame based at least in part on the valid face region to generate a coded bitstream, wherein the means for encoding the video frame comprise means for not encoding a background region of the video frame into the bitstream.

Further to the seventh embodiments, the system further comprises means for encoding the video frame based at least in part on the valid face region to generate a coded bitstream, wherein encoding the video frame comprises including metadata corresponding to the valid face region in the bitstream and means for decoding the coded bitstream to generate a decoded video frame and to determine the metadata corresponding to the valid face region in the bitstream, wherein the means for decoding comprise means for replacing the valid face region based on the decoded metadata, means for cropping and displaying image data corresponding only to the valid face region based on the decoded metadata, means for or indexing the decoded video frame based on the decoded metadata.

In one or more eighth embodiments, at least one machine readable medium comprises a plurality of instructions that, in response to being executed on a device, cause the device to perform face detection by receiving a video frame, performing a multi-stage facial search of the video frame based on predetermined feature templates and a predetermined number of stages to determine a first candidate face region and a second candidate face region in the video frame, testing the first and second candidate face regions based on skin tone information to determine the first candidate face region is a valid face region and the second candidate face region is an invalid face region, and rejecting the second candidate face region and outputting the first candidate face region as a valid face region for further processing.

Further to the eighth embodiments, the received video frame comprises a video frame of a sequence of surveillance video frames and the machine readable medium comprises further instructions that, in response to being executed on the device, cause the device to perform face detection by performing face recognition in the surveillance video frames based on the valid face region.

Further to the eighth embodiments, the received video frame comprises a video frame of a sequence of decoded video frames and the machine readable medium comprises further instructions that, in response to being executed on the device, cause the device to perform face detection by adding a marker corresponding to the received video frame to perform face recognition on the received video frame based on the valid face region or providing an index indicative of a person being present in the video frame based on the valid face region.

Further to the eighth embodiments, the received video frame comprises a video frame of a sequence of video frames received during a device login attempt and the machine readable medium comprises further instructions that, in response to being executed on the device, cause the device to perform face detection by performing face recognition based on the valid face region and allowing access to the device if a secured face is recognized.

Further to the eighth embodiments, the received video frame comprises a video frame of a sequence of videoconferencing frames and the machine readable medium comprises further instructions that, in response to being executed on the device, cause the device to perform face detection by encoding the video frame based at least in part on the valid face region to generate a coded bitstream, wherein encoding the video frame comprises not encoding a background region of the video frame into the bitstream.

Further to the eighth embodiments, the machine readable medium comprises further instructions that, in response to being executed on the device, cause the device to perform face detection by encoding the video frame based at least in part on the valid face region to generate a coded bitstream, wherein encoding the video frame comprises including metadata corresponding to the valid face region in the bitstream, decoding the coded bitstream to generate a decoded video frame and to determine the metadata corresponding to the valid face region in the bitstream, and at least one of replacing the valid face region based on the decoded metadata, cropping and displaying image data corresponding only to the valid face region based on the decoded metadata, or indexing the decoded video frame based on the decoded metadata.

In one or more ninth embodiments, at least one machine readable medium may include a plurality of instructions that in response to being executed on a computing device, causes the computing device to perform a method according to any one of the above embodiments.

In one or more tenth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer implemented method for performing video coding based on face detection comprising:
   receiving a video frame comprising one of a plurality of video frames of a video sequence;
   determining the video frame is a key frame of the video sequence;
   performing, in response to the video frame being a key frame of the video sequence, a multi-stage facial search of the video frame based on predetermined feature templates and a predetermined number of stages to determine a first candidate face region and a second candidate face region in the video frame;
   testing the first and second candidate face regions based on skin tone information to determine the first candidate face region is a valid face region and the second candidate face region is an invalid face region;
   rejecting the second candidate face region and outputting the first candidate face region; and
   encoding the video frame based at least in part on the first candidate face region being a valid face region to generate a coded bitstream.

2. The method of claim 1, wherein the skin tone information comprises a skin probability map.

3. The method of claim 1, wherein said testing the first and second candidate face regions based on skin tone information is performed in response to the video frame being a key frame of the video sequence.

4. The method of claim 1, wherein the first candidate face region comprises a rectangular region, the method further comprising:
   determining a free form shape face region corresponding to the first candidate face region, wherein the free form shape face region has at least one of a pixel accuracy or a small block of pixels accuracy.

5. The method of claim 4, wherein determining the free form shape face region comprises:
   generating an enhanced skip probability map corresponding to the first candidate face region;
   binarizing the enhanced skip probability map; and
   overlaying the binarized enhanced skip probability map over at least a portion of the video frame to provide the free form shape face region.

6. The method of claim 4, wherein a second video frame comprises a non-key frame of the video sequence, the method further comprising performing face detection in the second video frame of the video sequence based on the free form shape face region.

7. The method of claim 6, further comprising:
   tracking a second free form shape face region in the second video frame based on the free form shape face region in the video frame.

8. The method of claim 7, wherein tracking the second free form shape face region comprises determining a location of a second valid face region in the second video frame based on a displacement offset with respect to the first candidate face region.

9. The method of claim 8, further comprising:
   determining the displacement offset based on an offset between a centroid of a bounding box around a skin enhanced region corresponding to the first candidate face region and a second centroid of a second bounding box around a second skin enhanced region in the second video frame.

10. The method of claim 1, wherein encoding the video frame based at least in part on the first candidate face region being a valid face region comprises at least one of reducing a quantization parameter corresponding to the first candidate face region, adjusting a lambda value for the first candidate face region, or disabling skip coding for the first candidate face region.

11. The method of claim 1, wherein the bitstream comprises at least one of an H.264/Advanced Video Coding (AVC) compliant bitstream, an H.265/High Efficiency Video Coding (HEVC) compliant bitstream, a VP9 compliant bitstream, a VP10 compliant bitstream, or an Alliance for Open Media (AOM) AV1 compliant bitstream.

12. A computer implemented method for performing face detection comprising:
   receiving a video frame of a sequence of video frames;
   performing a multi-stage facial search of the video frame based on predetermined feature templates and a predetermined number of stages to determine a first candidate face region and a second candidate face region in the video frame;
   testing the first and second candidate face regions based on skin tone information to determine the first candidate face region is a valid face region and the second candidate face region is an invalid face region;

rejecting the second candidate face region and outputting the first candidate face region as a valid face region for further processing; and providing an index indicative of a person being present in the video frame based on the valid face region.

13. The method of claim 12, wherein the sequence of video frames comprises a sequence of surveillance video frames, the method further comprising:

performing face recognition in the surveillance video frames based on the valid face region.

14. The method of claim 12, wherein the sequence of video frames comprises a sequence of decoded video frames, the method further comprising:

adding a marker corresponding to the received video frame to perform face recognition on the received video frame based on the valid face region.

15. The method of claim 12, wherein the sequence of video frames is received during a device login attempt, the method further comprising:

performing face recognition based on the valid face region; and allowing access to the device if a secured face is recognized.

16. The method of claim 12, wherein the sequence of video frames comprises a sequence of videoconferencing frames, the method further comprising:

encoding the video frame based at least in part on the valid face region to generate a coded bitstream.

17. The method of claim 16, wherein encoding the video frame comprises not encoding a background region of the video frame into the bitstream.

18. The method of claim 12, further comprising:

encoding the video frame based at least in part on the valid face region to generate a coded bitstream, wherein encoding the video frame comprises including metadata corresponding to the valid face region in the bitstream.

19. The method of claim 18, further comprising:

decoding the coded bitstream to generate a decoded video frame and to determine the metadata corresponding to the valid face region in the bitstream.

20. The method of claim 19, further comprising at least one of replacing the valid face region based on the decoded metadata, cropping and displaying image data corresponding only to the valid face region based on the decoded metadata, or indexing the decoded video frame based on the decoded metadata.

21. A system for performing video coding based on face detection comprising:

a memory configured to store a video frame comprising one of a plurality of video frames of a video sequence; and a processor coupled to the memory, the processor to receive the video frame, to determine the video frame is a key frame of the video sequence; to perform, in response to the video frame being a key frame of the video sequence, a multi-stage facial search of the video frame based on predetermined feature templates and a predetermined number of stages to determine a first candidate face region and a second candidate face region in the video frame, to test the first and second candidate face regions based on skin tone information to determine the first candidate face region is a valid face region and the second candidate face region is an invalid face region, to reject the second candidate face region and outputting the first candidate face region, and to encode the video frame based at least in part on the first candidate face region being a valid face region to generate a coded bitstream.

22. The system of claim 21, wherein the skin tone information comprises a skin probability map.

23. The system of claim 21, wherein the first candidate face region comprises a rectangular region, the processor further to determine a free form shape face region corresponding to the first candidate face region, wherein the free form shape face region has at least one of a pixel accuracy or a small block of pixels accuracy.

24. The system of claim 23, wherein the processor to determine the free form shape face region comprises the processor to generate an enhanced skip probability map corresponding to the first candidate face region, to binarize the enhanced skip probability map, and to overlay the binarized enhanced skip probability map over at least a portion of the video frame to provide the free form shape face region.

25. The system of claim 23, wherein a second video frame comprises a non-key frame of the video sequence, and the processor is further to perform face detection in the second video frame of the video sequence based on the free form shape face region.

26. The system of claim 25, wherein the processor is further to track a second free form shape face region in the second video frame based on the free form shape face region in the video frame.

27. The system of claim 21, wherein to encode the video frame based at least in part on the first candidate face region being a valid face region comprises the processor to reduce a quantization parameter corresponding to the first candidate face region, adjust a lambda value for the first candidate face region, or disable skip coding for the first candidate face region.

28. At least one non-transitory machine readable medium comprising a plurality of instructions that, in response to being executed on a device, cause the device to perform video coding based on face detection by:

receiving a video frame comprising one of a plurality of video frames of a video sequence;

determining the video frame is a key frame of the video sequence;

performing, in response to the video frame being a key frame of the video sequence, a multi-stage facial search of the video frame based on predetermined feature templates and a predetermined number of stages to determine a first candidate face region and a second candidate face region in the video frame;

testing the first and second candidate face regions based on skin tone information to determine the first candidate face region is a valid face region and the second candidate face region is an invalid face region;

rejecting the second candidate face region and outputting the first candidate face region; and encoding the video frame based at least in part on the first candidate face region being a valid face region to generate a coded bitstream.

29. The non-transitory machine readable medium of claim 28, wherein the skin tone information comprises a skin probability map.

30. The non-transitory machine readable medium of claim 28, wherein the first candidate face region comprises a rectangular region, the machine readable medium comprising further instructions that, in response to being executed on the device, cause the device to perform video coding based on face detection by:

determining a free form shape face region corresponding to the first candidate face region, wherein the free form shape face region has at least one of a pixel accuracy or a small block of pixels accuracy.

31. The non-transitory machine readable medium of claim 30, wherein determining the free form shape face region comprises:
   generating an enhanced skip probability map corresponding to the first candidate face region;
   binarizing the enhanced skip probability map; and
   overlaying the binarized enhanced skip probability map over at least a portion of the video frame to provide the free form shape face region.

32. The non-transitory machine readable medium of claim 30, wherein a second video frame comprises a non-key frame of the video sequence, the machine readable medium comprising further instructions that, in response to being executed on the device, cause the device to perform video coding based on face detection by performing face detection in the second video frame of the video sequence based on the free form shape face region.

33. The non-transitory machine readable medium of claim 32, the machine readable medium comprising further instructions that, in response to being executed on the device, cause the device to perform video coding based on face detection by:
   tracking a second free form shape face region in the second video frame based on the free form shape face region in the video frame.

34. The non-transitory machine readable medium of claim 28, wherein encoding the video frame based at least in part on the first candidate face region being a valid face region comprises at least one of reducing a quantization parameter corresponding to the first candidate face region, adjusting a lambda value for the first candidate face region, or disabling skip coding for the first candidate face region.

* * * * *